F. MÜLLER.
METAL CUTTING MACHINE.
APPLICATION FILED MAR. 31, 1919. RENEWED JULY 19, 1922.

1,429,617.

Patented Sept. 19, 1922.
9 SHEETS—SHEET 1.

INVENTOR
Friederich Müller
BY S. Jay Teller
ATTORNEY

F. MÜLLER.
METAL CUTTING MACHINE.
APPLICATION FILED MAR. 31, 1919. RENEWED JULY 19, 1922.
1,429,617.
Patented Sept. 19, 1922.
9 SHEETS—SHEET 2.
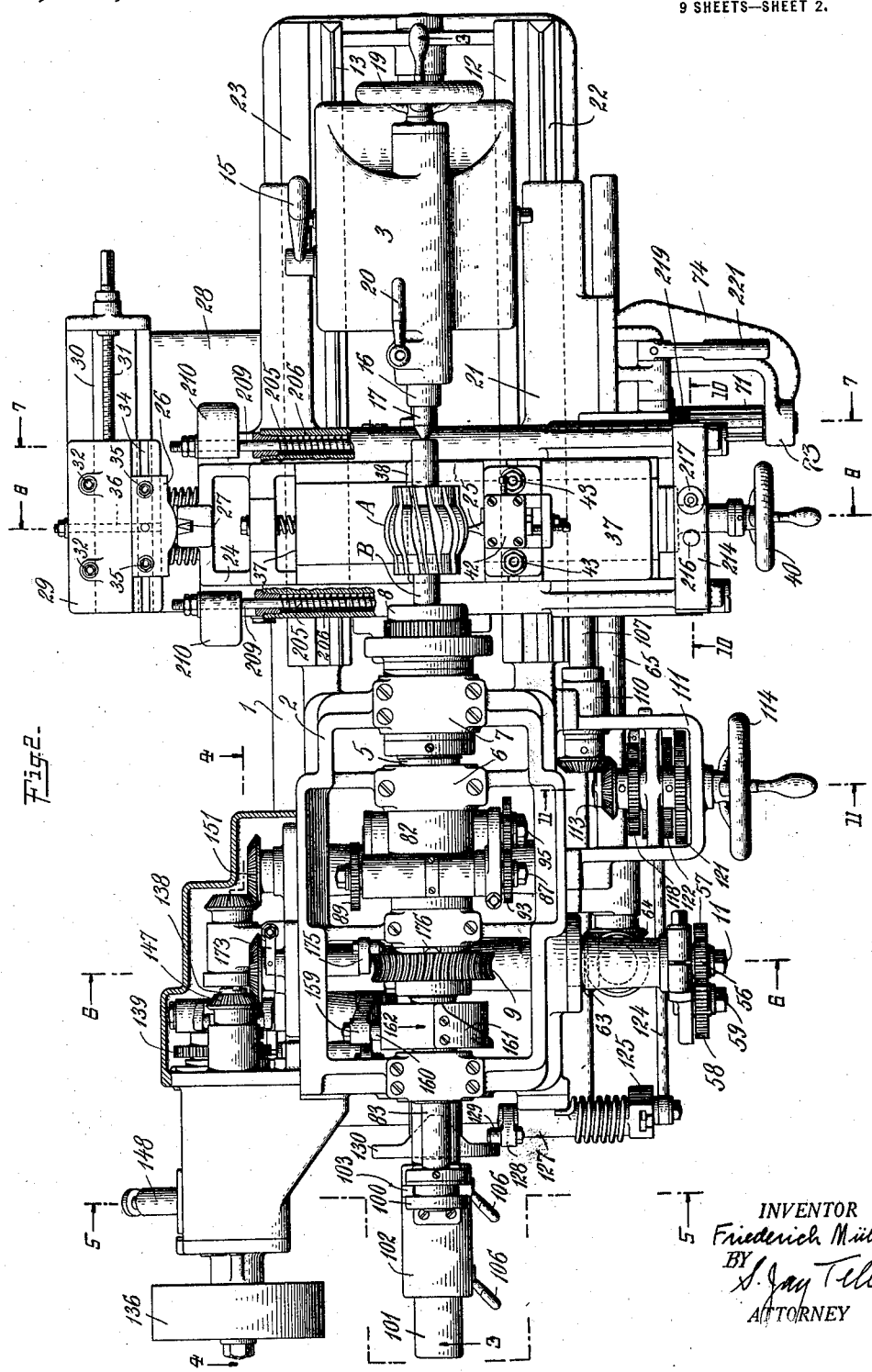
INVENTOR
Friederich Müller
BY
S. Jay Teller
ATTORNEY

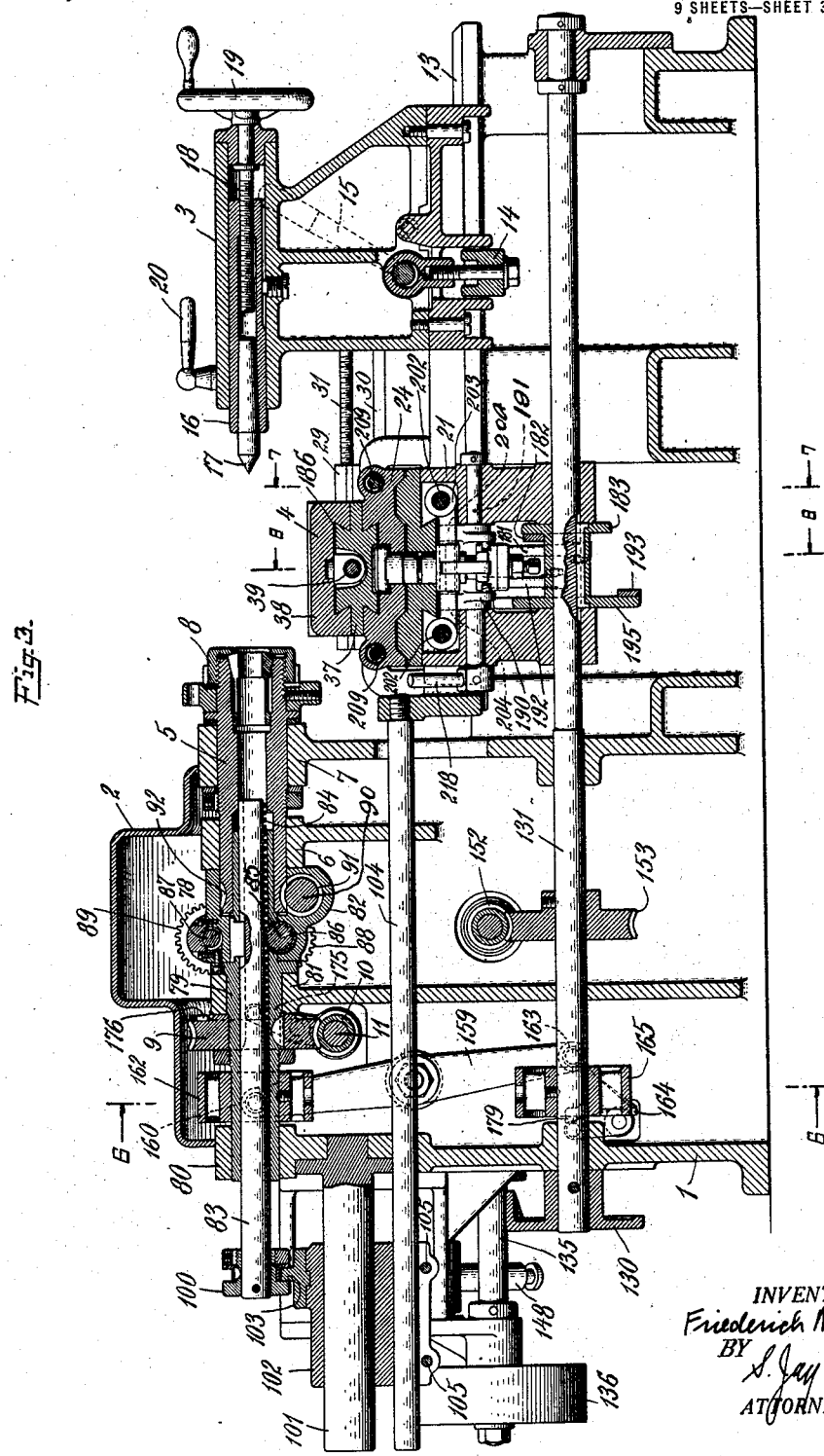

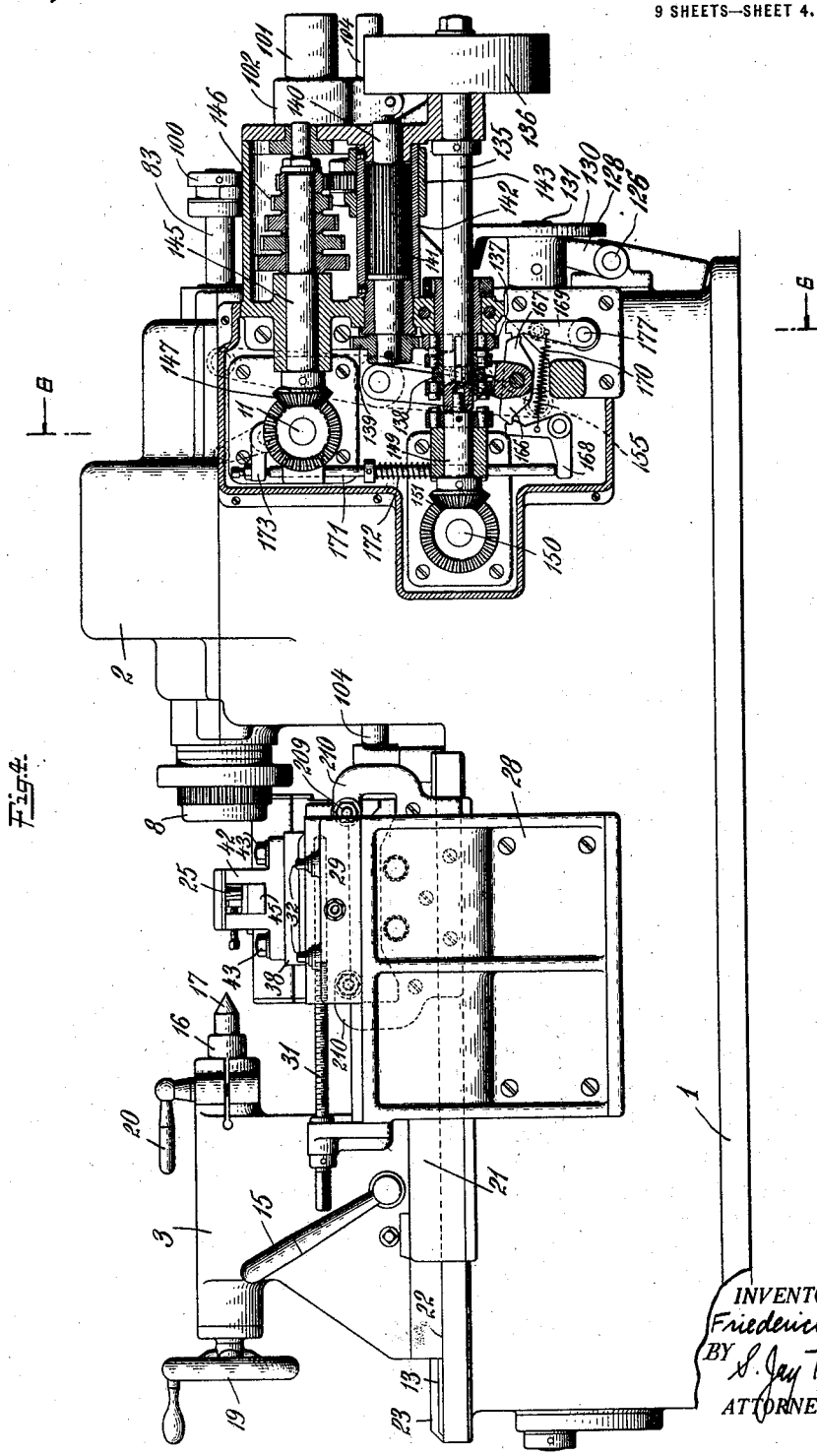

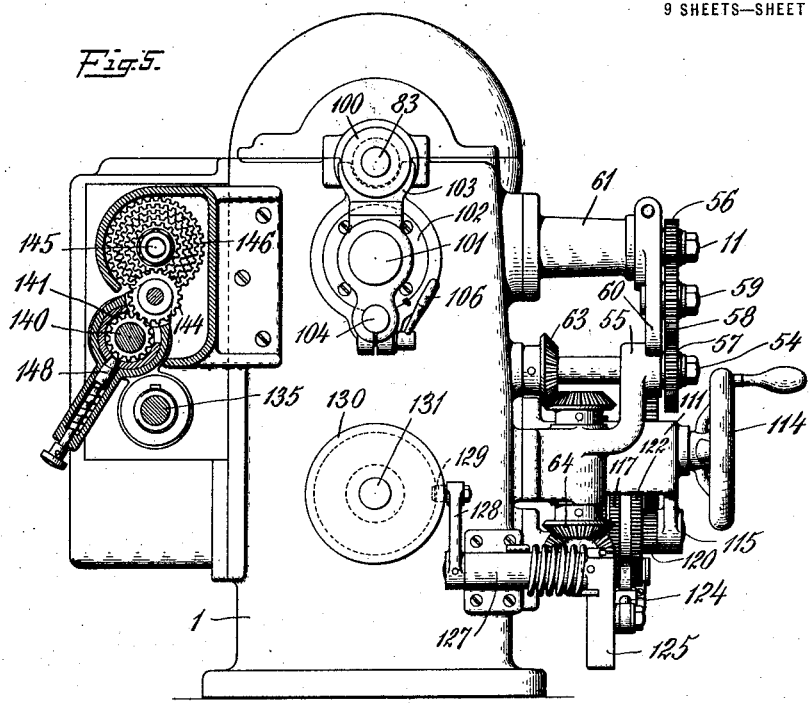
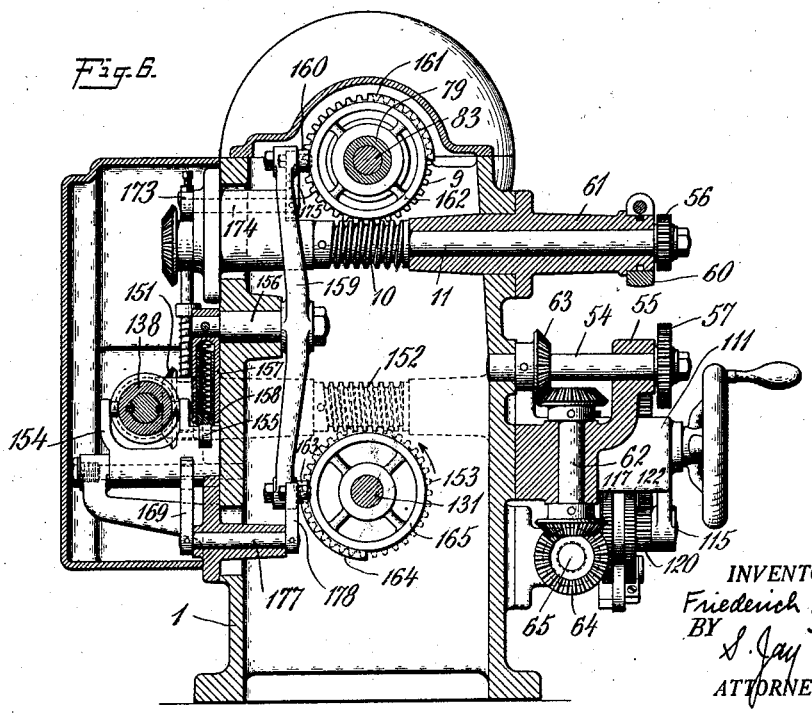

F. MÜLLER.
METAL CUTTING MACHINE.
APPLICATION FILED MAR. 31, 1919. RENEWED JULY 19, 1922.

1,429,617.

Patented Sept. 19, 1922
9 SHEETS—SHEET 6.

INVENTOR
Friederich Müller
BY S. Jay Tebler
ATTORNEY

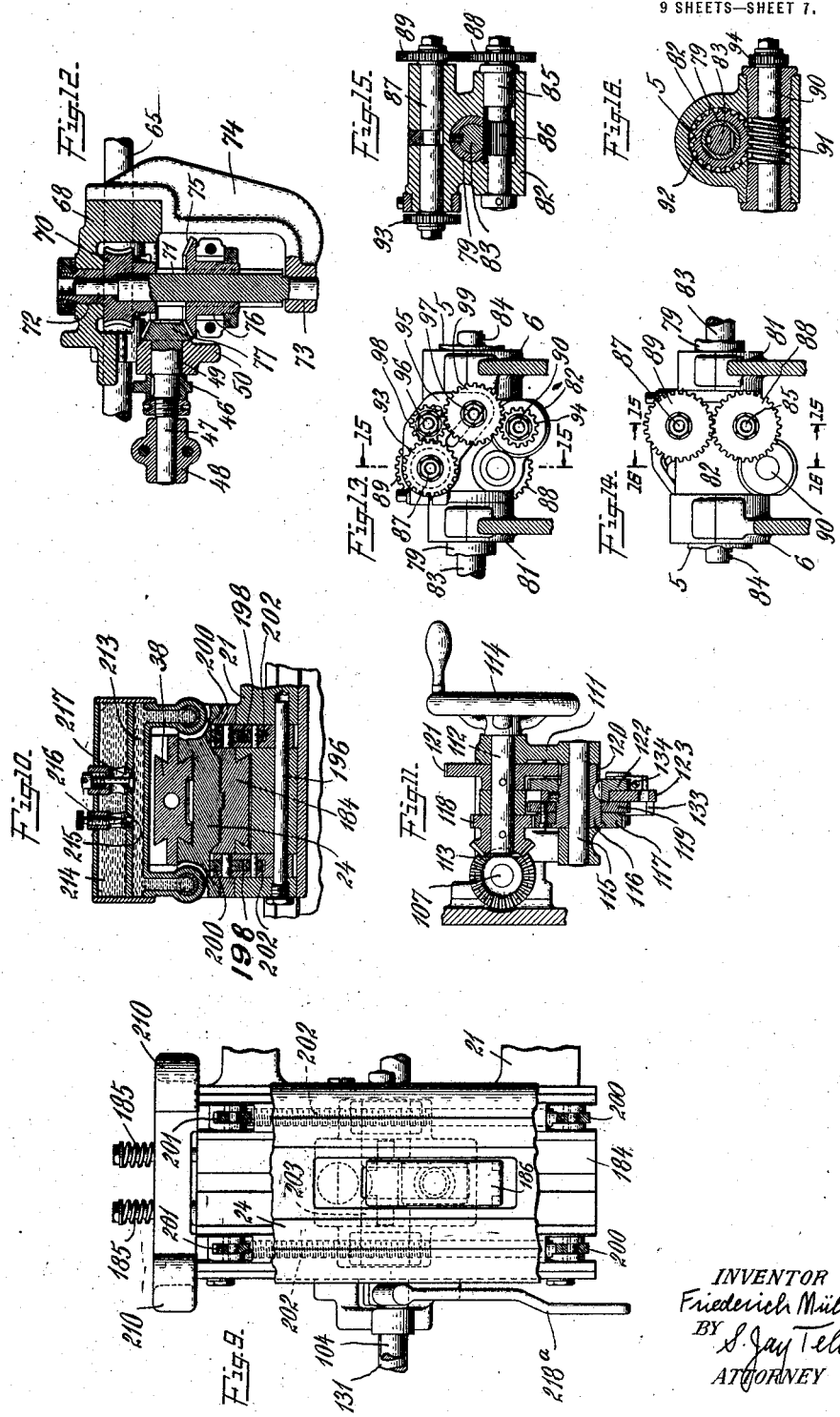

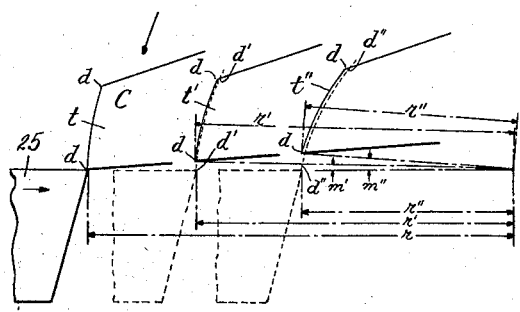
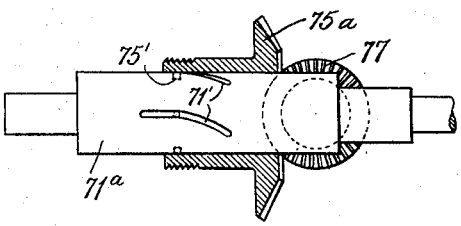
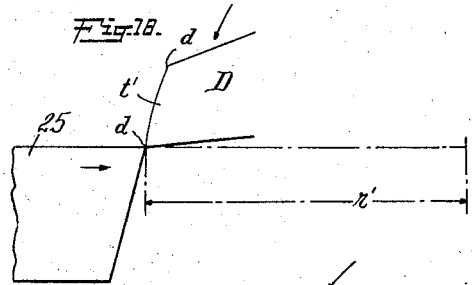
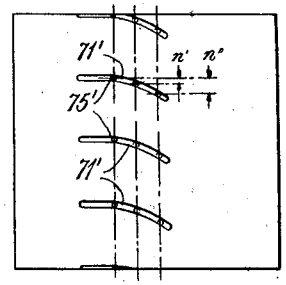
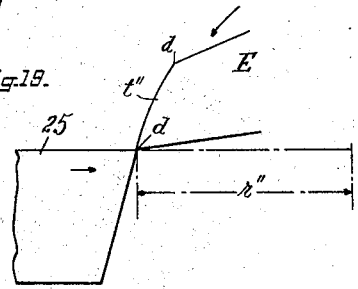
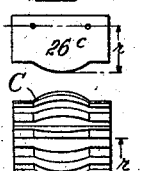
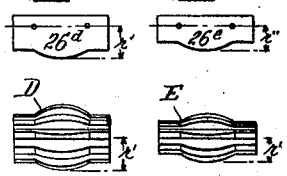
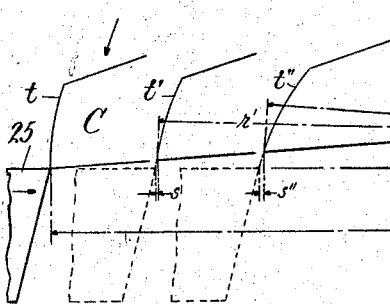
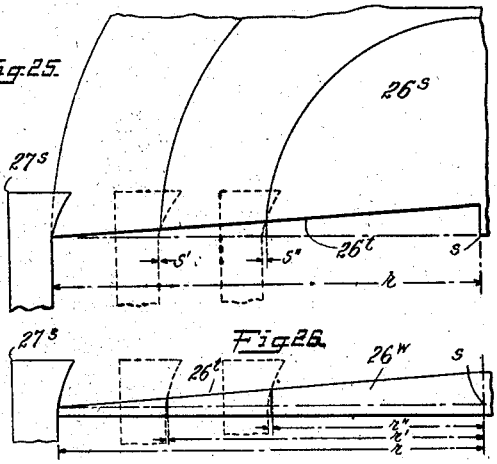

F. MULLER.
METAL CUTTING MACHINE.
APPLICATION FILED MAR. 31, 1919. RENEWED JULY 19, 1922.
1,429,617. Patented Sept. 19, 1922.
9 SHEETS—SHEET 9.
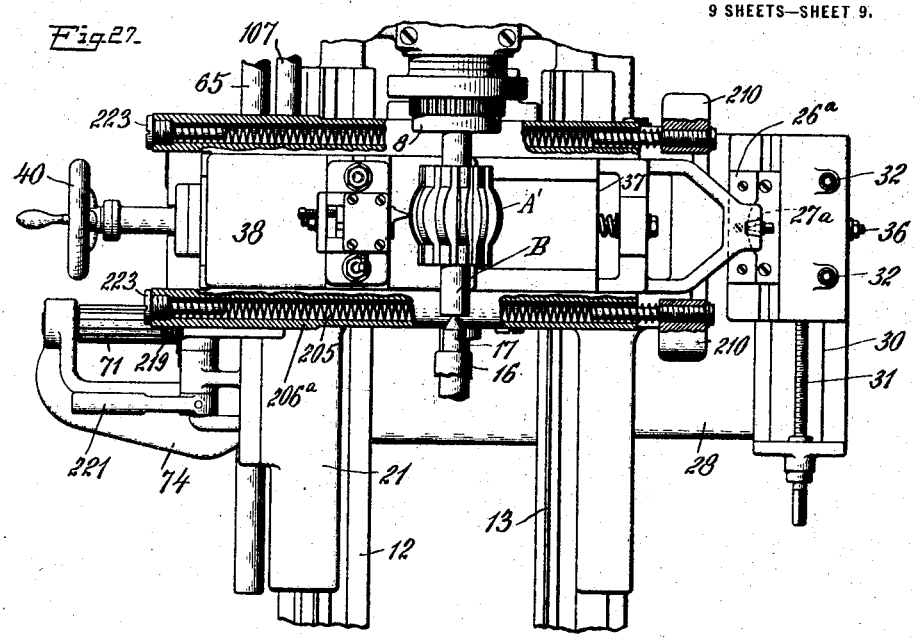
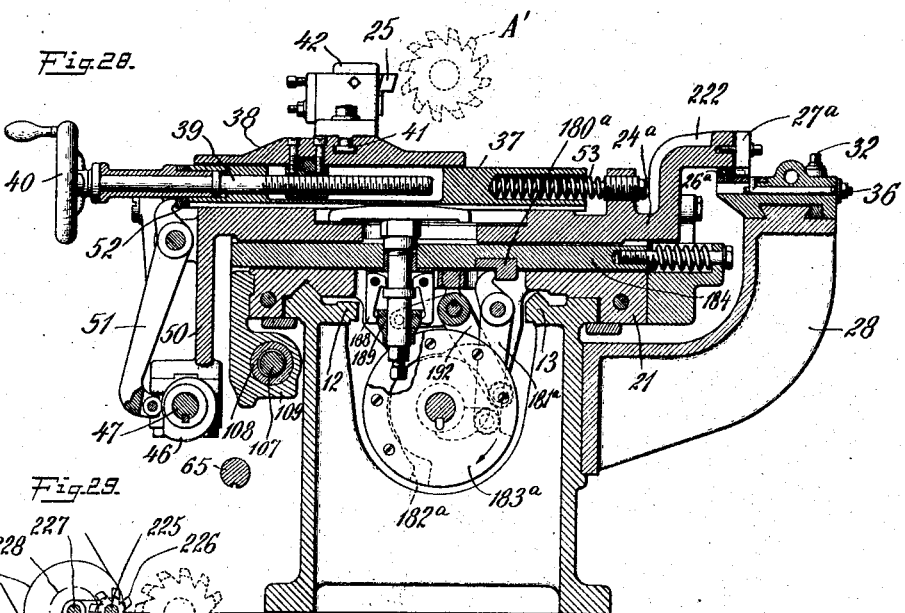
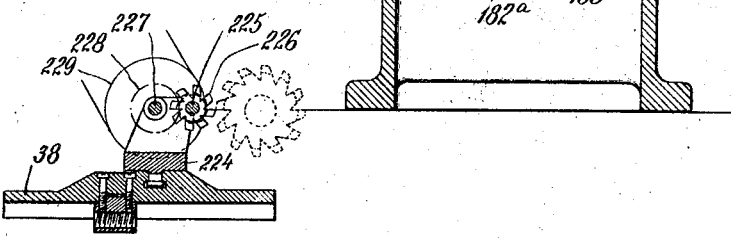
INVENTOR
Friederich Müller
BY S. Jay Teller
ATTORNEY Patented Sept. 19, 1922.

1,429,617

UNITED STATES PATENT OFFICE.

FRIEDERICH MÜLLER, OF HARTFORD, CONNECTICUT, ASSIGNOR TO PRATT & WHITNEY COMPANY, OF NEW YORK, N. Y., A CORPORATION OF NEW JERSEY.

METAL-CUTTING MACHINE.

Application filed March 31, 1919, Serial No. 286,524. Renewed July 19, 1922. Serial No. 576,159.

*To all whom it may concern:*

Be it known that I, FRIEDERICH MÜLLER, a citizen of the United States, residing at Hartford, in the county of Hartford and State of Connecticut, have invented certain new and useful Improvements in Metal-Cutting Machines, of which the following is a specification.

The invention relates to a machine which is similar in some respects to that shown in my co-pending application for metal cutting machines, Serial No. 201,338, filed November 10th, 1917.

One of the objects of the invention is to provide a machine of this general type which is adapted to properly form or relieve a milling cutter which has helical cutting teeth and which is adapted to cut a contour differing from a straight line. A machine embodying the invention is adapted to accurately relieve a cutter blank having a contour conforming exactly to the contour of a former which is inserted in the machine. A machine constructed in accordance with this invention is adapted for carrying out the methods set forth in my patents for methods of making milling cutters, No. 1,348,301, dated August 3, 1920, No. 1,348,302, dated August 3, 1920, and No. 1,348,303, dated August 3, 1920, and application Serial No. 326,875, filed September 27, 1919, the application being a division of the present application. A cutter such as may be thus made is set forth and claimed in my patent for milling cutters, No. 1,348,295, dated August 3, 1920, and application Serial No. 368,928, filed March 26, 1920.

A further object of the invention is to provide an improved means for changing the relationship between the relieving movements of the tool and the rotative movement of the cutter blank to conform to helical teeth. As concerns this feature, the invention is not necessarily limited to the cutting of a blank with a contour differing from straight lines. In accordance with the invention set forth in my aforesaid application, Serial No. 201,338, the said relationship is varied by changing the relieving movements of the tool. In accordance with the present invention, the relationship is varied by changing the rotative movement of the blank.

A further object of the invention is to provide improved mechanism for varying the rotative movement of the spindle or blank, this feature of the invention not necessarily being limited to use in conjunction with the other features hereinbefore specified.

A further object of the invention is to provide an improved mechanism for intermittently feeding the tool and to provide an intermittent feed mechanism in novel cooperative relationship with the relieving mechanism, with the mechanism whereby helicoidal teeth may be cut, and with the mechanism (preferably including a former and former pin) whereby the blank may be cut with different diameters.

Another object of the invention is to provide mechanism for stopping the spindle rotation preferably at the time of each feeding movement of the tool, this spindle stopping mechanism being in novel cooperative relationship with the relieving mechanism, with the mechanism whereby helicoidal teeth may be cut, and with the mechanism whereby the blank may be cut with different diameters.

A still further object of the invention is to provide improved mechanism for withdrawing the tool from the blank preferably at the time of each feeding movement and at the time of each stopping of the spindle, this withdrawing mechanism having novel cooperative relationship with the relieving mechanism, with the mechanism whereby helicoidal teeth may be cut, and with the mechanism whereby the blank may be cut with different diameters.

The mechanisms for intermittent feeding, for stopping the spindle and for withdrawing the tool are preferably provided in combination with each other so as to operate in timed relationship, but it will be understood that so far as certain phases of the invention are concerned I do not limit myself to the use of all of these mechanisms in combination and that each of them or any two of them may be independently useful.

Still another object of the invention is to provide mechanism independent of or supplemental to the withdrawing mechanism for returning the tool and usually the former pin to operative positions. This mechanism preferably serves to return the tool and pin slowly with a minimum pressure.

A further object of the invention is to provide an improved locking means preferably in combination with the independent returning mechanism for holding the tool and usually the pin in their operative positions.

Still further objects of the invention will be apparent from the following specification and claims.

In the accompanying drawings I have shown the embodiment of the invention which I now prefer together with certain possible variations thereof. It will be understood, however, that the drawings are to be considered as illustrative only and are not to be construed as defining or limiting the scope of the invention, the accompanying claims being relied upon for that purpose.

Of the drawings:

Fig. 2 is a plan view with certain parts shown in section. In this view the covers for the headstock and other gearing are removed for the sake of clearness.

Fig. 3 is a vertical longitudinal sectional view.

Fig. 4 is a rear view, partly in section, along the line 4—4 of Fig. 2.

Fig. 5 is an end view taken from the left.

Fig. 6 is a transverse vertical sectional view taken along the lines 6—6 of Figs. 1, 2, 3 and 4.

Fig. 9 is a fragmentary plan view showing certain parts of the tool-carrying slides.

Fig. 10 is a fragmentary vertical longitudinal sectional view taken along the lines 10—10 of Figs. 2 and 7.

Fig. 11 is a fragmentary vertical transverse sectional view taken along the lines 11—11 of Figs. 1 and 2.

Fig. 12 is a horizontal longitudinal sectional view taken along the lines 12—12 of Figs. 1 and 7.

Figs. 13 and 14 are detailed views of the mechanism for varying the movement of the blank-carrying spindle, the views being taken from opposite sides.

Fig. 15 is a transverse sectional view taken along the lines 15—15 of Figs. 13 and 14.

Fig. 16 is a fragmentary transverse sectional view taken along the line 16—16 of Fig. 14.

Figs. 17, 18 and 19 are diagrammatic views illustrating one operation that may be followed in cutting cutters with undercut cutting faces.

Fig. 20 is a fragmentary sectional view similar in part to Fig. 7 and showing an alternate construction adapted to be used for cutting cutters with undercut cutting faces.

Fig. 21 is a development view of the cam shown in Fig. 20.

Figs. 22, 23 and 24 are diagrammatic views showing the relation between the formers and the blanks for cutters with undercut cutting faces.

Fig. 25 is a diagrammatic view, in some respects similar to Fig. 17, illustrating another operation that may be followed in cutting cutters with undercut faces.

Fig. 26 is a fragmentary view on an enlarged scale showing an alternate construction of the former and former pin adapted to be used for cutting cutters with undercut faces.

Figs. 27 and 28 are views similar respectively to Figs. 7 and 8 but showing an alternate construction adapted for use with formers having reversed shapes.

Fig. 29 is a detailed view, similar in part to Figs. 8 and 28, and showing a milling cutter substituted for the lathe tool shown in the other views.

Figure 1:
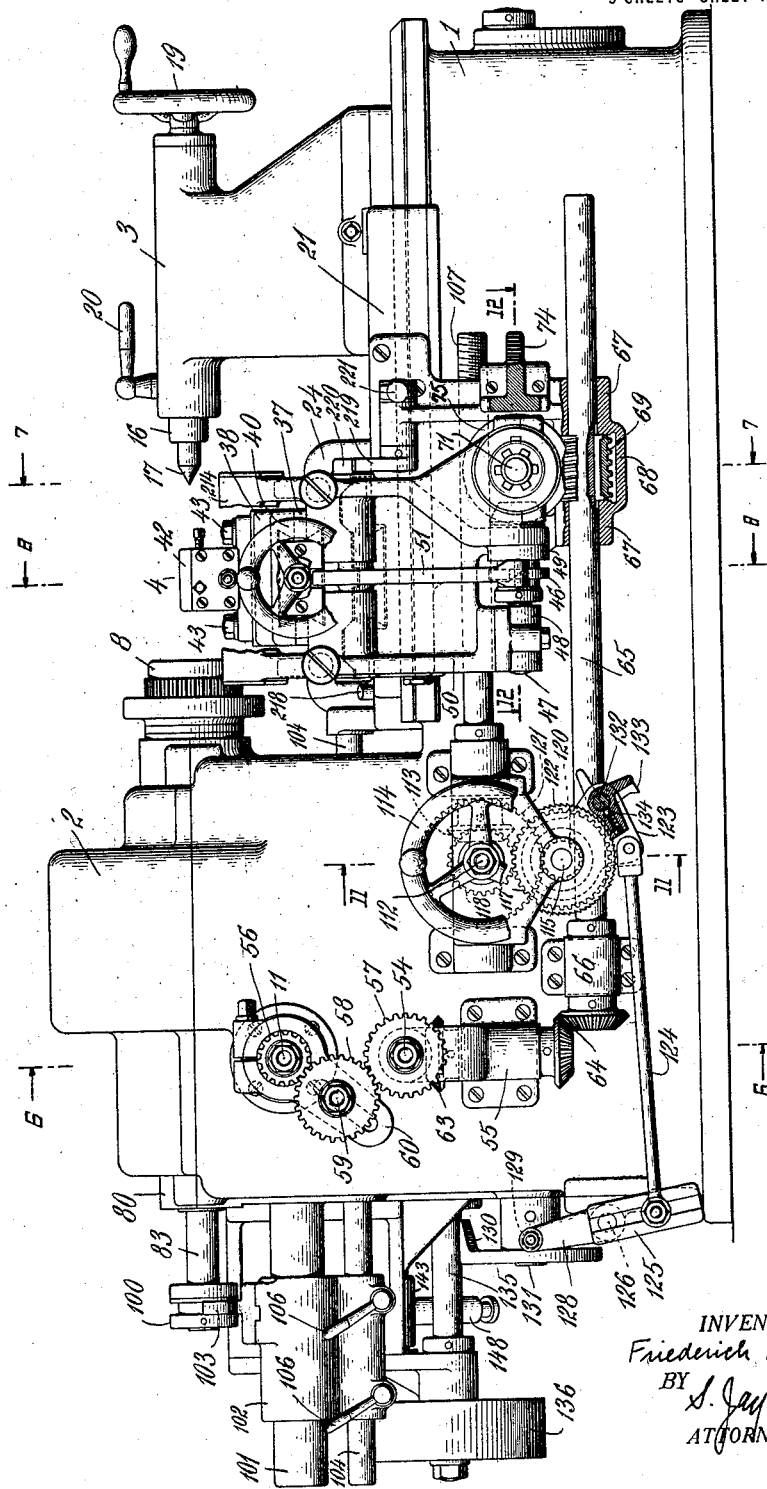
Fig. 1 is a front view with certain parts broken away and others shown in section.

Referring to the drawings, 1 represents the main frame or bed upon which the other parts of the machine are mounted. For carrying the blank for the tool to be formed and relieved, there is provided a headstock 2 and preferably also a tailstock 3. A tool holding-and-operating mechanism is provided, as shown at 4. Preferably the headstock 2 and the tailstock 3 are so arranged as to hold the blank against longitudinal movement, the tool mechanism 4 being moved longitudinally along the blank in the manner to be presently set forth. When the machine is so constructed, the headstock 2 is fixedly secured to the bed, preferably being formed in part integrally therewith, as shown. The tailstock 3 is adjustable along the bed to accommodate blanks or blank arbors of different lengths.

The headstock 2 is provided with a rotatable spindle 5 mounted in bearings 6 and 7. Secured to the spindle is a collet chuck 8 which may be of any usual or preferred form and which is adapted to grip either the shank of the tool to be formed and relieved or an arbor upon which the tool is mounted. As illustrated, there is a blank A mounted upon an arbor B, the arbor being engaged by the chuck 8. For rotating the spindle 5 there is provided a drive mechanism including a driving member in the form of a worm wheel 9 meshing with a worm 10 on a transverse rotatable shaft 11.

The tailstock 3 may be of any usual or preferred construction, and it is adjustable along ways 12 and 13. It can be secured in adjusted position by means of a clamp 14 controlled by a lever 15. The tailstock spindle is indicated at 16 and carries a center 17. The spindle can be moved longitudinally by means of a screw 18 under the control of a hand wheel 19. For clamping the sleeve in adjusted position there is provided a handle 20. As shown, the center 17 is adjusted into engagement with the end of the arbor B.

The tool mechanism 4 includes a carriage 21 which is longitudinally movable along ways 22 and 23 on the bed 1. Mounted for transverse movement with respect to the carriage 21 is a slide 24, this slide carrying the cutting tool. In most of the figures of the drawings I have shown a non-rotary lathe tool 25, and such a tool is preferable for many classes of work. However, the invention is not limited to a non-rotary tool and when preferred a rotary tool can be used, as will presently be explained. The tool 25 is preferably very narrow, but if desired a wider tool can be used when constructed in accordance with the method set forth in my aforesaid Patent No. 1,348,302.

As stated at the outset, a machine embodying the invention is adapted for cutting a blank having a varying diameter. The diameter may vary uniformly from end to end of the blank, thus providing a uniform taper, or it may vary in any desired way so as to provide the blank with any predetermined contour differing from a straight line. The variations in the diameter of the blank are determined by moving the slide 24 together with the tool transversely, and preferably, for regulating and controlling the transverse movements, I provide a former and a former pin, one carried in fixed position on the bed 1, and the other carried by the slide 24. As illustrated, there is provided a former 26 carried by the bed and a former pin 27 carried by the slide 24. The former 26 has exactly the same contour with which the blank is to be formed and the former pin 27 has exactly the same shape as the cutting tool 25. The pin is detachably secured to the slide so that it can be removed and another pin be substituted corresponding to a tool differing in shape from the tool 25 which is shown. For supporting the former 26 there is provided a bracket 28 rigidly secured to the bed 1. In order to permit adjustment, the former 26 is secured to a slide 29 which is longitudinally movable along a suitable guideway 30 on the bracket, a screw 31 being provided for effecting longitudinal movement. The slide can be locked in adjusted position by means of screws 32, 32 engaging a gib 33. To permit the ready attachment of the former, the slide 29 is provided with a T-slot 34 adapted to receive T-bolts 35 passing through the former. To further assist in holding the former in place and to prevent any possible free movement thereof, there is provided a hooked bolt 36 which, when tightened, serves to draw the former back against a suitable shoulder on the slide. In practice, a former 26 is selected having the contour with which the blank A is to be formed and then by means of the slide 29 the former is adjusted longitudinally until it bears the same relation to the former pin 27 that the blank A bears to the tool 25. When the former pin and tool are exactly opposite the former is adjusted to a position exactly opposite the blank. As the carriage is moved longitudinally the slide 24 with the tool 25 is moved transversely so as to keep the former pin 27 in engagement with the former.

In order that the tool may be given a relieving movement to properly relieve the several teeth on the blank, it is not rigidly secured to the slide 24 but is transversely movable thereon. Mounted on the slide 24 is a slide 37 which is transversely movable along a suitable guideway. Carried in part by the slide 24 is a mechanism for effecting regular reciprocating relieving movements of the slide 37 and the tool in suitable timed relation with the rotative movement of the blank. In order that the tool may be adjusted for blanks of different sizes, there is provided a tool-carrying slide 38 transversely movable on the slide 37. For moving the slide 38 there is provided a screw 39 rotatable by means of a hand wheel 40. The slide 38 is provided with a transverse T-slot 41 and a tool post 42 is held in place by means of T-bolts 43 entering the slot. The tool post has a tool-receiving aperture provided with a horizontal top wall 44 exactly at the level of the axis of the blank. The tool 25 is put in place with its top surface engaging the horizontal wall 44 of the tool post and is held in this position by means of a wedge 45.

It will be observed that with the construction described the tool is maintained in parallelism as it moves longitudinally for feeding or inward and outward to follow the contour.

The relieving mechanism for moving the slide 37 together with the tool 25 includes a rotatable relieving cam 46 which is mounted on the slide 24 so as to be bodily movable therewith. As shown, the cam is mounted on a longitudinal rotatable shaft 47 mounted in bearings 48 and 49 on a bracket 50 depending at the front of the slide 24. A lever 51 is pivoted between its ends on the slide 24 and at its lower end is provided with a roller engaging the cam 46. The upper end of the lever engages an abutment 52 on the slide 37. A coil spring 53 is interposed between the slide 37 and the slide 24, this spring tending to press the slide 37 forward, thus holding the abutment 52 in firm contact with the upper end of the lever 51. It will be seen that when the cam 46 is rotated the lever 51 will be oscillated, thus giving a reciprocating movement to the slide 37 and to the tool 25. The shape of the cam 46 is such that the slide 37 is moved forward relatively slowly at a uniform rate so that the tool may effect a relieving cut, and is then drawn back relatively rapidly so as to withdraw the tool and position it for another cut.

As before stated, the cam 46 is driven in timed relation with the blank rotation. For rotating the cam, I make use of the aforesaid transverse shaft 11. Positioned immediately below the shaft 11 is a shaft 54 which is mounted partly in the main frame and partly in a bracket 55 secured thereto. For connecting the two shafts 11 and 54 there is provided a gear 56 on the shaft 11, a gear 57 on the shaft 54 and an idler gear 58 meshing with the two gears 56 and 57. The idler gear is mounted on a bearing stud 59 carried by an adjustable slotted arm 60. The arm 60 is carried by a hub 61 which assists in supporting the shaft 11. The speed ratio between the two shafts 11 and 54 can be changed by removing one or both of the gears 56 and 57 and substituting other gears of different diameters, it being clear that the idler gear 58 can be adjusted to mesh with such differently diametered gears. Mounted in the said bracket 55 is a vertical shaft 62 and this shaft is driven from the shaft 54 by means of bevel gearing 63. By means of bevel gearing 64 the shaft 62 serves to drive a longitudinal splined shaft 65. This shaft is supported partly in a bearing 66 secured to the bed and partly in bearings 67 in a depending bracket 68 secured to the carriage 21.

Mounted on the shaft 65 between the bearings 67 and splined to the shaft, is a worm 69. This worm meshes with a worm wheel 70 which is connected with a transverse shaft 71. The worm wheel and the shaft are rotatably mounted in a bearing 72 formed in the bracket 68, and in a bearing 73 formed on a supplemental bracket 74 secured to the bracket 68. Slidably mounted on the shaft 71 is a bevel gear 75, and this gear is engaged by a bearing 76 on the aforesaid bracket 50 depending from the front end of the slide 24. The bevel gear 75 meshes with a bevel gear 77 on the shaft 47. The bevel gear 75 and the shaft 71 are splined or otherwise suitably constructed so that the bevel gear is rotated, but is at the same time free to move transversely of the machine when the slide 24 is moved. Inasmuch as the bevel gears 75 and 77 are both supported by the bracket 50, they are at all times held in mesh. It will be seen that with this construction power is transmitted from the shaft 11, through the several parts that have been described, to the shaft 65, and is transmitted from the shaft 65 to the shaft 47 and the cam 46, the connection between the shaft 65 and the shaft 47 being such that free transverse movement of the cam and associated parts is permitted. The cam 46 is given one complete rotation for each tooth of the blank. The machine can be adjusted for blanks with different numbers of teeth by changing the gears 56 and 57 as already explained.

As has already been stated, the machine is adapted for cutting blanks having helical teeth. In order that blanks with such teeth may be properly relieved, it is necessary to effect the relieving movements of the tool in peculiar relation to the rotative movement of the blank so that the relief may be in conformity with the helical teeth. I have stated that the relieving movements of the tool are effected in timed relation to the rotative movement of the blank; and, for any given position of the carriage, this timed relation is fixed and definite, but when the carriage is moved to bring the tool into a new cutting position, it is necessary to vary the relation between the relieving movements of the tool and the rotative movement of the blank. For this purpose I make use of a mechanism which is in many respects similar to that set forth in my aforesaid copending application Serial No. 201,338. The present construction differs, however, in that I have so arranged the mechanism that the aforesaid relationship is varied by changing the rotative movement of the blank rather than by changing the relieving movements of the tool. While I prefer to change the blank rotation, it will be understood that my present invention in its broader aspects is not limited in this respect.

In the construction illustrated, the driving member or worm wheel 9 is not connected directly with the spindle 5 but is connected indirectly by means of suitable gearing 78 which can be supplementally moved to change the spindle rotation. By preference, this gearing is bodily rotatable and includes a rack and pinion, the rack being longitudinally slidable in accordance with the longitudinal movements of the carriage 21. Coaxially mounted with the spindle 5 is a sleeve 79, this being supported in bearings 80 and 81 in the headstock. The inner end of the sleeve preferably extends into and has a bearing in the outer end of the spindle. Associated with the spindle is a frame 82 which is recessed to receive the outer end of the spindle and engage the outer surface thereof. The aforesaid worm wheel 9 is rigidly secured to the sleeve 79. Slidably mounted in the sleeve 79 is a shaft 83 having rack teeth formed thereon at 84. The shaft 83 is splined to the sleeve 79 so as to be rotatable therewith. Rotatably mounted in bearings in the frame 82 is a transverse shaft 85 provided with teeth 86 which meshes with the rack teeth 84. Also rotatably mounted in the frame 82 is a transverse shaft 87. The two shafts 85 and 87 are connected by spur gears 88 and 89. Also rotatably mounted in the frame 82 is a third rotatable shaft 90. Secured to this shaft is a worm 91 which meshes with worm teeth 92 formed in the periphery of the spindle 5 near the end thereof. At the side of the bracket 82 opposite from the gears 88 and 89 there is provided gearing for connecting the shafts 87 and 90. A gear 93 is mounted on the shaft 87, and a gear 94 is mounted on the shaft 90. An adjustable slotted bracket 95 is mounted on the frame 82 and this carries adjustable bearing studs 96 and 97 on which are mounted respectively idler gears 98 and 99.

Carried by the shaft 83 at the outer end thereof is an annularly grooved collar 100. Rigidly secured to the main frame adjacent the shaft 83 is a longitudinal guide stud
101. Slidably mounted on the stud 101 is a bracket 102 having a fork 103 entering the groove in the collar 100. The bracket 102 is apertured to receive a longitudinal rod 104, which is connected at its right-hand end with the carriage 21. The bracket 102 can be clamped to the rod 104 in any desired relative position, clamping being effected by means of screws 105, 105 provided with handles 106.

It will be seen that when the carriage 21 is moved longitudinally along the bed the rod 104, together with the bracket 102, will be moved at the same time and to the same extent. By reason of the engagement of the fork 103 with the collar 100 the shaft 83 is similarly moved, thus moving the rack teeth 84. When the rack slides longitudinally the pinion 86 is turned and this serves, by means of the gearing and the several shafts that have been described, to turn the worm 91. The rotative movement of the worm 91 serves to turn the spindle 5 relatively to the frame 82 and the sleeve 79. It will be understood, as before stated, that the entire gearing 78 rotates bodily with the sleeve 79. It will therefore be clear that the relative movement of the spindle with respect to the sleeve simply serves to either increase or decrease the spindle rotation to a certain extent. However, the relative movement of the spindle is determined by the longitudinal movement of the rack 84, which in turn is determined by the longitudinal movement of the carriage 21 and of the cutting tool 25 carried thereby. Inasmuch as the relieving cam reciprocates the tool with a frequency which is normally uniform, and inasmuch as the spindle and the blank are given a changed rotation which is in exact proportion to the longitudinal movement of the carriage and the tool, it is clear that the relieving movements are effected in such relation to the blank as to be in conformity with helical teeth.

The amount of variation of the spindle and blank rotation can be changed in accordance with the degree of inclination of the helical teeth by removing one or the other or both of the gears 93 and 94 and substituting other gears of different diameters. The idler gears 98 and 99 can be properly adjusted to mesh with such differently diametered gears. It is also possible to cause the relative movements of the spindle to take place in either direction in conformity with helical teeth inclined in either direction. As illustrated, the machine is adjusted for cutting teeth with left-hand helices. For cutting teeth with right-hand helices the idler gear 98 is removed and the gear 99 is adjusted to mesh directly with the gears 93 and 94. When it is desired to cut a blank with straight teeth instead of helical teeth, the gearing is rendered ineffective, as for instance by loosening the clamping screws 105, thus permitting the rod 104 to slide freely through the bracket 102. By loosening the clamping screws 105 it is possible to preliminarily adjust the carriage without affecting the position of the spindle and blank. When the cutter and the blank have been properly adjusted relatively, the handles 106 are turned to connect the carriage with the mechanism for controlling the spindle rotation. From the foregoing description it will be observed that in following helical teeth as described, the blank is rotated in each instance through a little more or a little less than one revolution, as required for right-hand or left-hand helices. It will further be seen that during each rotative movement of the spindle and blank a whole number of relieving movements are effected.

Figure 7:
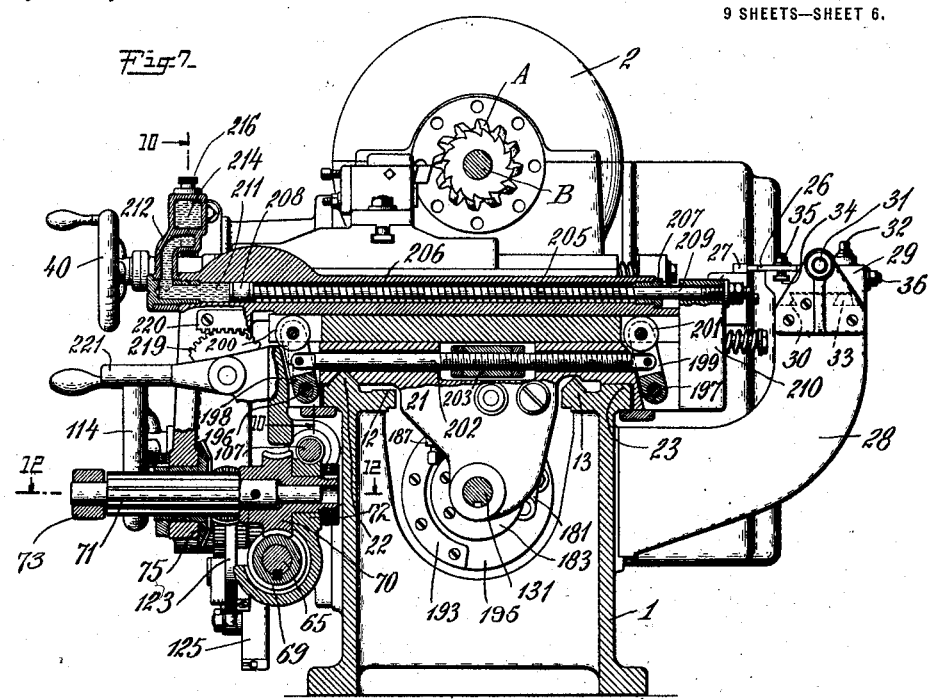
Fig. 7 is a transverse vertical sectional view taken along the lines 7—7 of Figs. 1, 2 and 3.
Figure 8:
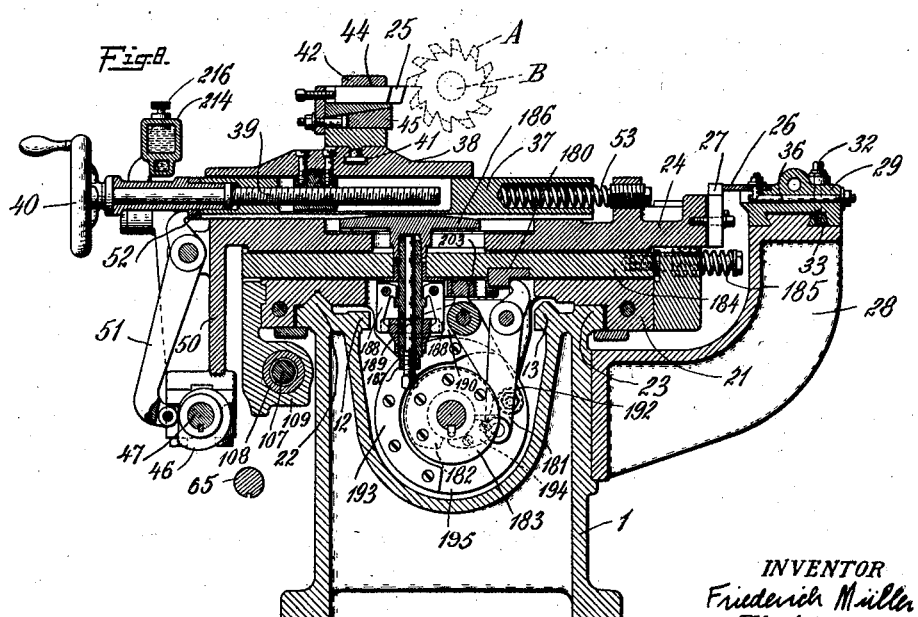
Fig. 8 is a transverse vertical sectional view taken along the lines 8—8 of Figs. 1, 2 and 3.

The blank A, shown in Figs. 7 and 8, is provided with teeth having their front cutting faces arranged exactly radially. Frequently, however, it is desired to provide a cutter with undercut or hooked teeth; that is, teeth having their front cutting faces inclined with respect to radial lines. Such a cutter is set forth in my copending application for milling cutters, Serial No. 323,110, filed Sept. 11th, 1919. For cutting a blank with undercut faces, it is necessary to vary the ordinary relation between the relieving movements of the tool and the rotative movement of the blank as the cutting tool moves inward or outward to conform to different blank diameters. When such blanks are to be cut, the mechanism heretofore described may be somewhat modified.

One way of varying the relation will be understood by reference to the diagrammatic Fig. 17. In this view $t$ may be considered to be a fragmentary sectional view taken at the maximum radius $r$ of a cutter C having undercut faces. Under the control of the former and the former pin, the cutting tool 25 is at a distance $r$ from the blank axis and is in position to engage the point of the tooth shown and cut the proper relief line $d$—$d$ thereon. The tooth section at a smaller radius $r'$ is shown at $t'$. For this radius, without special provision being made, the tool 25 would be in the position indicated by dotted lines at the distance $r'$ from the blank axis. However, by reason of the inclined cutting face on the blank, the blank tooth would not be in engagement with the tool but would be separated therefrom by the angle $m'$. The tool, however, would immediately start its inward relieving movement notwithstanding the fact that the blank tooth had not yet reached it, and the result would be the cutting of an incorrect relief line $d'$—$d'$. For a still smaller radius $r''$ of the blank, as shown at $t''$, the result would be similar except that the point of the tooth would be separated from the tool by a greater angle $m''$, with the result that the incorrect relief line $d''$—$d''$ would be further from the correct relief line $d$—$d$.

In order to avoid the errors which would occur, as shown in Fig. 17, I vary the relationship between the relieving movements of the tool and the rotative movement of the blank in such a way that the tool, as concerns its relieving movements, is always in the same position when engaged by the front edge of the tooth. This will be clear from an inspection of Figs. 18 and 19. Fig. 18 shows the tool at the same radius $r'$ from the blank axis as was shown in Fig. 17, but the relation of the relieving movement has been so changed that the blank is in position to be engaged by the point of the tool when the relieving movement starts. The tooth is therefore cut with the correct relief line $d$—$d$. Similarly, in Fig. 19, the tool is shown at the same distance $r''$ from the blank axis as was shown in Fig. 17, but the relation of the relieving movement has been so changed that the blank is in position to be engaged by the point of the tool when the effective relieving movement starts. The tooth is therefore cut with the correct relief line $d$—$d$. It will be seen that the operation, as illustrated in Figs. 17 to 19, is in no way effected by or dependent on the longitudinal inclination of the cutting faces. In other words, it is immaterial whether the cutting faces be helical or straight.

The required variations in the relationship between the relieving movements of the tool and the rotative movement of the blank can be brought about either by changing (usually advancing) the blank movement or by changing (usually retarding) the tool movements. I have found it simpler, to retard the tool movements, and this is particularly desirable when means are provided as herein disclosed for changing the blank movement to conform to helical teeth. In order that the tool movements may be properly retarded, use may be made of an alternate construction such as shown in Figs. 20 and 21. This is similar to that already described except that a shaft $71^a$ and the bevel gear $75^a$ are substituted for the shaft 71 and the gear 75 before described. The shaft $71^a$, instead of being provided with straight splines, is provided with inclined cam grooves $71'$, and the bevel gear $75^a$ is provided with pins $75'$ adapted to enter the said grooves. Fig. 21 is a development of the shaft $71^a$ showing the inclined cam grooves. With the pins $75'$ in the full line position shown, which corresponds to the radius $r$, the cam 46 is in position to immediately start the inward relieving movement of the tool. From the description which has been given of the mechanism for driving the relieving cam, it will be recalled that for any given longitudinal position of the tool the cam is ordinarily rotated at a speed exactly in proportion to the rotative movement of the spindle and blank. When the tool is moved inward to a position corresponding to the radius $r'$, the normal rotative movement of the cam is retarded by an angular distance $n'$ which corresponds to the angle $m'$ shown in Fig. 17. When the tool moves still further inward to a position corresponding to the radius $r''$, the cam is still further retarded through an angular distance $n''$ corresponding to the angle $m''$ shown in Fig. 17. The result of this retarding of the tool is to cause it to be always in the same position as concerns its relieving movements when the front edge of the tooth reaches it.

The fact that the blank may not have the maximum radius $r$ is immaterial provided that the bevel gear $75^a$ is made to take the proper positions along the cam shaft $71^a$. In order that this may be conveniently brought about, the former is preferably constructed so as to correspond to the radius of the blank to be cut. If the cutter C is to have a maximum radius $r$, the former $26^c$ is made with the point of maximum radius at a distance $r$ from a given reference line, for instance the center line of the bolts 35, 35. If a cutter D is to be made having a radius $r'$, then the former $26^d$ is made with the point of maximum radius at the distance $r'$ from the center line of the bolts. If a cutter E is to be made having a maximum radius $r''$, then the former $26^e$ is made with its point of maximum radius at the distance $r''$ from the center line of the bolts. The construction of the formers in the way described insures the location of the sliding gear $75^a$ on the shaft $71^a$ at positions corresponding exactly to the different radii of the blanks.

Another way of varying the relation between the relieving movements of the tool and the rotative movement of the blank to conform to undercut cutting faces, will be understood by reference to the diagrammatic Fig. 25. In this view $t$, $t'$ and $t''$ may be considered to be fragmentary sectional views of a cutter C having undercut faces, the views being taken at the radii $r$, $r'$ and $r''$ respectively, as in Fig. 17. In lieu of the former 26 ordinarily used, there is provided a special former $26^s$. This former $26^s$, instead of being provided with a vertical guide surface, is provided with a surface of revolution constructed about the center S and having the desired contour at any axial plane. The surface of revolution is such that the several radii thereof are the same as the corresponding radii of the cutter C to be formed. The former $26^s$ is provided with an undercut surface $26^t$ which is at the same angle as the undercut tooth faces of the cutter C. Cooperating with the former $26^s$ is a former pin $27^s$ of special form. At any horizontal plane the former pin $27^s$ has the same cross sectional shape as the tool 25, but the former pin is curved rearward at points above the center S of the former.

Under the control of the former $26^s$ and the former pin $27^s$ the cutting tool 25 is held at a distance $r$ from the center of the cutter C when the vertical part of the former pin $27^s$ is at a distance $r$ from the center S of the former. For a smaller radius such as $r'$, without special provision being made, the tool 25 would be in a position at the radius $r'$ from the blank. The tool would immediately start its inward relieving movement notwithstanding the fact that the blank tooth had not yet reached it, and the result would be the cutting of an incorrect relief line, as already fully explained in connection with Fig. 17. When using the construction illustrated in Figs. 20 and 21, this error is avoided by retarding the relieving movement of the tool. In accordance with the different operation now to be described, the relieving movement of the tool is not changed as to time but is changed as to position; that is, the tool 25, instead of being allowed to take a position at the radius $r'$ from the center, is caused to take a position at a radius which is greater by the distance $s'$. The distance $s'$ is such that the inward relieving movement of the tool, which starts immediately, will enable the tool to properly engage the tooth section $t'$ and properly cut the desired relief thereon. The tool 25 is held at the increased radius $r'+s'$ because of the peculiar curved shape of the former pin $27^s$ at its upper part. The former pin engages the edge of the former at a point along the inclined surface $26^t$, the point of engagement being at a higher elevation because of the inclination. The curvature is such that the vertical part of the pin is held at a distance $r'+s'$ from the center S of the former. Similarly, for the radius $r''$ the tool 25, instead of being allowed to take a position at the radius $r''$ from the center, is caused to take a position at a radius which is greater by the distance $s''$. The distance $s''$ is such that the inward relieving movement of the tool which starts immediately, will enable the tool to engage the tooth section $t''$ and properly cut the desired relief thereon. The increased radius $r''+s''$ is obtained by reason of the aforesaid curvature of the upper part of the former pin $27^s$. This curved part of the pin engages the former $26^s$ at another point along the surface $26^t$, this point being nearer the center and therefore at a still higher elevation.

A former such as $26^s$ illustrated diagrammatically in Fig. 25 would not be entirely practical for the reason that the upper part of the former pin would interfere with the former at places above the inclined surface $26^t$. A simpler and more practical former is shown in Fig. 26, this being marked $26^w$. It will be seen that this is the same in principle as the former $26^s$ but that the body of the former is below the surface $26^t$ instead of above it. This eliminates any interference with the curved part of the former pin $27^s$. The diagrammatic former $26^s$ is shown as having a radius equal to or exceeding the radius of the largest cutter which the machine is capable of cutting. The former $26^w$ as usually constructed, therefore, has a smaller radius such as $r'$.

It will be seen that the two independent variations are effected in the relation between the relieving movements of the tool and the rotative movement of the blank. One of these variations is dependent upon the longitudinal movements of the tool along the blank and the other of the variations is dependent upon the inward or outward movement of the tool whereby the blank is cut with different diameters. In the preferred embodiment of the invention, as shown and described, the first said variation is effected by changing the rotative movement of the blank and the second variation is effected by changing the relieving movements of the tool. It will be understood, however, that the invention is not limited to this exact construction, as any mechanism for effecting the required variations in the relationship would be within the scope of the invention.

The mechanisms for varying the relieving relation to properly cut undercut cutters are not herein claimed specifically, they being presented in my copending applications for machines for making formed milling cutters, Serial No. 323,114, filed Sept. 11th, 1919, Serial No. 469,266, filed May 13th, 1921, and Serial No. 469,267, filed May 13th, 1921, the last said application being a division of this present application. The methods of cutting undercut cutters as herein set forth are presented in my copending applications for methods of making milling cutters, Serial No. 323,112, filed Sept. 11th, 1919, Serial No. 323,113, filed Sept. 11th, 1919, and Serial No. 469,268, filed May 13th, 1921.

For moving the carriage longitudinally along the bed there is provided a screw 107 which engages a nut 108 carried by a bracket 109 depending from the carriage. The screw is supported at its left-hand end in a bearing 110 formed in a bracket 111 secured to the bed. Mounted in the bracket 111 is a transverse shaft 112 which is connected with the screw 107 by means of bevel gearing 113. At the front end of the shaft 112 is a hand wheel 114 by means of which the screw may be turned manually to move the carriage. In order that the carriage may be moved automatically to feed the tool from one cutting position to another, a suitable mechanism is provided. This mechanism is preferably adapted to feed the carriage intermittently, but it will be understood that as concerns certain phases of the invention I do not so limit myself inasmuch as the carriage may be moved continuously if desired. Mounted in the bracket 111 is a transverse bearing pin 115 upon which is rotatably mounted a sleeve 116. Loosely mounted on the sleeve near the inner end thereof is a gear 117 which meshes with a gear 118 on the shaft 112. Connected with this gear 117 is a ratchet wheel 119. Formed on the sleeve 116 near the outer end are gear teeth 120 which mesh with a gear 121 secured to the shaft 112. Keyed to the sleeve 116 is a ratchet wheel 122 similar to the ratchet wheel 119. Loosely mounted on the hub of the ratchet wheel 122 is a swinging arm 123. Pivotally connected with this arm near the lower end thereof is a link 124 which is adjustably connected at its left-hand end with an oscillating crank arm 125. The crank arm is secured to a transverse rock shaft 126 which is mounted in a bearing 127 and which carries at its rear end a lever 128. Carried by the lever at the upper end thereof is a roller 129 positioned to be engaged by a cam 130 on a longitudinal rotatable shaft 131. Mounted on the swinging arm 123 is a transverse pin 132 carrying two similar pawls 133 and 134 adapted respectively to engage the pawl wheels 119 and 122. Either ratchet can be thrown into or out of engagement with the corresponding wheel. The shaft 131 is rotated in the manner to be presently described, and it will be seen that at each rotation thereof the arm 128 and the crank arm 125 are oscillated. By means of the link 124 the oscillation of the crank arm 125 is transmitted to the plate 123, the extent of oscillation of the plate being adjustable by changing the connection between the link and the crank arm. By means of one or the other of the pawls 133 or 134, one of the ratchet wheels 119 or 122 is turned through a small angle, thus turning the shaft 112 and the lead screw 107 and moving the carriage. It will be seen that the carriage movement is relatively great when the pawl 133 is in use, and is relatively small when the pawl 134 is in use. By selecting the proper pawl and by adjusting the crank arm connection the desired amount of carriage movement may be obtained.

Preferably the rotation of the spindle and of the blank is stopped during the feeding movement of the tool. I therefore provide two alternately acting mechanisms, one serving to rotate the spindle and the blank through one revolution, or approximately one revolution, and also serving to effect the relieving movements of the tool, and the other mechanism serving to effect the longitudinal feeding of the tool and preferably also serving to effect other movements to be described.

The mechanism for rotating the spindle and the blank has already been described in part, this mechanism including the transverse shaft 11, the worm 10 and the worm wheel 9. The machine is provided with a main power shaft 135 adapted to be driven in any suitable way, as for instance by means of a belt on a pulley 136. Rotatably mounted on the shaft 135 is a gear 137, this gear being connectible to the shaft by means of a splined clutch element 138. The gear 137 meshes with a gear 139 on a longitudinal shaft 140. Secured to the shaft 140 is a long gear 141, this gear being surrounded by a sleeve 142 which is open at the forward upper side. Slidably and rotatably mounted on the sleeve 142 is a bushing 143, this bushing 143 being provided with ears between which a gear 144 is rotatably mounted. This gear meshes with the aforesaid gear 141 on the shaft 140. A third longitudinal shaft 145 is provided, this shaft carrying a series of differently diametered gears 146. The shaft 145 is connected with the aforesaid shaft 11 by means of bevel gearing 147. The bushing 143 can be moved angularly and longitudinally on the bushing 142 so as to bring the gear 144 into mesh with any one of the differently diametered gears 146. A spring-pressed plunger 148 carried by the sleeve 143 is adapted to enter any one of a series of apertures in the sleeve 142 so as to hold the gear 144 in proper position to mesh with any desired one of the gears 146. It will be seen that by this construction the shaft 145 together with the shaft 11 can be driven from the shaft 135 at any one of a series of speeds.

Mounted in alinement with the main power shaft 135 is a short longitudinal shaft 149. The shaft 149 carries a clutch element which is adapted to be engaged by the aforesaid splined clutch element 138 on the shaft 135. When the clutch element is in its right-hand position as viewed in Fig. 4, it drives the gear 137 and the several parts connected therewith. When the clutch element is in its left-hand position it drives the shaft 149. A transverse shaft 150 is suitably mounted in bearings in the bed and this shaft is connected with the shaft 149 by means of bevel gearing 151. The shaft 150 carries a worm 152 which meshes with a worm wheel 153 on the aforesaid longitudinal shaft 131.

In the operation of the machine, it is desirable for the sleeve 79 and for the shaft 131 to each make one complete revolution alternately in succession. In order that the desired alternate movements of the sleeve and shaft may take place, I provide automatic mechanism for shifting the clutch element 138. The mechanism used is similar in principle to that shown and described in my Patent No. 1,273,903 for driving mechanism, dated July 30th, 1918. The clutch element 138 is provided with an annular groove into which fit rollers or projections on a forked lever 154. This lever is transversely pivoted on the frame and is provided with a roller 155 by means of which it may be moved. Mounted in the frame above the forked lever 154 is a transverse rock shaft 156. This rock shaft carries at its rear end an arm 157 in which is mounted a spring-pressed plunger 158. As shown in Fig. 4, this plunger is V-shaped at its lower end and is adapted to engage the roller 155. Secured to the rock shaft 156 at the front end thereof is a lever 159 having upper and lower arms. The upper arm carries a roller 160 which is adapted to be engaged by a cam plate 161 secured to a cam drum 162 mounted on the sleeve 79. The lower arm of the lever 159 carries a roller 163 which is adapted to be engaged by a cam plate 164 secured to a cam drum 165 mounted on the shaft 131. When the parts are in the positions shown in Figs. 3, 4 and 6 the sleeve 79 is in motion and continues to turn until the cam plate 161 engages the roller 160 and turns the lever 159 in the clockwise direction, as viewed in Fig. 3, or in the counter-clockwise direction, as viewed in Fig. 4. This movement forces the spring-pressed plunger 158 over the top of the roller 155 and thus tends to swing the lever 154 in the direction to shift the clutch element into position to drive the shaft 149. When the shaft 149 is thus driven, the shaft 131 with the cam drum 165 thereon is driven in the direction indicated by the arrow in Fig. 6. This movement continues until the cam plate 164 engages the roller 163 and swings the lever 169 in the counter-clockwise direction, as viewed in Fig. 3, or in the clockwise direction, as viewed in Fig. 4. In other words, the cam plate 164 serves to restore the lever to the position which is shown in the drawings. The spring-pressed plunger 158 is again moved over the top of the roller 155 and tends to move the lever 154 in the direction to move the clutch element 138 into position to drive the gear 137.

Preferably, I do not depend solely upon the shifting of the lever 159 for the timing of the movements of the clutch element 138. As illustrated, the lever 154 is provided with opposite fingers 166 and 167 which are adapted to be engaged respectively by latches 168 and 169. These latches are held in engagement with the fingers by means of a spring 170. Referring to Fig. 4, it will be seen that the latch 168 serves to prevent the movement of the lever 154 toward the left even after the arm 157 has been moved to its right-hand position. Similarly, the latch 169 serves to prevent the movement of the lever 154 toward the right even after the arm 157 has been moved to its left-hand position. For releasing the latch 168 there is provided a vertically slidable rod 171 which is normally pressed upward by a spring 172. The upper end of the rod is engaged by an arm 173 on a short transverse rock shaft 174. This rock shaft carries at its front end a lever 175. Mounted on the lever is a roller adapted to be engaged by a cam projection 176 secured to the worm wheel 9. The cam projection 176 is so positioned with respect to the cam plate 161 that the plate first engages the roller 160 and moves the arm 157 into position to shift the lever 154. Subsequently, when the spindle 79 has completed the desired revolution, the cam projection 176 engages the roller on the lever 175, thus turning the rock shaft and the lever 173 and moving the rod 171 to release the latch 168. The latch having been released, the lever 154 turns under the action of the spring-pressed plunger 158 and disengages the clutch element from the gear 137 and engages it with the shaft 149. The latch 169 is mounted on a short transverse rock shaft 177 which carries at its front end a lever 178. At the upper end of the lever 178 is a roller which is positioned to be engaged by a cam projection 179 on the cam drum 165. The cam projection 179 is so positioned with respect to the main cam plate 164 that the plate first engages the roller 163 and moves the arm 158 into position to shift the lever 154. Subsequently, when the shaft 131 has completed the desired revolution, the cam projection 179 engages the roller and the lever 178, thus turning the rock shaft 177 to release the latch 169. The latch having been released, the lever 154 turns under the action of the spring-pressed plunger 158 and disengages the clutch element from the shaft 149 and engages it with the gear 137. It will be seen that by means of the mechanism described the spindle 79 serves to stop itself after making a complete revolution and to start the shaft 131. Similarly the shaft 131, after making one complete revolution, serves to stop itself and start the spindle 79. Thus these two parts operate alternately in continuous succession.

It is desirable to feed the tool longitudinally while out of engagement with the blank, that is, when the tool is opposite the groove between two teeth of the blank. The blank is therefore preferably mounted in the spindle so that at the position of stopping the tool will be opposite a groove. The grooves are helical but the spindle and the blank are supplementally turned at each longitudinal movement this supplemental turning exactly compensating for the inclination of the grooves and insuring the stopping of the blank with a groove opposite the tool.

Preferably the tool is withdrawn at the time of each longitudinal movement, the former pin also being withdrawn from engagement with the former. This withdrawal is effected by mechanism operated by the shaft 131, the withdrawal being thus properly timed with respect to the feeding movement. Associated with the slide 24 is an abutment 180 which is engaged by the upper end of a lever 181 longitudinally pivoted to the carriage 21. The lower end of the lever is provided with a roller which is adapted to be engaged by a cam plate 182 on a cam disk 183 secured to the shaft 131. At the beginning of the rotation of the shaft 131 the cam plate 182 engages the roller on the lever 181 and swings it in the counterclockwise direction, thus moving the abutment 180 together with the slide 24 toward the front. In this way the tool 25 is withdrawn from the blank and the former pin 27 is withdrawn from the former 26. As the shaft 131 continues to rotate, the cam 130 operates the feeding mechanism in the way already described, and the carriage is moved longitudinally along the bed. After that the cam plate 182 permits the lever 181 to return to the position shown, and the slide 24 is permitted to move rearward carrying the tool 25 and the former pin 27 to their operative positions. It will be seen that by thus withdrawing the former pin from the former at the time of longitudinal movement, I avoid any difficulties incident to forcing the former pin along the former while in contact therewith. If the former pin were maintained in contact with the former at all times difficulty would be experienced in effecting the longitudinal movement, particularly at places where the contour of the former is sharply inclined.

Preferably the former pin is restored to engagement with the former by a relatively slow movement with a minimum of pressure, so that there will be no tendency to bend or distort the pin or to secure uneven contact between the pin and the former. For this purpose I provide a mechanism for returning the carriage which is entirely independent in its operation from the mechanism for withdrawing it. The before mentioned abutment 180 is not connected directly to the slide 24 but is connected to a second slide 184 which is transversely movable independently of the first slide 24. Springs 185 are interposed between the slide 184 and the carriage 21 and these springs tend to move the slide 184 rearward, thus holding the abutment 180 at all times in engagement with the lever 181.

The two slides 24 and 184 are ordinarily connected by a lock. As shown most clearly in Figs. 3, 8 and 9, the lock includes a plate 186 located in a recess in the top of the slide 24. The plate is provided with a boss which projects downward through a slot in the slide, and threaded into this boss is a vertical stud 187. This stud extends through and closely fits an aperture in the slide 184. Pivoted to the slide 184 are two small bell-crank levers 188, these levers having horizontal upper arms which engage a collar on the stud 187. The lower ends of the levers are adapted to be engaged by a tapered cam bushing 189 vertically movable on the stud. When the bushing 189 is in its lower position, as shown, the levers 188 are forced outward, thus drawing the stud 187 downward and forcing the plate 186 into clamping engagement with the slide 24. In this way the slide 24 is firmly connected with the slide 184. When the bushing 189 is in its raised position, the levers 188 swing inward, thus permitting the stud 187 to move upward and release the plate 186 from its clamping engagement with the slide 24. For moving the bushing 189 there is provided a forked lever 190 having projections engaging slides or notches in the bushing. This lever is secured to a longitudinal rock shaft 191 mounted in bearings in the carriage 21. Connected with the lever 190 is a lever 192 having a roller which is adapted to be engaged by cam plates 193 and 194 secured to a cam disk 195 mounted on the shaft 131. It will be seen that as the shaft 131 rotates, the cam plate 193 engages the roller on the lever 192, thus moving the lever 190 and the cam bushing 189 upward and releasing the lock. Subsequently the roller is engaged by the cam plate 194, thus moving the cam bushing 189 downward and re-engaging the lock.

I have already stated that a supplemental mechanism is provided for returning the slide after it has been withdrawn in the way before described. Preferably, in order that this supplemental returning mechanism may operate without being affected in any way by the return movement of the slide 184, and in order further that the slide 24 may be returned with a minimum of effort, I provide a supplemental means for supporting the slide 24 after it has been unlocked from the slide 184. As illustrated, the carriage 21 is provided near its front and rear with transverse pivot pins 196 and 197. The carriage is slotted adjacent the pins, and in these slots are positioned arms 198 and 199 respectively pivoted on the said pins. The arms are respectively provided with rollers 200 and 201 which are adapted to engage the bottom of the slide 24. The arms are connected by pivoted links 202, and these links in turn are connected by a transverse yoke 203. The yoke 203 is provided with slots or notches in which fit pivot bosses 204 projecting upward from the lever 190. The result is that when the lever 190 is swung upward to release the lock, the arms 198 and 199 are swung in a clockwise direction, thus swinging the rollers 200 and 201 upward so as to lift the slide 24 off from the slide 184 and support it independently. The actual raising of the slide may be but a few thousandths of an inch. For returning the slide 24 rearward as soon as it has been released by the lock and elevated by the rollers, there are provided coil springs 205. Preferably these springs are located in long transverse cylindrical apertures 206 in the slide 24. The springs abut at their rear ends against plugs 207 threaded into the apertures, and at their front ends abut against heads 208 on transverse rods 209. The rods 209 extend through central openings in the plugs 207 and are connected at their rear ends with brackets 210 on the carriage 21. Preferably the heads 208 are in the form of pistons and the forward parts of the apertures 206 constitute cylinders 211 in which the pistons 208 fit and move. Secured to the slide 24 is a casting 212 having a transverse passageway 213 which communicates at its ends with cylinders 211. Also formed in the casting 212 is a fluid reservoir 214. Leading from the passageway 213 into the reservoir 214 is a restricted aperture 215 which is preferably controlled by an adjustable needle valve 216. Leading from the reservoir 214 back to the passageway 213 is an automatic check valve 217. The cylinders 211 together with the passageway 213 and a part of the reservoir 214 are filled with a suitable fluid, which is preferably a liquid such as oil. It will be seen that as soon as the carriage 21 has been elevated and released from the slide 184, the springs 206 tend to move it rearward. This tendency, however, is resisted by the engagement of the pistons 208 with the liquid in the cylinders. This engagement forces the liquid out of the cylinders into the passageway 213 and thence into the reservoir 214 through the restricted aperture 215. The liquid can pass through this aperture only relatively slowly, and thus the return movement of the slide is made to take place very slowly. When the slide is moved quickly forward at the time of next feeding, the check valve 217 opens to permit the liquid to flow from the reservoir 14 back to the passageway 213 and the cylinders 211. The slow return movement causes the former pin to engage the former gently and with a minimum force, so that there is little or no tendency to bend or deflect the parts.

It will be noted that the several cams 130, 182, 193 and 194 are so positioned in relation to each other that the operations which they respectively control take place in the following order. First the two slides 184 and 24 are moved backward in unison, they being still locked together. Then the slide 24 is unlocked from the slide 184 and is at the same time elevated on the rollers 200 and 201. At or about the same time the carriage is moved longitudinally to feed the tool to a new cutting position. Then the slide 184 is permitted to return to its normal position. In the meantime the slide 24 is being moved slowly rearward under the control of the springs 205 and the fluid regulating mechanism. After the completion of the return movement of the slide 24, the rollers 200 and 201 are lowered and the slide is again locked to the slide 184.

In order that the slide 24 may be manually released from the slide 184, I provide a lever 218 which is secured to the rock shaft 191. For moving the lever 218 there is provided a wrench 218ᵃ as shown in Fig. 9. It will be seen that the operator, by moving the lever 218, can turn the rock shaft, thus raising the cam sleeve 189 and releasing the lock. For moving the slide 24 forward manually, there is provided a segmental gear 219 pivoted to the carriage and meshing with a rack 220 secured to the slide. Connected with the segmental gear 219 is a hand lever 221. It will be seen that by lowering or raising the handle the slide 24 can be moved forward or backward as desired.

It is believed that the general operation of the machine will be clear from the foregoing description and that a very brief summary will suffice.

A former 26 is provided having the desired contour and, in the case of an undercut cutter, having the desired relation to the cutter radius, as already explained. A blank is put in place, this blank having been previously grooved and roughed out in any usual or preferred manner. The gearing 78 is adjusted in accordance with the degree of inclination of the helical teeth on the blank and the gearing 56—57 is adjusted in accordance with the number of teeth on the blank. By means of the hand wheels 40 and 114, the tool is adjusted transversely and longitudinally into engagement with the blank at the right-hand end thereof. Then the machine is started, the spindle 79 and the operating shaft 131 operating alternately in succession. During the rotative movement of the blank relieving movements of the tool are effected as described, thus cutting the desired relief on the teeth of the blank. After one complete revolution of the blank the rotative movement of the spindle is stopped and also the relieving movements of the tool. The carriage is then fed longitudinally toward the left, the blank turning slightly in conformity with the helical teeth. Just prior to the longitudinal movement the tool slide is withdrawn, thus withdrawing the tool from the blank and the former pin from the former. After the longitudinal movement, the tool slide is moved slowly in the opposite direction, thus gently returning the former pin to the former which is engaged at a new position. The tool assumes a corresponding position with respect to the blank. After this movement of the tool and former pin the blank is again rotated through one revolution and these movements are repeated alternately in succession until the blank is completely formed. In the case of a cutter with undercut teeth, the relieving movements of the tool are changed in accordance with changes in diameter as already described, to follow the undercut.

It frequently happens that a former such as 26 is not available and that in lieu thereof the operator is furnished with a former such as 26ª having a reversed shape which is the shape of the piece to be cut by the cutter to be formed. When a former such as 26ª is to be used a somewhat modified machine is provided, as shown in Figs. 27 and 28. This machine is the same as that already described except for differences in the carriage and transverse slides together with the associated parts. For the sake of simplicity I have shown in Figs. 27 and 28 a cutter A' having straight instead of helical teeth, but it will be understood that this is immaterial as concerns the alternate construction now to be described.

In lieu of the slide 24 the alternate machine has a slide 24ª which is provided with a bracket 222 adapted to hold a former pin 27ª in such a way that it can engage the rear side of the former 26ª. When the cutting tool 25 is symmetrical, as shown, the former pin 27ª is also symmetrical and has the same shape as the tool.

In lieu of the lever 181, there is provided a lever 181ª having its upper end positioned oppositely and engaging an oppositely positioned abutment 180ª. Mounted on the shaft 131 is a large cam disk 183ª and this is provided with a cam plate 182ª. The cam plate 182ª serves to rock the lever 181ª in the clockwise direction, thus moving the slide 184 and the slide 24ª rearward instead of forward. This rearward movement is possible because of the fact that the cutting tool 25 is always opposite a groove in the blank A' when the tool is being shifted. The locking mechanism between the two slides 184 and 24ª is the same as already described, as is also the roller mechanism for elevating the slide 24ª out of engagement with the slide 184. This locking mechanism is released after the slides have been moved forward as stated, and the slide 24ª is elevated on the rollers. For returning the slide 24ª forward to its operative position, a mechanism may be provided similar to that already described for the slide 24. In the drawings, however, I have shown a somewhat simpler mechanism which may be suitable for many classes of work. I have shown coil springs 205ª which are located in transverse apertures 206ª in the slide 24ª. These springs abut at their rear ends against the brackets 210 on the carriage 21 and abut at their front ends against plugs 223 fitted into the apertures. The construction illustrated in Figs. 27 and 28 is not herein claimed specifically, it being presented in my co-pending application for metal cutting machines, Serial No. 399,716, filed July 29th, 1920, as a division of this application.

I have already stated that the cutting tool need not necessarily be a non-rotary tool. In Fig. 29 I have shown a mechanism including a rotary milling cutter which may be substituted for the tool post 42 and the tool 25 carried thereby. As illustrated, there is a bracket 224 adapted to be engaged by the bolts 43 and thus secured to the slide 38. Rotatably mounted in bearings in the bracket 224 is a longitudinal spindle 225 upon which is mounted a milling cutter 226. As illustrated, the bracket 224 also carries a rotatable drive spindle 227 which is connected with the spindle 225 by means of spur gearing 228. Power is transmitted to the drive spindle 227 by means of a belt on a pulley 229.

In conjunction with the milling cutter 226 there is provided a former pin having a shape which is the same or approximately the same as the effective shape of the milling cutter. Preferably the former pin and the cutter are related in the way described in my aforesaid Patent No. 1,348,303. The method that is followed in the intermittent feeding of the tool or the former pin or both as herein described is presented in my aforesaid copending application for method of making milling cutters, Serial No. 326,875, filed Sept. 27th, 1919. The hereindescribed mechanism whereby the tool or the former pin or both of them are relatively moved intermittently in such a way as to follow the contour of the former is one of general utility and claims to this mechanism considered as a mechanical movement are presented in my copending application for mechanical movements, Serial No. 399,715, filed July 29th, 1920.

What I claim is:

1. The combination of a rotatable blank-carrying spindle, drive mechanism for the spindle, a tool carriage, mechanism for feeding the carriage longitudinally of the spindle and blank, and mechanism supplemental to the drive mechanism for varying the spindle rotation without interrupting the power connection between the drive mechanism and the spindle.

2. The combination of a rotatable blank-carrying spindle, drive mechanism for the spindle, a cutting tool, mechanism for effecting relative feeding movement between the tool and the blank longitudinally of the latter, and mechanism supplemental to the drive mechanism for varying the spindle rotation without interrupting the power connection between the drive mechanism and the spindle, the said mechanism being operable to vary the rotation while the spindle is in motion.

3. The combination of a rotatable blank-carrying spindle, drive mechanism for the spindle, a cutting tool, mechanism for effecting relative feeding movement between the tool and the blank longitudinally of the latter, and mechanism supplemental to the drive mechanism for varying the spindle rotation without interrupting the power connection between the drive mechanism and the spindle the said mechanism being adjustable to carry the rotation by either increasing or reducing it.

4. The combination of a rotatable blank-carrying spindle, drive mechanism for the spindle, a cutting tool, mechanism for effecting relative feeding movement between the tool and the blank longitudinally of the latter, and mechanism supplemental to the drive mechanism for varying the spindle rotation without interrupting the power connection between the drive mechanism and the spindle, the said mechanism being adjustable to vary the rotation at different rates.

5. The combination of a rotatable blank-carrying spindle, drive mechanism for the spindle, a cutting tool, mechanism for effecting relative feeding movement between the tool and the blank longitudinally of the latter, mechanism including gearing interposed between the drive mechanism and the spindle, and means supplemental to the drive mechanism for supplementally moving an element of the gearing to vary the spindle rotation.

6. The combination of a rotatable blank-carrying spindle, drive mechanism for the spindle, a cutting tool, mechanism for effecting relative feeding movement between the tool and the blank longitudinally of the latter, and mechanism including a relatively movable rack and pinion interposed between the drive mechanism and the spindle for varying the rotation of the latter.

7. The combination of a rotatable blank-carrying spindle, drive mechanism for the spindle, a cutting tool, mechanism for effecting relative feeding movement between the tool and the blank longitudinally of the latter, and mechanism including bodily rotatable gearing interposed between the drive mechanism and the spindle for varying the rotation of the latter.

8. The combination of a rotatable blank-carrying spindle, drive mechanism for the spindle, a cutting tool, mechanism for effecting relative feeding movement between the tool and the blank longitudinally of the latter, and mechanism including a rack and bodily rotatable gearing interposed between the drive mechanism and the spindle for varying the rotation of the latter.

9. The combination of a rotatable blank-carrying spindle, drive mechanism for the spindle, a cutting tool, mechanism for effecting relative feeding movement between the tool and the blank longitudinally of the latter, and mechanism interposed between the spindle and the drive mechanism and supplemental to the latter for varying the spindle rotation, the said mechanism comprising a shaft, two relatively rotatable sleeves mounted on the shaft, a rack carried by the shaft, gearing meshing with the rack and connecting the two sleeves and means for effecting relative movement between the rack and the gearing to turn one sleeve relatively to the other.

10. The combination of a rotatable blank-carrying spindle, drive mechanism for the spindle, a cutting tool, mechanism for effecting relative feeding movement between the tool and the blank longitudinally of the latter, and mechanism interposed between the spindle and the drive mechanism and supplemental to the latter for varying the spindle rotation, the said mechanism comprising a shaft, two relatively rotatable sleeves mounted on the shaft, a rack carried by the shaft, interchangeable gearing meshing with the rack and connecting the two sleeves and means for effecting relative movement between the rack and the gearing to turn one sleeve relatively to the other.

11. The combination of a rotatable blank-carrying spindle, drive mechanism for the spindle, a cutting tool, mechanism for effecting relative feeding movement between the tool and the blank longitudinally of the latter, and mechanism interposed between the spindle and the drive mechanism and supplemental to the latter for varying the spindle rotation, the said mechanism comprising a shaft, two relatively rotatable sleeves mounted on the shaft, a rack carried by the shaft, gearing meshing with the rack and including a worm on one sleeve and a worm wheel on the other and means for effecting relative movement between the rack and the gearing to turn one sleeve relatively to the other.

12. The combination of a rotatable blank-carrying spindle, drive mechanism for the spindle, a cutting tool, mechanism for effecting relative feeding movement between the tool and the blank longitudinally of the latter, and mechanism interposed between the spindle and the drive mechanism and supplemental to the latter for varying the spindle rotation, the said mechanism comprising a shaft, two relatively rotatable sleeves mounted on the shaft, a rack carried by the shaft, disengageable gearing meshing with the rack and connecting the two sleeves, means for effecting relative movement between the rack and the gearing to turn one sleeve relative to the other and means for clamping the two sleeves together.

13. The combination of a rotatable blank-carrying spindle, drive mechanism for the spindle, a tool carriage, mechanism for feeding the carriage longitudinally of the spindle and blank, mechanism interposed between the spindle and the drive mechanism and supplemental to the latter for varying the spindle rotation, and means connected with the carriage for operating the last said mechanism.

14. The combination of a rotatable blank-carrying spindle, means for rotating the spindle, a cutting tool, mechanism for effecting relative feeding movement between the tool and the blank longitudinally of the latter, and means for varying the spindle rotation in accordance with said feeding movement.

15. The combination of a rotatable blank-carrying spindle, means for rotating the spindle, mechanism for effecting intermittent relative feeding movements between the tool and the blank longitudinally of the latter, and means controlled in accordance with said feeding movements for varying the spindle rotation.

16. The combination of a rotatable blank-carrying spindle, a cutting tool, mechanism for effecting relative movements between the tool and the blank at a normally uniform frequency, and mechanism for varying the spindle rotation relatively to the aforesaid movements between the tool and the blank.

17. In a relieving machine, the combination of a rotatable blank-carrying spindle, a cutting tool, mechanism for effecting relative relieving movements of the tool at a normally uniform frequency, and mechanism for varying the spindle rotation relatively to the aforesaid movements between the tool and the blank.

18. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, and mechanism for varying the spindle rotation relatively to the uniform relieving movements to effect relieving in conformity with helical teeth on the blank.

19. In a relieving machine, the combination of a rotatable blank-carrying spindle, a cutting tool, mechanism for feeding the tool longitudinally of the blank, mechanism acting independently of the feeding mechanism for effecting relieving movements of the tool at a normally uniform frequency, and mechanism for varying the spindle rotation relatively to the uniform relieving movements to effect relieving in conformity with helical teeth on the blank.

20. In a relieving machine, the combination of a rotatable blank-carrying spindle, driving mechanism for the spindle, a cutting tool, mechanism for feeding the tool longitudinally of the blank, mechanism driven by the said drive mechanism for effecting relieving movements of the tool at a normally uniform frequency, and mechanism interposed between the driving mechanism and the spindle for varying the spindle rotation relatively to the driving mechanism and the relieving mechanism in conformity with helical teeth on the blank.

21. In a relieving machine, the combination of a rotatable blank-carrying spindle, driving mechanism for the spindle, a cutting tool, mechanism for feeding the tool longitudinally of the blank, mechanism including change gearing driven by the said drive mechanism for effecting relieving movements of the tool at a normally uniform frequency, and mechanism interposed between the driving mechanism and the spindle for varying the spindle rotation relatively to the driving mechanism and the relieving mechanism in conformity with helical teeth on the blank.

22. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, and mechanism for varying the spindle rotation relatively to the uniform relieving movements to effect relieving in conformity with helical teeth on the blank having any desired degree of inclination.

23. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, and mechanism for varying the spindle rotation relatively to the uniform relieving movements to effect relieving in conformity with helical teeth on the blank inclined in either direction.

24. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, and mechanism dependent upon the longitudinal movement for varying the spindle rotation relatively to the uniform relieving movements.

25. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, and mechanism dependent upon the longitudinal movement for varying the spindle rotation relatively to the uniform relieving movements and at any one of a plurality of rates.

26. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, and mechanism dependent upon the longitudinal movement for either advancing or retarding the spindle rotation relatively to the uniform relieving movements to conform to either right-hand or left-hand helical teeth on the blank.

27. In a relieving machine, the combination of a rotatable blank-carrying spindle, a carriage movable longitudinally of the spindle axis, a cutting tool carried by the carriage, mechanism acting independently of the carriage movements for effecting relieving movements of the tool at a normally uniform frequency, and mechanism connected with the carriage for varying the spindle rotation relatively to the uniform relieving movements in conformity with helical teeth on the blank.

28. In a relieving machine, the combination of a rotatable blank-carrying spindle, a carriage movable longitudinally of the spindle axis, a cutting tool carried by the carriage, mechanism acting independently of the carriage movements for effecting relieving movements of the tool at a normally uniform frequency, and mechanism connected with the carriage for varying the spindle rotation relatively to the uniform relieving movements in conformity with helical teeth on the blank, the connection between the said mechanism and the carriage being adjustable to permit preliminary adjustment of the carriage independently of the spindle.

29. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including gearing, and means dependent upon the feeding movement for supplementally moving an element of the gearing to vary the spindle rotation relatively to the uniform relieving movements so as to effect relieving in conformity with helical teeth on the blank.

30. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequently, drive mechanism for the spindle including gearing, and means dependent upon the feeding movement for supplementally moving an element of the gearing to vary the spindle rotation relatively to the uniform relieving movements so as to effect relieving in conformity with helical teeth on the blank having any desired degree of inclination.

31. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including gearing, and means dependent upon the feeding movement for supplementally moving an element of the gearing to vary the spindle rotation relatively to the uniform relieving movements so as to effect relieving in conformity with helical teeth on the blank inclined in either direction.

32. In a relieving machine, the combination of a rotatable blank-carrying spindle, a carriage movable longitudinally of the spindle axis, a cutting tool carried by the carriage, mechanism acting independently of the carriage movements for effecting relieving movements of the tool at a normally uniform frequency, drive mechanism for the spindle including gearing, and mechanism connected with the carriage for supplementally moving an element of the gearing to vary the spindle rotation relatively to the uniform relieving movements so as to effect relieving in conformity with helical teeth on the blank.

33. In a relieving machine, the combination of a rotatable blank-carrying spindle, a carriage movable longitudinally of the spindle axis, a cutting tool carried by the carriage, mechanism acting independently of the carriage movements for effecting relieving movements of the tool at a normally uniform frequency, drive mechanism for the spindle including gearing and a slidable rack meshing therewith, and means connected with the carriage for sliding the rack to vary the spindle rotation relatively to the uniform relieving movements so as to effect relieving in conformity with helical teeth on the blank.

34. In a relieving machine, the combination of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, drive mechanism for the spindle including bodily rotatable gearing, and means dependent upon the feeding movement for supplementally moving an element of the gearing to vary the spindle rotation relatively to the uniform relieving movements so as to effect relieving in conformity with helical teeth on the blank.

35. In a relieving machine, the combination of a rotatable blank-carrying spindle, a carriage movable longitudinally of the spindle axis, a cutting tool carried by the carriage, mechanism acting independently of the carriage movements for effecting relieving movements of the tool at a normally uniform frequency, drive mechanism for the spindle including gearing and a slidable rack meshing therewith, the said gearing and rack being bodily rotatable, and means connected with the carriage for sliding the rack to vary the spindle rotation relatively to the uniform relieving movements so as to effect relieving in conformity with helical teeth on the blank.

36. The combination as described, of a rotatable blank-carrying spindle, a cutting tool, means for feeding the tool longitudinally of the spindle, automatic mechanism including a normally stationary former and a former pin longitudinally movable with the tool for moving the tool inward or outward as longitudinal movement takes place so as to cut the blank with a predetermined contour differing from a straight line and corresponding to that of the former, and means for adjusting the former independently of the former pin longitudinally of the spindle.

37. The combination as described, of a rotatable blank-carrying spindle, a cutting tool, means for feeding the tool longitudinally of the spindle, automatic mechanism including a normally stationary former and a former pin longitudinally movable with the tool for moving the tool inward or outward as longitudinal movement takes place so as to cut the blank with a predetermined contour differing from a straight line and corresponding to that of the former, a longitudinal slide to which the former is secured, and a screw for adjusting the slide.

38. The combination as described, of a rotatable blank-carrying spindle, a cutting tool, means for feeding the tool longitudinally of the spindle, automatic mechanism including a normally stationary former and a former pin longitudinally movable with the tool for moving the tool inward or outward as longitudinal movement takes place so as to cut the blank with a predetermined contour differing from a straight line and corresponding to that of the former, a support for the former having a longitudinal shoulder, and means for drawing the former laterally against the shoulder.

39. The described combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, and mechanism for effecting relieving movements of the tool relatively to the slide in timed relation to the blank rotation, the said mechanism accurately timing the relieving movements notwithstanding inward or outward movements of the tool under the control of the contour mechanism.

40. The described combination in a relieving machine, of a rotatable blank-carrying spindle, a carriage movable longitudinally of the spindle axis, a transversely movable slide on the carriage, a cutting tool carried by the slide, mechanism including a former and former pin for causing the slide and tool to move transversely as the carriage moves longitudinally so as to cut the blank with a predetermined contour differing from a straight line, and mechanism for effecting relieving movements of the tool relatively to the slide in timed relation to the blank rotation and in conformity with the helical teeth on the blank, the said mechanism serving to accurately time the relieving movements notwithstanding inward or outward movements of the tool under the control of the contour mechanism.

41. The described combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, mechanism for effecting relieving movements of the tool relatively to the slide in timed relation to the blank rotation, the said mechanism accurately timing the relieving movements notwithstanding inward or outward movements of the tool under the control of the contour mechanism, and means for preliminarily adjusting the tool toward or from the blank independently of the contour and relieving mechanisms.

42. The described combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, and mechanism including a relieving cam carried by the slide for effecting relieving movements of the tool relatively to the slide in timed relation to the blank rotation and in conformity with the helical teeth on the blank, the said mechanism serving to accurately time the relieving movements notwithstanding inward or outward mechanism.

43. The described combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, and mechanism for effecting relieving movements of the tool relatively to the slide in timed relation to the blank rotation and in conformity with the helical teeth on the blank, the said mechanism including a relieving cam carried by the slide and a transverse splined shaft carried by the carriage for driving the cam and the said mechanism serving to accurately time the relieving movements notwithstanding inward or outward movements of the tool under the control of the contour mechanism.

44. The combination in a relieving machine, of a rotatable blank-carrying spindle, a cutting tool, mechanism for effecting relative feeding movement between the tool and the blank longitudinally of the latter, mechanism for moving the tool inward or outward during the feeding movement to cut the blank with a predetermined contour differing from a straight line, and mechanism for effecting relieving movements of the tool with respect to the contour mechanism in timed relation to the blank rotation and in comformity with helical teeth on the blank, the said mechanism serving to accurately time the relieving movements notwithstanding inward or outward movements of the tool under the control of the contour mechanism.

45. The combination in a relieving machine, of a rotatable blank-carrying spindle, a cutting tool, mechanism for feeding the tool longitudinally of the blank, mechanism for moving the tool inward or outward during the feeding movement to cut the blank with a predetermined contour different from a straight line, and mechanism for effecting relieving movements of the tool with respect to the contour mechanism in timed relation to the blank rotation and in conformity with helical teeth on the blank, the said mechanism serving to accurately time the relieving movements notwithstanding inward or outward movements of the tool under the control of the contour mechanism.

46. The combination in a relieving machine, of a rotatable blank-carrying spindle, a non-rotary cutting tool, mechanism for effecting relative feeding movement between the tool and the blank longitudinally of the latter, mechanism for moving the tool inward or outward during the feeding movement to cut the blank with a predetermined contour differing from a straight line, and mechanism for effecting relieving movements of the tool with respect to the contour mechanism in timed relation to the blank rotation and in conformity with helical teeth on the blank, the said mechanism serving to accurately time the relieving movements notwithstanding inward or outward movements of the tool under the control of the contour mechanism.

47. The combination in a relieving machine, of a rotatable blank-carrying spindle, a cutting tool, mechanism for effecting relative feeding movement between the tool and the blank longitudinally of the latter, mechanism for moving the tool inward or outward during the feeding movement to cut the blank with a predetermined contour differing from a straight line, mechanism for effecting relieving movements of the tool with respect to the contour mechanism in timed relation to the blank rotation, and means dependent upon the longitudinal movement for varying the relation between the relieving movements of the tool and the rotative movement of the blank.

48. The combination in a relieving machine, of a rotatable blank-carrying spindle, a cutting tool, mechanism for effecting relative feeding movement between the tool and the blank longitudinally of the latter, mechanism for moving the tool inward or outward during the feeding movement to cut the blank with a predetermined contour differing from a straight line, mechanism for effecting relieving movements of the tool with respect to the contour mechanism in timed relation to the blank rotation, and means dependent upon the longitudinal movement for varying the relation between the relieving movements of the tool and the rotative movement of the blank at any one of a plurality of rates.

49. The combination in a relieving machine, of a rotatable blank-carrying spindle, a cutting tool, mechanism for effecting relative feeding movement between the tool and the blank longitudinally of the latter, mechanism for moving the tool inward or outward during the feeding movement to cut the blank with a predetermined contour differing from a straight line, mechanism for effecting relieving movements of the tool with respect to the contour mechanism in timed relation to the blank rotation, and means dependent upon the longitudinal movement for varying the relation between the relieving movements of the tool and the rotative movement of the blank to conform to either right-hand or left-hand helical teeth on the blank.

50. The combination in a relieving machine, of a rotatable blank-carrying spindle, a cutting tool, mechanism for effecting relative feeding movement between the tool and the blank longitudinally of the latter, automatically acting mechanism for moving the tool inward or outward during the feeding movement to cut the blank with a predetermined contour differing from a straight line, and mechanism for effecting relieving movements of the tool with respect to the contour mechanism in timed relation to the blank rotation and in conformity with helical teeth on the blank, the said mechanism serving to accurately time the relieving movements notwithstanding inward or outward movements of the tool under the control of the contour mechanism.

51. The combination in a relieving machine, of a rotatable blank-carrying spindle, a cutting tool, mechanism for effecting relative feeding movement between the tool and the blank longitudinally of the latter, mechanism including a former and former pin for causing the tool to move inward or outward during the feeding movement to cut the blank with a predetermined contour differing from a straight line, and mechanism for effecting relieving movements of the tool with respect to the former and former pin in timed relation to the blank rotation and in conformity with helical teeth on the blank, the said mechanism serving to accurately time the relieving movements notwithstanding inward or outward movements of the tool under the control of the contour mechanism.

52. The combination in a relieving machine, of a rotatable blank-carrying spindle, a cutting tool, mechanism for effecting relative feeding movement between the tool and the blank longitudinally of the latter, mechanism including a former and former pin for causing the tool to move inward or outward during the feeding movement to cut the blank with a predetermined contour differing from a straight line, the said tool and the said former pin being the same in shape, and mechanism for effecting relieving movements of the tool with respect to the former and former pin in timed relation to the blank rotation and in conformity with helical teeth on the blank, the said mechanism serving to accurately time the relieving movements notwithstanding inward or outward movements of the tool under the control of the contour mechanism.

53. The combination in a relieving machine, of a rotatable blank-carrying spindle, a cutting tool, mechanism for effecting relative feeding movement between the tool and the blank longitudinally of the latter, mechanism including a former and former pin for causing the tool to move inward or outward during the feeding movement to cut the blank with a predetermined contour differing from a straight line, means for moving the former longitudinally to properly position it with respect to the blank, and mechanism for effecting relieving movements of the tool with respect to the former and former pin in timed relation to the blank rotation and in conformity with helical teeth on the blank.

54. The combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, and mechanism for effecting relieving movements of the tool relatively to the slide in timed relation to the blank rotation and in conformity with the helical teeth on the blank, the said mechanism serving to accurately time the relieving movements notwithstanding inward or outward movements of the tool under the control of the contour mechanism.

55. The combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, and mechanism for effecting relieving movements of the tool relatively to the slide in timed relation to the blank rotation and in conformity with the helical teeth on the blank having any desired degree of inclination, the said mechanism serving to accurately time the relieving movements notwithstanding inward or outward movements of the tool under the control of the contour mechanism.

56. The combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with a predetermined contour differing from a straight line, and mechanism for effecting relieving movements of the tool relatively to the slide in timed relation to the blank rotation and in conformity with the helical teeth on the blank inclined in either direction.

57. The combination in a relieving machine, of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, mechanism for moving the tool inward or outward during the feeding movement to cut the blank with different diameters, and mechanism for varying the spindle rotation to effect relieving in conformity with helical teeth on the blank.

58. The combination in a relieving machine, of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, automatically acting mechanism for moving the tool inward or outward during the feeding movement to cut the blank with different diameters, and mechanism for varying the spindle rotation to effect relieving in conformity with helical teeth on the blank.

59. The combination in a relieving machine, of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, automatically acting mechanism for moving the tool inward or outward during the feeding movement to cut the blank with a predetermined contour differing from a straight line, and mechanism for varying the spindle rotation to effect relieving in conformity with helical teeth on the blank.

60. The combination in a relieving machine, of a rotatable blank-carrying spindle, a cutting tool, mechanism for effecting relative feeding movement between the tool and the blank longitudinally of the latter, mechanism acting independently of the feeding mechanism for effecting relieving movements of the tool at a normally uniform frequency, mechanism including a former and former pin for causing the tool to move inward or outward during the feeding movement to cut the blank with a predetermined contour differing from a straight line, and mechanism for varying the spindle rotation to effect relieving in conformity with helical teeth on the blank.

61. The combination in a relieving machine, of a rotatable blank-carrying spindle, a carriage movable longitudinally of the spindle axis, a transversely movable slide on the carriage, a cutting tool carried by the slide, mechanism for moving the slide and the tool transversely as the carriage moves longitudinally so as to cut the blank with different diameters, mechanism acting independently of the carriage movements for effecting relieving movements of the tool at a normally uniform frequency, and mechanism dependent on the carriage movements for varying the spindle rotation relatively to the uniform relieving movements in conformity with helical teeth on the blank.

62. The combination of a rotatable blank-carrying spindle, a tool carriage movable longitudinally of the spindle, a feed screw for moving the carriage, two ratchet wheels, differently speeded power connections between the respective ratchet wheels and the screw, and two oscillating ratchets adapted respectively to engage the ratchet wheels, whereby the carriage may be fed intermittently through either of two distances.

63. The combination of a rotatable blank-carrying spindle, a tool carriage movable longitudinally of the spindle, a feed screw for moving the carriage, two ratchet wheels, differently speeded power connections between the respective ratchet wheels and the screw, and oscillating ratchet arm, and two ratchets both carried by the said arm and adapted respectively to engage the ratchet wheels, whereby the carriage may be fed intermittently through either of two distances.

64. The combination of a rotatable blank-carrying spindle, a tool carriage movable longitudinally of the spindle, a feed screw for moving the carriage, two ratchet wheels, differently speeded power connections between the respective ratchet wheels and the screw, an oscillating ratchet arm, two ratchets both carried by the said arm and adapted respectively to engage the ratchet wheels, whereby the carriage may be fed intermittently through either of two distances, and means for adjusting the amount of movement of the arm to change the said distances of intermittent feed.

65. A metal cutting machine comprising in combination, a rotatable blank-carrying spindle, a cutting tool, automatic means for effecting regular intermittent longitudinal feeding movements of the tool with respect to the blank all in the same direction, and automatically acting mechanism for effecting relieving movements, the said relieving mechanism remaining in operative relation to the tool during the said feeding movements.

66. A metal cutting machine comprising in combination, a rotatable blank-carrying spindle, a cutting tool, automatic means for effecting regular intermittent longitudinal feeding movements of the tool with respect to the blank all in the same direction, and automatically acting mechanism for effecting between each two feeding movements a predetermined whole number of regular relieving movements of the tool supplemental to the feeding movements.

67. A metal cutting machine comprising in combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, and automatically acting mechanism for effecting between each two feeding movements a predetermined whole number of regular relieving movements of the tools supplemental to the feeding movements.

68. A metal cutting machine comprising in combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent a little more or a little less than one revolution in accordance with helical teeth on the blank, and automatically acting mechanism for effecting between each two feeding movements a predetermined whole number of regular relieving movements of the tool supplemental to the feeding movements.

69. A metal cutting machine comprising in combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, and means for changing the relation between the intermittent feeding movements and the spindle rotation.

70. A metal cutting machine comprising in combination a rotatable blank-carrying spindle a cutting tool, automatic means for effecting regular intermittent longitudinal feeding movements of the tool with respect to the blank all in the same direction, the said means acting after each rotation of the spindle to a predetermined extent approximating one revolution, means for changing the relation between the intermittent feeding movements and the spindle rotation, and means for changing the amount of each of the intermittent feeding movements independently of the extent of spindle rotation.

71. A metal cutting machine comprising in combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, and means for changing the said extent of spindle rotation independently of the rate of the intermittent feeding movements.

72. A metal cutting machine comprising in combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, means for changing the relation between the intermittent feeding movements and the spindle rotation, and automatically acting mechanism for effecting regular relieving movements of the tool supplemental to the aforesaid feeding movements, the said relieving mechanism remaining in operative relation to the tool during the said feeding movements.

73. A metal cutting machine comprising in combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, automatically acting mechanism for effecting between each two feeding movements a predetermined whole number of regular relieving movements of the tool supplemental to the feeding movements, and means for changing the extent of spindle rotation independently of the rate of the said feeding and relieving movements.

74. A metal cutting machine comprising in combination, a rotatable blank-carrying spindle, a cutting tool, automatic means for effecting at intervals relative intermittent feeding movements all in the same direction between the tool and the blank longitudinally of the latter, and means for moving the tool inward or outward as longitudinal movement takes place so as to cut the blank with different diameters.

75. A metal cutting machine comprising in combination, a rotatable blank-carrying spindle, a cutting tool, automatic means for effecting regular step-by-step longitudinal feeding movements of the tool with respect to the blank all in the same direction, and automatic mechanism for moving the tool inward or outward as longitudinal movement takes place so as to cut the blank with different diameters.

76. A metal cutting machine comprising in combination, a rotatable blank-carrying spindle, a cutting tool, automatic means for effecting regular step-by-step longitudinal feeding movements of the tool with respect to the blank all in the same direction, and automatic mechanism for moving the tool inward or outward as longitudinal movement takes place so as to cut the blank with a predetermined contour differing from a straight line.

77. A metal cutting machine comprising in combination a rotatable blank-carrying spindle, a cutting tool, automatic means for effecting a relative feeding between the tool and the blank longitudinally of the latter, automatic mechanism including a former and a former pin for moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin.

78. A metal cutting machine comprising in combination, a rotatable blank-carrying spindle, a cutting tool, automatic means for effecting at intervals relative intermittent feeding movements all in the same direction between the tool and the blank longitudinally of the latter, automatic mechanism including a former and a former pin for moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin.

79. A metal cutting machine comprising in combination, a rotatable blank-carrying spindle, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour differing from a straight line and corresponding to that of the former, and means associated with the tool feeding means for effecting regular step-by-step longitudinal movements of the former pin with respect to the former in unison with the tool movements.

80. A metal cutting machine comprising in combination, a rotatable blank-carrying spindle, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, and automatic means for effecting supplemental movements of the tool independent of the aforesaid movements.

81. A metal cutting machine comprising in combination, a rotatable blank-carrying spindle, a cutting tool, automatic means for effecting regular step-by-step longitudinal feeding movements of the tool with respect to the blank all in the same direction, automatic mechanism for moving the tool inward or outward as longitudinal movement takes place so as to cut the blank with a predetermined contour differing from a straight line, and automatically acting mechanism for effecting regular relieving movements of the tool independent of the aforesaid movements.

82. A metal cutting machine comprising in combination, a rotatable blank-carrying spindle, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour differing from a straight line and corresponding to that of the former, means associated with the tool feeding means for effecting regular step-by-step longitudinal movements of the former pin with respect to the former in unison with the tool movements, and automatically acting mechanism for effecting regular relieving movements of the tool independent of the aforesaid movements.

83. A metal cutting machine comprising in combination, a rotatable blank-carrying spindle, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour differing from a straight line and corresponding to that of the former, means associated with the tool feeding means for effecting regular step-by-step longitudinal movements of the former pin with respect to the former in unison with the tool movements, and automatically acting mechanism for effecting regular relieving movements of the tool relatively to the former and former pin and independent of the aforesaid movements.

84. A metal cutting machine comprising in combination, a rotatable blank-carrying spindle, a cutting tool, automatic means for effecting at intervals relative intermittent feeding movements all in the same direction between the tool and the blank longitudinally of the latter, the said means acting after each rotation of the spindle to a predetermined extent a little more or a little less than one revolution in accordance with helical teeth on the blank, and means for moving the tool inward or outward as longitudinal movement takes place so as to cut the blank with different diameters.

85. A metal cutting machine comprising in combination, a rotatable blank-carrying spindle, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, automatically acting mechanism for effecting regular supplemental relieving movements of the tool independent of the aforesaid movements, the said mechanism serving to effect the relieving movements in timed relation to the spindle rotation, and means for varying the said timed relation in accordance with the aforesaid longitudinal feed.

86. A metal cutting machine comprising in combination, a rotatable blank-carrying spindle, a cutting tool, automatic means for effecting regular step-by-step longitudinal feeding movements of the tool with respect to the blank all in the same direction, automatic mechanism including a former and a former pin for moving the tool inward or outward as longitudinal movement takes place so as to cut the blank with a predetermined contour differing from a straight line and corresponding to that of the former, means associated with the tool feeding means for effecting regular step-by-step longitudinal movements of the former pin with respect to the former in unison with the tool movements, automatically acting mechanism for effecting regular supplemental relieving movements of the tool independent of the aforesaid movements, the said mechanism serving to effect the relieving movements in timed relation to the spindle rotation, and means for varying the said timed relation in accordance with the aforesaid longitudinal feed.

87. The described combination of a rotatable blank-carrying spindle, a cutting tool, automatic means for longitudinally feeding the tool with respect to the blank, automatically acting mechanism for effecting regular relieving movements of the tool supplemental to the aforesaid feeding movement, and automatic means for stopping the blank rotation and the relieving movements after each rotation of the blank to a predetermined extent, the said relieving mechanism remaining in operative relation to the tool during the time that the blank is stopped.

88. The described combination of a rotatable blank-carrying spindle, a cutting tool, automatic means for longitudinally feeding of the tool with respect to the blank, automatic means for stopping the blank after each rotation thereof to a predetermined extent, and automatically acting mechanism for effecting a predetermined whole number of regular relieving movements of the tool supplemental to the feeding movement while the blank is rotating to the aforesaid predetermined extent.

89. The described combination of a rotatable blank-carrying spindle, a driving member for the spindle, automatic means for stopping the said driving member after rotation thereof through one revolution, a cutting tool, automatic means for longitudinally feeding the tool with respect to the blank, and mechanism interposed between the drive member and the spindle for varying the rotation of the spindle relatively to that of the drive member in accordance with helical teeth on the blank.

90. The described combination of a rotatable blank-carrying spindle, a driving member for the spindle, automatic means for stopping the said driving member after rotation thereof through one revolution, a cutting tool, automatic means for longitudinally feeding the tool with respect to the blank, and mechanism including bodily rotatable gearing interposed between the drive member and the spindle for varying the rotation of the spindle relatively to that of the drive member in accordance with helical teeth on the blank.

91. The described combination of a rotatable blank-carrying spindle, a driving member for the spindle, automatic means for stopping the said driving member after rotation thereof through one revolution, a cutting tool, automatic means for longitudinally feeding the tool with respect to the blank, mechanism interposed between the drive member and the spindle for varying the rotation of the spindle relatively to that of the drive member in accordance with helical teeth on the blank, and means connected with the tool for operating the said mechanism in accordance with the feed.

92. The described combination of a rotatable blank-carrying spindle, a cutting tool, automatic means for longitudinally feeding the tool with respect to the blank, automatic mechanism for moving the tool inward or outward as longitudinal feed takes place so as to cut the blank with a predetermined contour differing from a straight line and automatically acting mechanism for effecting regular relieving movements of the tool supplemental to the aforesaid feeding movements, the said relieving mechanism remaining in operative relation to the tool during the said feeding movements.

93. The described combination of a rotatable blank-carrying spindle, a cutting tool, automatic means for longitudinally feeding the tool with respect to the blank, automatic mechanism including a former and former pin for moving the tool inward or outward as longitudinal movement takes place so as to cut the blank with a predetermined contour differing from a straight line and corresponding to that of the former, automatic means for stopping the blank after each rotation thereof to a predetermined extent, and automatically acting mechanism for effecting a predetermined whole number of regular relieving movements of the tool supplemental to the feeding movement while the blank is rotating to the aforesaid predetermined extent.

94. In combination, a rotatable blank-carrying spindle, a cutting tool, automatic means for effecting regular intermittent longitudinal feeding movements of the tool with respect to the blank all in the same direction, automatically acting mechanism for effecting regular relieving movements of the tool supplemental to the aforesaid feeding movements, the said relieving mechanism remaining in operative relation to the tool during the said feeding movements, and automatic means for stopping the spindle rotation and relieving movements at the time of each feeding movement.

95. In combination, a rotatable blank-carrying spindle, a cutting tool, automatic means for effecting regular intermittent longitudinal feeding movements of the tool with respect to the blank all in the same direction, automatically acting mechanism for effecting between each two feeding movements a predetermined whole number of regular relieving movements of the tool supplemental to the feeding movements, and automatic means for stopping the spindle rotation and relieving movements at the time of each feeding movement.

96. In combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, means for changing the said extent of spindle rotation independently of the rate of the intermittent feeding movements, and automatic means for stopping the spindle rotation at the time of each feeding movement.

97. In combination, a rotatable blank-carrying spindle, a cutting tool, automatic means for effecting regular intermittent longitudinal feeding movements of the tool with respect to the blank all in the same direction, the said means acting after each rotation of the spindle to a predetermined extent approximating one revolution, means for changing the relation between the intermittent feeding movements and the spindle rotation, automatically acting mechanism for effecting regular relieving movements of the tool supplemental to the aforesaid feeding movements, the said relieving mechanism remaining in operative relation to the tool during the said feeding movements, and automatic means for stopping the spindle rotation and relieving movements at the time of each feeding movement.

98. In combination, a rotatable blank-carrying spindle, a cutting tool, automatic means for effecting regular intermittent longitudinal feeding movements of the tool with respect to the blank all in the same direction, the said means acting after each rotation of the spindle to a pre-determined extent approximating one revolution, automatically acting mechanism for effecting between each two feeding movements a predetermined whole number of regular relieving movements of the tool supplemental to the feeding movements, means for changing the extent of spindle rotation independently of the rate of the said feeding and relieving movements, and automatic means for stopping the spindle rotation and relieving movements at the time of each feeding movement.

99. In combination, a rotatable blank-carrying spindle, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, and automatic means for stopping the spindle rotation at the time of each feeding movement.

100. In combination, a rotatable blank-carrying spindle, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, automatically acting mechanism for effecting regular supplemental relieving movements of the tool independent of the aforesaid movements, and automatic means for stopping the spindle rotation and the relieving movements at the time of each feeding movement.

101. In combination, a rotatable blank-carrying spindle, a cutting tool, automatic means for effecting at intervals relative intermittent feeding movements all in the same direction between the tool and the blank longitudinally of the latter, after each rotation of the blank to a predetermined extent a little more or a little less than one revolution in accordance with helical teeth on the blank, means for moving the tool inward or outward as longitudinal movement takes place so as to cut the blank with different diameters, and automatic means for stopping the spindle rotation at the time of each feeding movement.

102. In combination, a rotatable blank-carrying spindle, a cutting tool, automatic means for effecting at intervals relative intermittent feeding movements all in the same direction between the tool and the blank longitudinally of the latter, means for moving the tool inward or outward as longitudinal movement takes place so as to cut the blank with different diameters, automatically acting mechanism for effecting regular supplemental relieving movements of the tool independent of the aforesaid movements, the said mechanism serving to effect the relieving movements in timed relation to the spindle rotation, means for varying the said timed relation in accordance with the aforesaid longitudinal feed, and automatic means for stopping the spindle rotation and the relieving movements at the time of each feeding movement.

103. A rotatable blank-carrying spindle, a cutting tool, means for feeding the tool longitudinally of the blank, automatic means for withdrawing the tool from the blank at intervals, and automatically acting mechanism for effecting regular relieving movements of the tool supplemental to the aforesaid withdrawing movements, the said relieving mechanism remaining in operative relation to the tool during the said withdrawing movements, all in combination as set forth.

104. A rotatable blank-carrying spindle, a cutting tool, means for feeding the tool longitudinally of the blank, automatic means for withdrawing the tool from the blank at intervals, and automatically acting mechanism for effecting regular relieving movements of the tool supplemental to the aforesaid withdrawing movements, the said relieving mechanism being bodily movable with the tool during the said withdrawing movements, all in combination as set forth.

105. A rotatable blank-carrying spindle, a cutting tool, means for feeding the tool longitudinally of the blank, automatic means for withdrawing the tool from the blank at intervals, automatically acting mechanism for effecting regular relieving movements of the tool supplemental to the aforesaid withdrawing movements, the said relieving mechanism being bodily movable with the tool during the said withdrawing movements, and driving devices for the relieving mechanism including a splined shaft parallel to the direction of the aforesaid bodily movement, all in combination as set forth.

106. A rotatable blank-carrying spindle, a cutting tool, means for feeding the tool longitudinally of the blank, automatic means for withdrawing the tool from the blank at intervals, and automatically acting mechanism for effecting a predetermined whole number of regular relieving movements of the tool supplemental of the said withdrawing movements between each two withdrawing movements, all in combination as set forth.

107. A rotatable blank-carrying spindle, a cutting tool, means for effecting feeding movements between the tool and the blank longitudinally of the blank, automatic means for withdrawing the tool from the blank after each rotation of the spindle to a predetermined extent, and automatically acting mechanism for effecting a predetermined whole number of regular relieving movements of the tool supplemental of the said withdrawing movements between each two withdrawing movements, all in combination as set forth.

108. A rotatable spindle adapted to carry a blank having helical grooves therein, a cutting tool, means for feeding the tool longitudinally of the blank, and automatic means for withdrawing the tool from the blank at intervals, each withdrawal taking place in a predetermined definite relation to one of the helical grooves, all in combination as set forth.

109. A rotatable blank-carrying spindle, a cutting tool, means for feeding the tool longitudinally of the blank, automatic means for withdrawing the tool from the blank after each rotation of the spindle to a predetermined extent, and means for changing the relation between the withdrawing movements and the spindle rotation, all in combination as set forth.

110. A rotatable blank-carrying spindle, a cutting tool, means for feeding the tool longitudinally of the blank, automatic means for withdrawing the tool from the blank after each rotation of the spindle to a predetermined extent, and means for changing the extent of spindle rotation independently of the rate of the intermittent feeding movements, all in combination as set forth.

111. A rotatable blank-carrying spindle, a cutting tool, means for feeding the tool longitudinally of the blank, automatic means for withdrawing the tool from the blank after each rotation of the spindle to a predetermined extent, automatically acting mechanism for effecting regular relieving movements of the tool supplemental to the aforesaid withdrawing movements, the said relieving mechanism remaining in operative relation to the tool during the said withdrawing movements, and means for changing the relation between the withdrawing movements and the spindle rotation, all in combination as set forth.

112. A rotatable blank-carrying spindle, a cutting tool, means for feeding the tool longitudinally of the blank, automatic means for withdrawing the tool from the blank after each rotation of the spindle to a predetermined extent, automatically acting mechanism for effecting a predetermined whole number of regular relieving movements of the tool supplemental of the said withdrawing movements, and means for changing the relation between the withdrawing movements and the spindle rotation, all in combination as set forth.

113. A rotatable blank-carrying spindle, a cutting tool, means for feeding the tool longitudinally of the blank, automatic means for withdrawing the tool from the blank after each rotation of the spindle to a predetermined extent, automatically acting mechanism for effecting regular relieving movements of the tool supplemental to the aforesaid withdrawing movements, the said relieving mechanism remaining in operative relation to the tool during the said withdrawing movements, and means for changing the extent of spindle rotation independently of the rate of the intermittent feeding movements, all in combination as set forth.

114. A rotatable spindle adapted to carry a blank having helical grooves therein, a cutting tool, means for feeding the tool longitudinally of the blank, automatic means for withdrawing the tool from the blank at intervals, each withdrawal taking place in a predetermined definite relation to one of the helical grooves, and automatically acting means for effecting a predetermined whole number of regular relieving movements of the tool supplemental of the said withdrawing movements between each two withdrawing movements, all in combination as set forth.

115. A rotatable blank-carrying spindle, a cutting tool, means for feeding the tool longitudinally of the spindle, automatic mechanism including a former and a former pin for moving the tool inward or outward as longitudinal movement takes place so as to cut the blank with a predetermined contour differing from a straight line and corresponding to that of the former, and automatic means supplemental to the mechanism last aforesaid for separating the former and the former pin at intervals, all in combination as set forth.

116. A rotatable blank-carrying spindle, a cutting tool, means for feeding the tool longitudinally of the spindle, automatic mechanism including a stationary former and a former pin for moving the tool inward or outward as longitudinal movement takes place so as to cut the blank with a predetermined contour differing from a straight line and corresponding to that of the former, and automatic means supplemental to the mechanism last aforesaid for withdrawing the former pin from the stationary former at intervals, all in combination as set forth.

117. A rotatable blank-carrying spindle, a cutting tool, means for feeding the tool longitudinally of the spindle, automatic mechanism including a stationary former and a former pin for moving the tool inward or outward as longitudinal movement takes place so as to cut the blank with a predetermined contour differing from a straight line and corresponding to that of the former, and automatic means supplemental to the mechanism last aforesaid for withdrawing the former pin from the stationary former and for withdrawing the tool from the blank at intervals, all in combination as set forth.

118. A rotatable blank-carrying spindle, a cutting tool, means for feeding the tool longitudinally of the spindle, means for moving the tool inward or outward as longitudinal movement takes place so as to cut the blank with different diameters, automatic means supplemental to the mechanism last aforesaid for moving or withdrawing the tool from the blank at intervals, and automatic means for effecting movements of the tool supplemental to the aforesaid movements, all in combination as set forth.

119. A rotatable blank-carrying spindle, a cutting tool, means for effecting feeding movements between the tool and the spindle longitudinally of the spindle, means for moving the tool inward or outward as longitudinal movement takes place so as to cut the blank with different diameters, automatic means supplemental to the mechanism last aforesaid for moving or withdrawing the tool from the blank at intervals, and automatically acting mechanism for effecting regular relieving movements of the tool supplemental to the aforesaid movements, all in combination as set forth.

120. A rotatable blank-carrying spindle, a cutting tool, means for feeding the tool longitudinally of the spindle, automatic mechanism including a stationary former and a former pin for moving the tool inward or outward as longitudinal movement takes place so as to cut the blank with a predetermined contour differing from a straight line and corresponding to that of the former, automatic means supplemental to the mechanism last aforesaid for moving or withdrawing the former pin from the stationary former and for moving or withdrawing the tool from the blank at intervals, and automatically acting mechanism for effecting regular relieving movements of the tool supplemental to the aforesaid movements, all in combination as set forth.

121. A rotatable blank-carrying spindle, a cutting tool, means for feeding the tool longitudinally of the spindle, automatic mechanism including a stationary former and a former pin for moving the tool inward or outward as longitudinal movement takes place so as to cut the blank with a predetermined contour differing from a straight line and corresponding to that of the former, and automatic means supplemental to the mechanism last aforesaid for withdrawing the former pin from the stationary former and for withdrawing the tool from the blank after each rotation of the spindle to a predetermined extent a little more or a little less than one revolution in accordance with helical grooves in the blank, all in combination as set forth.

122. A rotatable blank-carrying spindle, a cutting tool, means for feeding the tool longitudinally of the spindle, means for moving the tool inward or outward as longitudinal movement takes place so as to cut the blank with different diameters, automatic means supplemental to the mechanism last aforesaid for withdrawing the tool from the blank after each rotation of the spindle to a predetermined extent a little more or a little less than one revolution in accordance with helical grooves on the blank, and automatically acting mechanism for effecting between each two withdrawing movements a whole number of relieving movements of the tool supplemental to the aforesaid movements, all in combination as set forth.

123. A rotatable blank-carrying spindle, a cutting tool, means for feeding the tool longitudinally of the spindle, automatic mechanism including a stationary former and a former pin for moving the tool inward or outward as longitudinal movement takes place so as to cut the blank with a predetermined contour differing from a straight line and corresponding to that of the former, automatic means supplemental to the mechanism last aforesaid for withdrawing the former pin from the stationary former and for withdrawing the tool from the blank after each rotation of the spindle to a predetermined extent a little more or little less than one revolution in accordance with helical grooves on the blank, and automatically acting mechanism for effecting between each two withdrawing movements a whole number of relieving movements of the tool supplemental to the aforesaid movements, all in combination as set forth.

124. A machine of the class described comprising in combination, a rotatable spindle adapted to carry a blank having generally longitudinal grooves therein, a cutting tool, and automatic means for effecting regular intermittent longitudinal feeding movements of the tool with respect to the blank all in the same direction, the said automatic means serving to effect the feeding movements in timed relation to the blank rotation so that each movement occurs with the tool opposite one of the grooves in the blank.

125. A machine of the class described comprising in combination, a rotatable spindle adapted to carry a blank having generally longitudinal grooves therein, a cutting tool, and automatic means for effecting regular intermittent longitudinal feeding movements of the tool with respect to the blank all in the same direction and for withdrawing the tool from the blank during feeding, the said automatic means serving to effect the feeding and withdrawing movements in timed relation to the blank rotation so that each movement occurs with the tool opposite one of the grooves in the blank.

126. In a machine of the class described, the combination of a rotatable spindle adapted to carry a blank having generally longitudinal grooves therein, a cutting tool, automatic means for effecting regular intermittent longitudinal feeding movements of the tool with respect to the blank all in the same direction, the said automatic means serving to effect the feeding movements in timed relation to the blank rotation so that each movement occurs with the tool opposite one of the grooves in the blank, and automatically acting mechanism for effecting between each two feeding movements a predetermined whole number of regular relieving movements supplemental to the feeding movements.

127. In a machine of the class described, the combination of a rotatable spindle adapted to carry a blank having generally longitudinal grooves therein, a cutting tool, automatic means for effecting regular intermittent longitudinal feeding movements of the tool with respect to the blank all in the same direction and for withdrawing the tool from the blank during feeding, the said automatic means serving to effect the feeding and withdrawing movements in timed relation to the blank rotation so that each movement occurs with the tool opposite one of the grooves in the blank, and automatically acting mechanism for effecting between each two feeding and withdrawing movements a predetermined whole number of regular relieving movements supplemental to the feeding and withdrawing movements.

128. In a machine of the class described, the combination of a rotatable spindle adapted to carry a blank having generally longitudinal grooves therein, a cutting tool, automatic means for effecting regular intermittent longitudinal feeding movements of the tool with respect to the blank all in the same direction and for withdrawing the tool from the blank during feeding, the said automatic means serving to effect the feeding and withdrawing movements in timed relation to the blank rotation so that each movement occurs with the tool opposite one of the grooves in the blank, and automatically acting mechanism for effecting between each two feeding and withdrawing movements a predetermined whole number of regular relieving movements supplemental to the feeding and withdrawing movements, the said relieving mechanism being bodily movable with the tool during the said feeding and withdrawing movements.

129. In a machine of the class described, the combination of a rotatable spindle adapted to carry a blank having helical grooves therein, a cutting tool, and automatic means for effecting regular intermittent longitudinal feeding movements of the tool with respect to the blank all in the same direction, the said automatic means serving to effect each of the feeding movements after a little more or a little less than a complete revolution of the blank so that each movement occurs when the tool is opposite one of the helical grooves in the blank.

130. In a machine of the class described, the combination of a rotatable spindle adapted to carry a blank having helical grooves therein, a cutting tool, and automatic means for effecting regular intermittent longitudinal feeding movements of the tool with respect to the blank all in the same direction and for withdrawing the tool from the blank during feeding, the said automatic means serving to effect each of the feeding and withdrawing movements after a little more or a little less than a complete revolution of the blank so that each movement occurs when the tool is opposite one of the helical grooves in the blank.

131. In a machine of the class described, the combination of a rotatable spindle adapted to carry a blank having helical grooves therein, a cutting tool, automatic means for effecting regular intermittent longitudinal feeding movements of the tool with respect to the blank all in the same direction, the said automatic means serving to effect each of the feeding movements after a little more or a little less than a complete revolution of the blank so that each movement occurs when the tool is opposite one of the helical grooves in the blank, and automatically acting mechanism for effecting between each two feeding movements a predetermined whole number of regular relieving movements supplemental to the feeding movements.

132. In a machine of the class described, the combination of a rotatable spindle adapted to carry a blank having helical grooves therein, a cutting tool, automatic means for effecting regular intermittent longitudinal feeding movements of the tool with respect to the blank all in the same direction and for withdrawing the tool from the blank during feeding, the said automatic means serving to effect each of the feeding and withdrawing movements after a little more or a little less than a complete revolution of the blank so that each movement occurs when the tool is opposite one of the helical grooves in the blank, and automatically acting mechanism for effecting between each two feeding and withdrawing movements a predetermined whole number of regular relieving movements supplemental to the feeding and withdrawing movements.

133. In a machine of the class described, the combination of a rotatable blank-carrying spindle, a cutting tool, automatic means for effecting at intervals relative intermittent feeding movements between the tool and the blank longitudinally of the latter, means controlling the relative positions of the tool and blank so that they are out of contact during the feeding movements, and means for moving the tool inward or outward as longitudinal movement takes place so as to cut the blank with different diameters.

134. In a machine of the class described, the combination of a rotatable blank-carrying spindle, a cutting tool, automatic means for effecting at intervals relative intermittent feeding movements between the tool and the blank longitudinally of the latter, means controlling the relative positions of the tool and blank so that they are out of contact during the feeding movements, and automatic mechanism for moving the tool inward or outward as longitudinal movement takes place so as to cut the blank with a predetermined contour differing from a straight line.

135. In a machine of the class described, the combination of a rotatable blank-carrying spindle, a cutting tool, automatic means for effecting at intervals relative intermittent feeding movements between the tool and the blank longitudinally of the latter, means controlling the relative positions of the tool and blank so that they are out of contact during the feeding movements, and automatic mechanism including a former and a former pin for moving the tool inward or outward as longitudinal movement takes place so as to cut the blank with a predetermined contour differing from a straight line and corresponding to that of the former.

136. In a machine of the class described, the combination of a rotatable spindle adapted to carry a blank having generally longitudinal grooves therein, automatic means for effecting at intervals relative intermittent feeding movements between the tool and the blank longitudinally of the latter, the said automatic means serving to effect the feeding movements in timed relation to the blank rotation so that each movement occurs with the tool opposite one of the grooves of the blank, and means for moving the tool inward or outward as longitudinal movement takes place so as to cut the blank with different diameters.

137. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, and means for moving the tool inward or outward as longitudinal movement takes place so as to cut the blank with different diameters.

138. In a machine of the class described, the combination of a rotatable blank-carrying spindle, a cutting tool, automatic means for moving the tool at intervals longitudinally of the blank and for withdrawing the tool from the blank at the time of each longitudinal movement, and means for moving the tool inward or outward as longitudinal movement takes place so as to cut the blank with different diameters.

139. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, and means for moving the tool inward or outward as longitudinal movement takes place so as to cut the blank with a predetermined contour differing from a straight line.

140. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, and means including a former and former pin for causing the tool to be moved inward or outward as longitudinal movement takes place so as to cut the blank with a predetermined contour differing from a straight line.

141. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, the said means being adjustable to change the extent of each longitudinal movement, and means for moving the tool inward or outward as longitudinal movement takes place so as to cut the blank with different diameters.

142. In a machine of the class described, the combination of a rotatable spindle adapted to carry a blank having generally longitudinal grooves therein, automatic means for effecting at intervals relative intermittent feeding movements between the tool and the blank longitudinally of the latter and for withdrawing the tool from the blank at the time of each longitudinal movement, the said automatic means serving to effect the feeding and withdrawing movements in timed relation to the blank rotation so that each movement occurs with the tool opposite one of the grooves of the blank, and means for supplementally moving the tool inward or outward as longitudinal movement takes place so as to cut the blank with different diameters.

143. In a machine of the class described, the combination of a rotatable spindle adapted to carry a blank having generally longitudinal grooves therein, automatic means for effecting at intervals relative intermittent feeding movements between the tool and the blank longitudinally of the latter and for withdrawing the tool from the blank at the time of each longitudinal movement, the said automatic means serving to effect the feeding and withdrawing movements in timed relation to the blank rotation so that each movement occurs with the tool opposite one of the grooves of the blank, and automatic mechanism including a former and a former pin for moving the tool inward or outward as longitudinal movement takes place so as to cut the blank with a predetermined contour differing from a straight line and corresponding to that of the former.

144. In a machine of the class described, the combination of a rotatable blank-carrying spindle, a cutting tool, automatic means for effecting a relative feeding between the tool and the blank longitudinally of the latter, automatic mechanism including a former and a former pin for moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin and for separating them during the said intermittent movements.

145. In a machine of the class described, the combination of a rotatable blank-carrying spindle, a cutting tool, automatic means for effecting a relative feeding between the tool and the blank longitudinally of the latter, means controlling the relative positions of the tool and blank so that they are out of contact during the feeding movements, automatic mechanism including a former and a former pin for moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin and for separating them during the said intermittent movements.

146. In a machine of the class desired, the combination of a rotatable spindle adapted to carry a blank having generally longitudinal grooves therein, automatic means for effecting at intervals relative intermittent feeding movements between the tool and the blank longitudinally of the latter, the said automatic means serving to effect the feeding movements in timed relation to the blank rotation so that each movement occurs with the tool opposite one of the grooves of the blank, automatic mechanism including a former and a former pin for moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin and for separating them during the said intermittent movements.

147. In a machine of the class described, the combination of a rotatable blank-carrying spindle, a cutting tool, automatic means for effecting at intervals relative intermittent feeding movements between the tool and the blank longitudinally of the latter and for withdrawing the tool from the blank at the time of each longitudinal movement, automatic mechanism including a former and a former pin for supplementally moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin and for separating them during the said intermittent movements.

148. In a machine of the class described, the combination of a rotatable blank-carrying spindle, a cutting tool, automatic means for effecting at intervals relative movements between the tool and the blank longitudinally of the latter, means including a former in normally fixed relation to the blank and a former pin in normally fixed relation to the tool for causing the tool to cut the blank with a predetermined contour differing from a straight line, and mechanism for withdrawing the tool from the blank and the former pin from the former at the time of each longitudinal movement.

149. In a machine of the class described, the combination of a rotatable spindle adapted to carry a blank having generally longitudinal grooves therein, automatic means for effecting at intervals relative intermittent feeding movements between the tool and the blank longitudinally of the latter and for withdrawing the tool from the blank at the time of each longitudinal movement, the said automatic means serving to effect the feeding and withdrawing movements in timed relation to the blank rotation so that each movement occurs with the tool opposite one of the grooves of the blank, automatic mechanism including a former and a former pin for supplementally moving the tool inward or outward as longitudinal movement takes place so as to cut the blank with a predetermined contour differing from a straight line and corresponding to that of the former, and means associated with the tool feeding means for effecting relative intermittent longitudinal movements between the former and the former pin and for withdrawing the pin from the former during the said intermittent movements.

150. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, mechanism for effecting relieving movements of the tool in timed relation to the blank rotation, and means for supplementally moving the tool inward or outward as longitudinal movement takes place so as to cut the blank with different diameters.

151. In a machine of the class described, the combination of a rotatable blank-carrying spindle, a cutting tool, automatic means for feeding the tool at intervals longitudinally of the blank, mechanism for effecting relieving movements of the tool in timed relation to the blank rotation, means including a normally fixed former and former pin longitudinally movable with the tool for causing the tool to cut the blank with a predetermined contour differing from a straight line, and mechanism for withdrawing the tool from the blank and the former pin from the former at the time of each longitudinal movement.

152. In a machine of the class described, the combination of a rotatable spindle adapted to carry a blank having helical grooves therein, automatic means for effecting at intervals relative intermittent feeding movements between the tool and the blank longitudinally of the latter, the said automatic means serving to effect each of the feeding movements after a little more or a little less than a complete revolution of the blank so that each movement occurs when the tool is opposite one of the helical grooves of the blank, and means for moving the tool inward or outward as longitudinal movement takes place so as to cut the blank with different diameters.

153. In a machine of the class described, the combination of a rotatable spindle adapted to carry a blank having helical grooves therein, automatic means for effecting at intervals relative intermittent feeding movements between the tool and the blank longitudinally of the latter and for withdrawing the tool from the blank at the time of each longitudinal movement, the said automatic means serving to effect the feeding and withdrawing movements after a little more or a little less than a complete revolution of the blank so that each movement occurs when the tool is opposite one of the helical grooves of the blank, and means for moving the tool inward or outward as longitudinal movement takes place so as to cut the blank with different diameters.

154. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, mechanism for effecting relieving movements of the tool in timed relation to the blank rotation, means for varying the relation between the relieving movements of the tool and the rotative movement of the blank in conformity with helical teeth on the blank, and means for supplementally moving the tool inward or outward as longitudinal movement takes place so as to cut the blank with different diameters.

155. The hereindescribed combination of a rotatable spindle adapted to carry a blank having generally longitudinal grooves therein, a cutting tool, and automatic means for repeatedly stopping the spindle with the tool opposite one of the grooves in the blank.

156. The hereindescribed combination of a rotatable spindle adapted to carry a blank having generally longitudinal grooves therein, a cutting tool, automatic means for repeatedly stopping the spindle with the tool opposite one of the grooves in the blank, and automatic means for withdrawing the tool from the blank at each stopping of the spindle.

157. The combination in a machine of the class described, of a rotatable spindle adapted to carry a blank having generally longitudinal grooves therein, a cutting tool, automatic means for repeatedly stopping the spindle with the tool opposite one of the grooves in the blank, and automatically acting mechanism for effecting a predetermined whole number of relieving movements of the tool during each rotative movement of the blank.

158. The combination in a machine of the class described, of a rotatable spindle adapted to carry a blank having generally longitudinal grooves therein, a cutting tool, automatic means for withdrawing the tool from the blank at intervals, automatically acting mechanism for effecting a predetermined whole number of regular relieving movements of the tool supplemental to the said withdrawing movements between each two withdrawing movements, and automatic means for stopping the spindle rotation and the relieving movements at the time of each withdrawing movement.

159. The combination in a machine of the class described, of a rotatable spindle adapted to carry a blank having generally longitudinal grooves therein, a cutting tool, automatic means for repeatedly stopping the spindle with the tool opposite one of the grooves in the blank, automatic means for withdrawing the tool from the blank at each stopping of the spindle, and automatically acting mechanism for effecting a predetermined whole number of regular relieving movements of the tool supplemental of the said withdrawing movements between each two withdrawing movements.

160. The combination in a machine of the class described, of a rotatable spindle adapted to carry a blank having helical grooves therein, a cutting tool, and automatic means for repeatedly stopping the spindle with the tool opposite one of the helical grooves in the blank.

161. The combination in a machine of the class described, of a rotatable spindle adapted to carry a blank having helical grooves therein, a cutting tool, automatic means for repeatedly stopping the spindle with the tool opposite one of the helical grooves in the blank, and automatically acting mechanism for effecting a predetermined whole number of relieving movements of the tool during each rotative movement of the blank.

162. The combination in a machine of the class described, of a rotatable spindle adapted to carry a blank having helical grooves therein, a cutting tool, automatic means for repeatedly stopping the spindle with the tool opposite one of the helical grooves in the blank, automatic means for withdrawing the tool from the blank at intervals, automatically acting mechanism for effecting a predetermined whole number of regular relieving movements of the tool supplemental of the said withdrawing movements between each two withdrawing movements, and automatic means for stopping the spindle rotation and the relieving movements at the time of each withdrawing movement.

163. The combination in a machine of the class described, of a rotatable spindle adapted to carry a blank having generally longitudinal grooves therein, a cutting tool, means for feeding the tool longitudinally of the blank, automatic means for repeatedly stopping the spindle with the tool opposite one of the grooves in the blank, and means for moving the tool inward or outward as longitudinal movement takes place so as to cut the blank with different diameters.

164. The combination in a machine of the class described, of a rotatable spindle adapted to carry a blank having generally longitudinal grooves therein, a cutting tool, means for feeding the tool longitudinally of the blank, automatic means for repeatedly stopping the spindle with the tool opposite one of the grooves in the blank, and automatic mechanism for moving the tool inward or outward as longitudinal movement takes place so as to cut the blank with a predetermined contour differing from a straight line.

165. The combination in a machine of the class described, of a rotatable blank-carrying spindle, a cutting tool, means for feeding the tool longitudinally of the blank, automatic mechanism including a former and former pin for moving the tool inward or outward as longitudinal movement takes place so as to cut the blank with a predetermined contour differing from a straight line and corresponding to that of the former, automatic means for repeatedly stopping the spindle, and automatic means for withdrawing the former pin from the former at each stopping of the spindle.

166. The combination in a machine of the class described, of a rotatable spindle adapted to carry a blank having generally longitudinal grooves therein, a cutting tool, means for feeding the tool longitudinally of the blank, automatic mechanism including a former and former pin for moving the tool inward or outward as longitudinal movement takes place so as to cut the blank with a predetermined contour differing from a straight line and corresponding to that of the former, automatic means for repeatedly stopping the spindle with the tool opposite one of the grooves in the blank, and automatic means for withdrawing the former pin from the former at each stopping of the spindle.

167. The combination in a machine of the class described, of a rotatable blank-carrying spindle, a cutting tool, means for feeding the tool longitudinally of the blank, automatic mechanism including a former and former pin for moving the tool inward or outward as longitudinal movement takes place so as to cut the blank with a predetermined contour differing from a straight line and corresponding to that of the former, automatic means for repeatedly stopping the spindle, and automatic means for withdrawing the tool from the blank and for withdrawing the former pin from the former at each stopping of the spindle.

168. In a machine of the class described, the combination of a rotatable spindle adapted to carry a blank having generally longitudinal grooves therein, a cutting tool, automatic means for effecting at intervals relative movements between the tool and the blank longitudinally of the latter, and automatic means for stopping the blank rotation at the time of each longitudinal movement with one of the grooves of the blank opposite the tool.

169. In a machine of the class described, the combination of a rotatable blank-carrying spindle, a cutting tool, automatic means for effecting at intervals relative movements between the tool and the blank longitudinally of the latter and for withdrawing the tool from the blank at the time of each longitudinal movement, and automatic means for stopping the blank rotation at the time of each longitudinal movement with one of the grooves of the blank opposite the tool.

170. In a metal cutting machine of the class described, the combination of a rotatable spindle adapted to carry a blank having generally longitudinal grooves therein, a cutting tool, automatic means for effecting regular intermittent longitudinal feeding movements of the tool with respect to the blank all in the same direction, automatic means for stopping the spindle at the time of each longitudinal movement with the tool opposite one of the grooves in the blank, and automatically acting mechanism for effecting a predetermined whole number of relieving movements of the tool during each rotative movement of the blank.

171. In a metal cutting machine of the class described, the combination of a rotatable spindle adapted to carry a blank having generally longitudinal grooves therein, a cutting tool, automatic means for effecting regular intermittent longitudinal feeding movements of the tool with respect to the blank all in the same direction, automatic means for withdrawing the tool from the blank at the time of each longitudinal feeding movement, automatically acting mechanism for effecting a predetermined whole number of regular relieving movements of the tool supplemental of the said withdrawing movements between each two withdrawing movements, and automatic means for stopping the spindle rotation and the relieving movements at the time of each withdrawing movement.

172. In a metal cutting machine of the class described, the combination of a rotatable spindle adapted to carry a blank having generally longitudinal helical grooves therein, a cutting tool, automatic means for effecting at intervals relative movements between the tool and the blank longitudinally of the latter, and automatic means for stopping the blank rotation at the time of each longitudinal movement with one of the helical grooves of the blank opposite the tool.

173. In a metal cutting machine of the class described, the combination of a rotatable spindle adapted to carry a blank having helical grooves therein, a cutting tool, automatic means for effecting regular intermittent longitudinal feeding movements of the tool with respect to the blank all in the same direction, automatic means for stopping the spindle at the time of each longitudinal movement with the tool opposite one of the helical grooves in the blank, and automatically acting mechanism for effecting a predetermined whole number of relieving movements of the tool during each rotative movement of the blank.

174. In a metal cutting machine of the class described, the combination of a rotatable blank-carrying spindle, a cutting tool, automatic means for effecting at intervals relative movements between the tool and the blank longitudinally of the latter, mechanism for effecting relieving movements of the tool at a normally uniform frequency, mechanism for varying the spindle rotation relatively to the uniform relieving movements to effect relieving in conformity with helical teeth on the blank, and automatic means for stopping the blank rotation at the time of each longitudinal movement, the aforesaid variation in the spindle rotation making it possible for the blank to be so positioned that a helical groove thereof will be opposite the tool at each longitudinal movement.

175. In a metal cutting machine of the class described, the combination of a rotatable spindle adapted to carry a blank having generally longitudinal grooves therein, a cutting tool, automatic means for effecting at intervals relative movements between the tool and the blank longitudinally of the latter, automatic means for stopping the blank rotation at the time of each longitudinal movement with one of the grooves of the blank opposite the tool, and means for moving the tool inward or outward as longitudinal movement takes place so as to cut the blank with different diameters.

176. In a metal cutting machine of the class described, the combination of a rotatable spindle adapted to carry a blank having generally longitudinal grooves therein, a cutting tool, automatic means for effecting at intervals relative movements between the tool and the blank longitudinally of the latter, automatic means for stopping the blank rotation at the time of each longitudinal movement with one of the grooves of the blank opposite the tool, means for moving the tool inward or outward as longitudinal movement takes place so as to cut the blank with different diameters, and automatic means for withdrawing the tool from the blank at the time of each longitudinal movement.

177. In a metal cutting machine of the class described, the combination of a rotatable spindle adapted to carry a blank having generally longitudinal grooves therein, a cutting tool, automatic means for effecting at intervals relative movements between the tool and the blank longitudinally of the latter, automatic means for stopping the blank rotation at the time of each longitudinal movement with one of the grooves of the blank opposite the tool, and automatic mechanism for moving the tool inward or outward as longitudinal movement takes place so as to cut the blank with a predetermined contour differing from a straight line.

178. In a metal cutting machine of the class described, the combination of a rotatable spindle adapted to carry a blank having generally longitudinal grooves therein, a cutting tool, automatic means for effecting at intervals relative movements between the tool and the blank longitudinally of the latter, automatic means for stopping the blank rotation at the time of each longitudinal movement with one of the grooves of the blank opposite the tool, means for moving the tool inward or outward as longitudinal movement takes place so as to cut the blank with different diameters, and automatically acting mechanism for effecting regular relieving movements of the tool supplemental to the aforesaid movements.

179. In a metal cutting machine of the class described, the combination of a rotatable spindle adapted to carry a blank having helical grooves therein, a cutting tool, automatic means for effecting at intervals relative movements between the tool and the blank longitudinally of the latter, automatic means for stopping the blank rotation at the time of each longitudinal movement with one of the helical grooves of the blank opposite the tool, and means for moving the tool inward or outward as longitudinal movement takes place so as to cut the blank with different diameters.

180. In a metal cutting machine of the class described, the combination of a rotatable blank-carrying spindle, a cutting tool, means for feeding the tool longitudinally of the blank, automatic mechanism including a former and former pin for moving the tool inward or outward as longitudinal movement takes place so as to cut the blank with a predetermined contour differing from a straight line and corresponding to that of the former, automatic means for effecting regular intermittent relative longitudinal movements between the pin and the former, automatic means for stopping the spindle at the time of each longitudinal movement, and automatic means for withdrawing the former pin from the former at the time of each longitudinal movement.

181. In a metal cutting machine of the class described, the combination of a rotatable spindle adapted to carry a blank having generally longitudinal grooves therein, a cutting tool, means for feeding the tool longitudinally of the bank, automatic mechanism including a former and former pin for moving the tool inward or outward as longitudinal movement takes place so as to cut the blank with a predetermined contour differing from a straight line and corresponding to that of the former, automatic means for effecting regular intermittent relative longitudinal movements between the pin and the former, automatic means for stopping the spindle at the time of each longitudinal movement with the tool opposite one of the grooves in the blank, and automatic means for withdrawing the former pin from the former at the time of each longitudinal movement.

182. In a metal cutting machine of the class described, the combination of a rotatable blank-carrying spindle, a cutting tool, automatic means for effecting regular intermittent longitudinal feeding movements of the tool with respect to the blank all in the same direction, automatic mechanism including a former and former pin for moving the tool inward or outward as longitudinal movement takes place so as to cut the blank with a predetermined contour differing from a straight line and corresponding to that of the former, automatic means for effecting regular intermittent relative longitudinal movements between the pin and the former, automatic means for stopping the spindle at the time of each longitudinal movement of the tool and pin, and automatic means for withdrawing the former pin from the former at the time of each longitudinal movement.

183. In a metal cutting machine of the class described, the combination of a rotatable blank-carrying spindle, a cutting tool, automatic means for effecting regular intermittent longitudinal feeding movements of the tool with respect to the blank all in the same direction, automatic mechanism including a former and former pin for moving the tool inward or outward as longitudinal movement takes place so as to cut the blank with a predetermined contour differing from a straight line and corresponding to that of the former, automatic means for effecting regular intermittent relative longitudinal movements between the pin and the former, automatic means for stopping the spindle at the time of each longitudinal movement of the tool and pin, and automatic means for withdrawing the tool from the blank and for withdrawing the former pin from the former at the time of each longitudinal movement.

184. The combination of a rotatable blank-carrying spindle, a cutting tool movable transversely of the spindle axis toward or from the blank, means for moving the tool toward the blank, and fluid controlled means supplemental to the last said means for retarding the said movement of the tool.

185. The combination of a rotatable blank-carrying spindle, a cutting tool movable transversely of the spindle axis toward or from the blank, means for moving the tool toward the blank, and means for retarding the said movement of the tool including a cylinder and a piston therein, the said cylinder having valved apertures associated therewith and permitting the rapid flow of fluid when the tool is moved away from the blank and restricting the flow of fluid when the tool is moved toward the blank.

186. The combination of a rotatable blank-carrying spindle, a cutting tool movable transversely of the spindle axis toward or from the blank, means for moving the tool towards the blank, means for retarding the said movement of the tool including a cylinder and a piston therein, and a fluid reservoir associated with the cylinder, two valved apertures being provided between the cylinder and the reservoir to permit the rapid flow of fluid when the tool is moved away from the blank and to restrict the flow of fluid when the tool is moved toward the blank.

187. The combination of a rotatable blank-carrying spindle, a cutting tool movable transversely of the spindle axis toward or from the blank, means for moving the tool toward the blank, means for retarding the said movement of the tool including two cylinders and two pistons in the respective cylinders, and a fluid reservoir associated with the cylinders, two valved apertures being provided between the two cylinders and the reservoir to permit the rapid flow of fluid when the tool is moved away from the blank and to restrict the flow of fluid when the tool is moved toward the blank.

188. The combination of a rotatable blank-carrying spindle, a cutting tool movable transversely of the spindle axis toward or from the blank, means for moving the tool towards the blank, means for retarding the movement of the tool toward the blank including a cylinder and a piston therein, a piston rod connecting the piston with the tool, and a spring surrounding the rod and serving to move the tool toward the blank.

189. The combination of a rotatable blank-carrying spindle, a cutting tool movable transversely of the spindle axis toward or from the blank, means for moving the tool towards the blank, means for retarding the movement of the tool toward the blank including two cylinders and two pistons in the respective cylinders, piston rods connecting the respective pistons with the tool, and springs surrounding the respective rods and serving to move the tool toward the blank.

190. The combination of a rotatable blank-carrying spindle, a transversely movable tool slide, a transverse guideway for the slide, and means for vertically separating the slide and guideway.

191. The combination of a rotatable blank-carrying spindle, a transversely movable tool slide, a transverse guideway for the slide, and means for elevating the slide out of contact with the guideway.

192. The combination of a rotatable blank-carrying spindle, a transversely movable tool slide, a transverse guideway for the slide, and rollers adapted to engage the slide to elevate it out of contact with the guideway.

193. The combination of a rotatable blank-carrying spindle, a transversely movable tool slide, a transverse guideway for the slide, rollers adapted to engage the slide to elevate it out of contact with the guideway, and parallel motion links controlling the rollers.

194. The combination of a rotatable blank-carrying spindle, a transversely movable tool slide, a transverse guideway for the slide, means for moving the tool slide, means supplemental to the last said means for retarding the said movement of the tool slide, and means for vertically separating the slide and guideway.

195. The combination of a rotatable blank-carrying spindle, a cutting tool movable transversely of the spindle axis toward or from the blank, automatic means for withdrawing the tool from the blank, and means supplemental to the last said means and acting independently thereof for returning the tool toward the blank after each withdrawal.

196. The combination of a rotatable blank-carrying spindle, a cutting tool movable transversely of the spindle axis toward or from the blank, automatic means for withdrawing the tool from the blank, means for returning the tool toward the blank after each withdrawal, and means supplemental to the withdrawing means for retarding the movement of the tool toward the blank.

197. The combination of a rotatable blank-carrying spindle, a cutting tool movable transversely of the spindle axis toward or from the blank, automatic means for withdrawing the tool from the blank, means for returning the tool toward the blank after each withdrawal, and means supplemental to the withdrawing means and acting independently thereof for retarding the movement of the tool toward the blank.

198. The combination of a rotatable blank-carrying spindle, a transversely movable tool slide, a transverse guideway for the slide, automatic means for moving the slide to withdraw the tool from the blank, means for moving the slide to return the tool to the blank after each withdrawal, and means associated with the withdrawing means for vertically separating the slide and guideway.

199. The combination of a rotatable blank-carrying spindle, a transversely movable tool slide, a transverse guideway for the slide, automatic means for moving the slide to withdraw the tool from the blank, means associated with the withdrawing means for vertically separating the slide and guideway, and means supplemental to the withdrawing means and acting independently thereof for moving the slide to return the tool to the blank after each withdrawal.

200. In a machine of the class described, the combination of a rotatable blank-carrying spindle, a cutting tool, automatic mechanism for effecting at intervals, relative movements between the tool and the blank longitudinally of the latter, mechanism for withdrawing the tool from the blank before each longitudinal movement, and mechanism acting entirely independently of the last said mechanism for returning the tool to the blank after each longitudinal movement.

201. In a machine of the class described, the combination of a rotatable blank-carrying spindle, a cutting tool, automatic mechanism for stopping the spindle rotation after each rotation of the blank to a predetermined extent, mechanism for withdrawing the tool from the blank at the time of each stopping of the latter, and mechanism acting entirely independently of the last said mechanism for returning the tool to the blank after each withdrawal.

202. In a machine of the class described, the combination of a rotatable blank-carrying spindle, a cutting tool, automatic mechanism for effecting at intervals relative movements between the tool and the blank longitudinally of the latter after each rotation of the blank to a predetermined extent, automatic mechanism for stopping the spindle rotation at the time of each longitudinal movement, mechanism for withdrawing the tool from the blank at the time of each longitudinal movement, and mechanism acting entirely independently of the last said mechanism for returning the tool to the blank after each withdrawal.

203. In a machine of the class described, the combination of a rotatable blank-carrying spindle, a cutting tool, automatic mechanism for effecting at intervals relative movements between the tool and the blank longitudinally of the latter, mechanism for withdrawing the tool from the blank at the time of each longitudinal movement, means for returning the tool toward the blank after each withdrawal, and means supplemental to the withdrawing means for retarding the movement of the tool toward the blank.

204. In a machine of the class described, the combination of a rotatable blank-carrying spindle, a cutting tool, automatic mechanism for effecting at intervals relative movements between the tool and the blank longitudinally of the latter after each rotation of the blank to a predetermined extent, automatic mechanism for stopping the spindle rotation at the time of each longitudinal movement, mechanism for withdrawing the tool from the blank at the time of each longitudinal movement, means for returning the tool toward the blank after each withdrawal, and means supplemental to the withdrawing means for retarding the movement of the tool toward the blank.

205. A metal cutting machine comprising in combination, a rotatable blank-carrying spindle, a cutting tool movable longitudinally of the spindle axis and also movable transversely toward or from the blank, automatic means for withdrawing the tool from the blank, means for returning the tool toward the blank after each withdrawal, means supplemental to the withdrawing means and acting independently thereof for retarding the movement of the tool toward the blank, and automatically acting mechanism for effecting regular relieving movements of the tool supplemental to the aforesaid movements.

206. A metal cutting machine comprising in combination, a rotatable blank-carrying spindle, a cutting tool movable longitudinally of the spindle axis and also movable transversely toward or from the blank, automatic means for withdrawing the tool from the blank, means for returning the tool toward the blank after each withdrawal, means supplemental to the withdrawing means and acting independently thereof for retarding the movement of the tool toward the blank, automatically acting mechanism for effecting regular relieving movements of the tool supplemental to the aforesaid movements, and in timed relation to the spindle rotation, and means for varying the said timed relation in accordance with longitudinal movement of the tool.

207. A metal cutting machine comprising in combination, a rotatable blank-carrying spindle, a cutting tool movable longitudinally of the spindle axis and also movable transversely toward or from the blank, automatic means for rapidly withdrawing the tool from the blank, means for slowly returning the tool toward the blank after each withdrawal, automatically acting means for effecting regular relieving movements of the tool supplemental to the aforesaid movements and in timed relation to the spindle rotation, means for limiting the movements of the tool towards the blank at different positions so that the tool serves to cut the blank at different diameters, and means for varying said timed relation in accordance with the longitudinal movement of the tool.

208. A metal cutting machine comprising in combination, a rotatable blank-carrying spindle, a cutting tool movable longitudinally of the spindle axis and also movable transversely toward or from the blank, means for feeding the tool longitudinally, automatic means for withdrawing the tool from the blank at intervals, means for returning the tool toward the blank after each withdrawal, means supplemental to the withdrawing means and acting independently thereof for retarding the movement of the tool toward the blank, and means for limiting the movements of the tool toward the blank at different positions so that the tool serves to cut the blank with different diameters.

209. A metal cutting machine comprising in combination, a rotatable blank-carrying spindle, a cutting tool movable longitudinally of the spindle axis and also movable transversely toward or from the blank, means for feeding the tool longitudinally, automatic means for withdrawing the tool from the blank at intervals, means for returning the tool toward the blank after each withdrawal, means supplemental to the withdrawing means and acting independently thereof for retarding the movement of the tool toward the blank, means for limiting the movements of the tool toward the blank at different positions so that the tool serves to cut the blank with different diameters, and automatically acting mechanism for effecting regular relieving movements of the tool supplemental to the aforesaid movements.

210. A metal cutting machine comprising in combination, a rotatable blank-carrying spindle, a cutting tool movable transversely of the spindle axis and also movable transversely toward or from the blank, means for effecting relative feeding movements between the tool and the blank longitudinally of the latter, automatic means for rapidly withdrawing the tool from the blank at intervals, means for returning the tool towards the blank after each withdrawal, means for limiting the movements of the tool towards the blank at different positions so that the tool serves to cut the blank with different diameters, and automatically acting mechanism for effecting regular relieving movements of the tool supplemental to the aforesaid movements.

211. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the pin from the former at intervals, and means supplemental to the withdrawing means and acting independently thereof for returning the pin to the former after each withdrawal.

212. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the pin from the former at intervals, means for returning the pin to the former after each withdrawal, and means supplemental to the withdrawing means for retarding the movement of the pin toward the former.

213. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the pin from the former at intervals, means for returning the pin to the former after each withdrawal, and fluid controlled means for retarding the movement of the pin toward the former.

214. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at intervals, and means supplemental to the withdrawing means and acting independently thereof for returning the tool to the blank and the pin to the former after each withdrawal.

215. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at intervals, means for returning the tool to the blank and the pin to the former after each withdrawal, and means supplemental to the withdrawing means for retarding the movement of the tool toward the blank and of the pin toward the former.

216. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at intervals, means for returning the tool to the blank and the pin to the former after each withdrawal, and fluid controlled means for retarding the movement of the tool toward the blank and of the pin toward the former.

217. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, and automatically acting mechanism for effecting regular relieving movements of the tool supplemental to the aforesaid movements.

218. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, automatically acting mechanism for effecting regular relieving movements of the tool supplemental to the aforesaid movement and in timed relation to the spindle rotation, and means for varying the said timed relation in accordance with the longitudinal movements of the tool.

219. A machine of the class described comprising in combination, a rotatable blank-carrying spindle, a cutting tool movable longitudinally of the spindle axis and also movable transversely toward or from the blank, automatic means for withdrawing the tool from the blank at the time of each stopping of the spindle, means supplemental to the withdrawing means and acting independently thereof for returning the tool toward the blank after each withdrawal, and automatically acting mechanism for effecting regular relieving movements of the tool supplemental to the aforesaid movements.

220. A machine of the class described comprising in combination, a rotatable blank-carrying spindle, a cutting tool movable longitudinally of the spindle axis and also movable transversely toward or from the blank, automatic mechanism for stopping the spindle rotation at intervals, automatic means for withdrawing the tool from the blank at the time of each stopping of the spindle, means supplemental to the withdrawing means and acting independently thereof for returning the tool toward the blank after each withdrawal, automatically acting mechanism for effecting regular relieving movements of the tool supplemental to the aforesaid movements and in timed relation to the spindle rotation, and means for varying the said timed relation in accordance with longitudinal movement of the tool.

221. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, and automatically acting mechanism for effecting regular relieving movements of the tool supplemental to the aforesaid movements.

222. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, automatically acting mechanism for effecting regular relieving movements of the tool supplemental to the aforesaid movements and in timed relation to the spindle rotation, and means for varying the said timed relation in accordance with the longitudinal movements of the tool.

223. A machine of the class described comprising in combination, a rotatable blank-carrying spindle, a cutting tool, automatic mechanism for effecting at intervals feeding movements between the blank and the tool longtiudinally of the blank, automatic mechanism for stopping the spindle rotation at the time of each longitudinal feeding movement, automatic means for rapidly withdrawing the tool from the blank at the time of each longitudinal feeding movement, means supplemental to the withdrawing means and acting independently thereof for slowly returning the tool towards the blank after each withdrawal, automatically acting mechanism for effecting regular relieving movements of the tool supplemental to the feeding movements in timed relation to the spindle rotation, and means for varying the said timed relation in accordance with the longitudinal movement of the tool.

224. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, and means for limiting the movements of the tool toward the blank at different positions so that the tool serves to cut the blank with different diameters.

225. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, and automatically acting mechanism for effecting regular relieving movements of the tool supplemental to the aforesaid movements.

226. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, automatically acting mechanism for effecting regular relieving movements of the tool supplemental to the aforesaid movements and in timed relation to the spindle rotation, and means for varying the said timed relation in accordance with the longitudinal movements of the tool.

227. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, and means for limiting the movements of the tool toward the blank at different positions so that the tool serves to cut the blank with different diameters.

228. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the pin from the former at the time of each longitudinal movement, and means supplemental to the withdrawing means and acting independently thereof for returning the pin to the former after each withdrawal.

229. A machine of the class described comprising in combination, a rotatable blank-carrying spindle, a cutting tool movable toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the pin from the former at the time of each longitudinal movement, means for returning the pin to the former after each withdrawal, and means supplemental to the withdrawing means for retarding the movement of the pin toward the former.

230. In a machine of the class described, the combination of a rotatable blank-carrying spindle, a cutting tool, automatic means for feeding the tool at intervals longitudinally of the blank, means including a normally fixed former and a former pin longitudinally movable with the tool for causing the tool to cut the blank with a predetermined contour, mechanism for withdrawing the tool from the blank and the former pin from the former before each carriage movement, and mechanism acting entirely independently of the last said mechanism for returning the tool to the blank and the former pin to the former after each longitudinal movement.

231. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, and mechanism acting entirely independently of the last said mechanism for oppositely moving the slide to return the tool to the blank and the former pin to the former after each longitudinal movement.

232. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at the time of each longitudinal movement, means for returning the tool to the blank and the pin to the former after each withdrawal, and means supplemental to the withdrawing means for retarding the movement of the tool toward the blank and of the pin toward the former.

233. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at the time of each longitudinal movement, and means supplemental to the withdrawing means and acting independently thereof for returning the tool to the blank and the pin to the former after each withdrawal.

234. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut a blank with a predetermined contour differing from a straight line and corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, and automatically acting mechanism for effecting regular relieving movements of the tool supplemental to the aforesaid movements.

235. A machine of the class described comprising in combination, a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a fromer pin for so controlling the positions of the tool as it is moved longitudinally that it will cut a blank with a predetermined contour differing from a straight line and corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, automatically acting mechanism for effecting regular relieving movements of the tool supplemental to the aforesaid movements and in timed relation to the spindle rotation, and means for varying the said timed relation in accordance with the longitudinal movements of the tool.

236. The described combination of a rotatable blank-carrying spindle, a transversely movable tool, a support for the tool, and automatic means for locking the tool to the support at intervals and for releasing it at intervals to permit transverse movement.

237. The described combination of a rotatable blank-carrying spindle, a transversely movable tool slide, a support for the tool slide, and automatic means for locking the slide to the support at intervals and for releasing it at intervals to permit transverse movement.

238. The described combination of a rotatable blank-carrying spindle, a transversely movable tool slide, a support for the tool slide, means for locking the slide to the support or for releasing it to permit transverse movement, and means for elevating the slide out of contact with the support when it is released.

239. The described combination of a rotatable blank-carrying spindle, a transversely movable tool slide, a support for the tool slide, means for locking the slide to the support or for releasing it to permit transverse movement, and means including anti-friction rollers for elevating the slide out of contact with the support when it is released.

240. The described combination of a rotatable blank-carrying spindle, a transversely movable tool slide, a support for the tool slide, automatic means for locking the slide to the support at intervals and for releasing it at intervals to permit transversely movement, and automatic means for elevating the slide out of contact with the support each time it is released.

241. The described combination of a rotatable blank-carrying spindle, a longitudinally movable tool carriage, a transversely movable tool on the carriage, automatic means for withdrawing the tool from the blank at intervals, locking means between the tool and the carriage, and automatic means for effecting unlocking at the time of each withdrawal and for subsequently effecting locking.

242. The described combination of a rotatable blank-carrying spindle, a longitudinally movable tool carriage, a transversely movable tool slide on the carriage, automatic means for moving the tool slide transversely to withdraw the tool from the blank at intervals, locking means between the slide and the carriage, and automatic means for effecting unlocking at the time of each withdrawal and for subsequently effecting locking.

243. The described combination of a rotatable blank-carrying spindle, a longitudinally movable tool carriage, a transversely movable tool slide on the carriage, automatic means for moving the tool slide transversely to withdraw the tool from the blank at intervals, locking means between the slide and the carriage, automatic means for effecting unlocking at the time of each withdrawal and for subsequently effecting locking, and automatic means for elevating the slide each time it is unlocked.

244. The described combination of a rotatable blank-carrying spindle, a transversely movable tool slide, a second transversely movable slide supporting the tool slide, and means for locking the slides together or for releasing them to permit relative movement.

245. The described combination of a rotatable blank-carrying spindle, a transversely movable tool slide having a slot therein extending in the direction of movement of the slide, a second transversely movable slide supporting the tool slide, and means carried by the second slide and extending through the slot for locking the slides together or for releasing them to permit relative movement.

246. The described combination of a rotatable blank-carrying spindle, a transversely movable tool slide having a slot therein extending in the direction of movement of the slide, a second transversely movable slide supporting the tool slide and having an aperture registering with the slot, and means including a vertically movable stud extending through the slot and the aperture for locking the slides together or for releasing them to permit relative movement.

247. The described combination of a rotatable blank-carrying spindle, a transversely movable tool slide, a second transversely movable slide supporting the tool slide, and automatic means for locking the slides together at intervals and for releasing them at intervals to permit relative movement.

248. The described combination of a rotatable blank-carrying spindle, a transversely movable tool slide, a second transversely movable slide supporting the tool slide, means for locking the slides together or for releasing them to permit relative movement, and means for elevating the first slide out of contact with the second slide when it is released.

249. The described combination of a rotatable blank-carrying spindle, a transversely movable tool slide, a second transversely movable slide supporting the tool slide, automatic means for locking the slides together at intervals and for releasing them at intervals to permit relative movement, and automatic means for elevating the first slide out of contact with the second slide when it is released.

250. The described combination of a rotatable blank-carrying spindle, a longitudinally movable tool carriage, a transversely movable slide on the carriage, a tool slide mounted on the first said slide and transversely movable thereon, automatic means for moving the tool slide transversely to withdraw the tool from the blank at intervals, locking means between the slides, and automatic means for effecting unlocking at the time of each withdrawal and for subsequently effecting locking.

251. The described combination of a rotatable blank-carrying spindle, a longitudinally movable tool carriage, a transversely movable slide on the carriage, a tool slide mounted on the first said slide and transversely movable thereon, automatic means for moving the tool slide transversely to withdraw the tool from the blank at intervals, locking means between the slides, automatic means for effecting unlocking at the time of each withdrawal and for subsequently effecting locking, and automatic means for elevating the tool slide out of contact with the first said slide each time unlocking takes place.

252. The described combination of a rotatable blank-carrying spindle, a longitudinally movable tool carriage, a transversely movable slide on the carriage, a tool slide mounted on the first said slide and transversely movable thereon, locking means between the slides, automatic means engaging the first said slide for moving both slides transversely to withdraw the tool from the blank at intervals, and automatic means acting immediately after each withdrawal to unlock the tool slide from the first slide and subsequently acting to lock the tool slide to the first slide.

253. In a metal cutting machine, the combination of a rotatable blank-carrying spindle, a longitudinally movable tool carriage, a transversely movable tool on the carriage, automatic means for moving the carriage longitudinally at intervals, locking means between the tool and the carriage, and automatic means for effecting locking after each carriage movement and unlocking before the next following carriage movement.

254. In a metal cutting machine, the combination of a rotatable blank-carrying spindle, a longitudinally movable tool carriage, a transversely movable tool on the carriage, automatic means for moving the carriage longitudinally at intervals, automatic means for stopping the spindle rotation at the time of each longitudinal movement, locking means between the tool and the carriage, and automatic means for effecting locking after each carriage movement and unlocking before the next following carriage movement.

255. In a metal cutting machine, the combination of a rotatable blank-carrying spindle, a longitudinally movable tool carriage, a transversely movable tool slide on the carriage, automatic means for moving the carriage longitudinally at intervals, locking means between the slide and the carriage, and automatic means for effecting locking after each carriage movement and unlocking before the next following carriage movement.

256. In a metal cutting machine, the combination of a rotatable blank-carrying spindle, a longitudinally movable tool carriage, a transversely movable tool slide on the carriage, automatic means for moving the carriage longitudinally at intervals, locking means between the slide and the carriage, automatic means for effecting locking after each carriage movement and unlocking before the next following carriage movement, and automatic means for elevating the slide each time it is unlocked.

257. In a metal cutting machine, the combination of a rotatable blank-carrying spindle, a longitudinally movable tool carriage, a transversely movable tool on the carriage, automatic means for moving the carriage longitudinally at intervals, automatic means for withdrawing the tool from the blank at the time of each longitudinal movement, locking means between the tool and the carriage, and automatic means for effecting locking after each carriage movement and unlocking before the next following carriage movement.

258. In a metal cutting machine, the combination of a rotatable blank-carrying spindle, a longitudinally movable tool carriage, a transversely movable tool on the carriage, automatic means for moving the carriage longitudinally at intervals, automatic means for withdrawing the tool from the blank at the time of each longitudinal movement, means for returning the tool to the blank after each carriage movement, locking means between the tool and the carriage, and automatic means for effecting unlocking before each withdrawal and locking after each return movement.

259. In a metal cutting machine, the combination of a rotatable blank-carrying spindle, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, locking means between the slide and the carriage, and automatic means for effecting locking after each carriage movement and unlocking before the next following carriage movement.

260. In a metal cutting machine, the combination of a rotatable blank-carrying spindle, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, locking means between the slide and the carriage, automatic means for effecting locking after each carriage movement and unlocking before the next following carriage movement, and automatic means for elevating the slide each time it is unlocked.

261. In a metal cutting machine, the combination of a rotatable blank-carrying spindle, a longitudinally movable tool carriage, a transevrsely movable tool slide on the carriage, automatic means for moving the tool slide transversely to withdraw the tool from the blank at the time of each longitudinal movement, locking means between the slide and the carriage, and automatic means for effecting locking after each carriage movement and unlocking before the next following carriage movement.

262. In a metal cutting machine, the combination of a rotatable blank-carrying spindle, a longitudinally movable tool carriage, a transversely movable tool slide on the carriage, automatic means for moving the tool slide transversely to withdraw the tool from the blank at the time of each longitudinal movement, means for moving the slide to return the tool to the blank after each carriage movement, locking means between the slide and the carriage, and automatic means for effecting unlocking before each withdrawal and locking after each return movement.

263. In a metal cutting machine, the combination of a rotatable blank-carrying spindle, a longitudinally movable tool carriage, a transversely movable slide on the carriage, a tool slide mounted on the first said slide and transversely movable thereon, automatic means for moving the carriage longitudinally at intervals, automatic means for moving the tool slide transversely to withdraw the tool from the blank at the time of each longitudinal movement, locking means between the slides, and automatic means for effecting unlocking at the time of each longitudinal movement and withdrawal and for subsequently effecting locking.

264. In a metal cutting machine, the combination of a rotatable blank-carrying spindle, a longitudinally movable tool carriage, a transversely movable slide on the carriage, a tool slide mounted on the first said slide and transversely movable thereon, automatic means for moving the carriage longitudinally at intervals, automatic means for moving the tool slide transversely to withdraw the tool from the blank at the time of each longitudinal movement, locking means between the slides, automatic means for effecting unlocking at the time of each longitudinal movement and withdrawal and for subsequently effecting locking, and automatic means for elevating the tool slide out of contact with the first said slide each time unlocking takes place.

265. In a metal cutting machine, the combination of a rotatable blank-carrying spindle, a longitudinally movable tool carriage, a transversely movable slide on the carriage, a tool slide mounted on the first said slide and transversely movable thereon, automatic means for moving the carriage longitudinally at intervals, locking means between the slides, automatic means engaging the first said slide for moving both slides transversely to withdraw the tool from the blank at the time of each longitudinal movement, and automatic means acting immediately after withdrawal to unlock the tool slide from the first slide and subsequently acting to lock the tool slide to the first slide.

266. The combination in a machine of the class described, of a rotatable blank-carrying spindle, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, locking means between the slide and the carriage, automatic means for effecting locking after each said carriage movement and unlocking before the next following carriage movement, and automatically acting mechanism for effecting relieving movements of the tool relatively to the said tool slide.

267. The combination in a machine of the class described, of a rotatable blank-carrying spindle, a longitudinally movable tool carriage, a transversely movable tool slide on the carriage, automatic means for moving the carriage longitudinally at intervals, automatic means for stopping the spindle rotation at the time of each longitudinal movement, automatic means for moving the tool slide transversely to withdraw the tool from the blank at the time of each longitudinal movement, locking means between the slide and the carriage, automatic means for effecting locking after each said carriage movement and unlocking before the next following carriage movement, and automatically acting mechanism for effecting relieving movements of the tool relatively to the said tool slide.

268. The combination in a machine of the class described, of a rotatable blank-carrying spindle, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, locking means between the slide and the carriage, automatic means for effecting locking after each said carriage movement and unlocking before the next following carriage movement, automatically acting mechanism for effecting relieving movements of the tool relatively to the said tool slide and in timed relation to the spindle rotation, and means for varying the said timed relation in accordance with longitudinal movement of the carriage.

269. The combination in a machine of the class described, of a rotatable blank-carrying spindle, a longitudinally movable tool carriage, a transversely movable tool on the carriage, automatic means for moving the carriage longitudinally at intervals, means for controlling the tool so as to cause it to assume different positions with respect to the carriage following successive movements of the carriage so that it cuts the blank with different diameters, locking means between the tool and the carriage, and automatic means for effecting locking after each carriage movement and unlocking before the next following carriage movement.

270. The combination in a machine of the class described, of a rotatable blank-carrying spindle, a longitudinally movable tool carriage, a transversely movable tool slide on the carriage, automatic means for moving the carriage longitudinally at intervals, means for controlling the slide to cause it to assume different positions following successive movements of the carriage so that the tool cuts the blank with different diameters, locking means between the slide and the carriage, and automatic means for effecting locking after each carriage movement and unlocking before the next following carriage movement.

271. The combination in a machine of the class described, of a rotatable blank-carrying spindle, a longitudinally movable tool carriage, a transversely movable tool slide on the carriage, automatic means for moving the carriage longitudinally at intervals, means including a former and a former pin for controlling the slide to cause it to assume different positions following successive movements of the carriage so that the tool cuts the blank with a predetermined contour differing from a straight line and corresponding to that of the former, locking means between the slide and the carriage, and automatic means for effecting locking after each carriage movement and unlocking before the next following carriage movement.

272. The combination in a machine of the class described, of a rotatable blank-carrying spindle, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, means for controlling the slide to cause it to assume different positions following successive movements of the carriage and of the slide so that the tool cuts the blank with different diameters, locking means between the slide and the carriage, and automatic means for effecting locking after each carriage movement and unlocking before the next following carriage movement.

273. The combination in a machine of the class described, of a rotatable blank-carrying spindle, a longitudinally movable tool carriage, a transversely movable tool slide on the carriage, automatic means for moving the carriage longitudinally at intervals, means for controlling the slide to cause it to assume different positions following successive movements of the carriage so that the tool cuts the blank with different diameters, locking means between the slide and the carriage, automatic means for effecting locking after each carriage movement and unlocking before the next following carriage movement, and automatic means for elevating the tool slide out of contact with the first said slide each time unlocking takes place.

274. The combination in a machine of the class described, of a rotatable blank-carrying spindle, a longitudinally movable tool carriage, a transversely movable tool slide on the carriage, automatic means for moving the carriage longitudinally at intervals, means for controlling the slide to cause it to assume different positions following successive movements of the carriage so that the tool cuts the blank with different diameters, locking means between the slide and the carriage, automatic means for effecting locking after each carriage movement and unlocking before the next following carriage movement, automatic means for elevating the tool slide out of contact with the first said slide each time unlocking takes place and in timed relation to the spindle rotation, and means for varying the said timed relation in accordance with longitudinal movement of the carriage.

275. The combination in a machine of the class described, of a rotatable blank-carrying spindle, a longitudinally movable tool carriage, a transversely movable tool slide on the carriage, automatic means for moving the carriage longitudinally at intervals, automatic means for stopping the spindle rotation at the time of each longitudinal movement, means for controlling the slide to cause it to assume different positions following successive movements of the carriage so that the tool cuts the blank with different diameters, locking means between the slide and the carriage, and automatic means for effecting locking after each carriage movement and unlocking before the next following carriage movement.

276. The combination in a machine of the class described, of a rotatable blank-carrying spindle, a longitudinally movable carriage, a transversely movable tool on the carriage, automatic means for moving the carriage longitudinally at intervals, means including a former and a transversely movable former pin on the carriage for controlling the tool to cause it to assume different positions with respect to the carriage following successive movements of the carriage so that it cuts the blank with a predetermined contour differing from a straight line and corresponding to that of the former, locking means between the former pin and the carriage, and automatic means for effecting locking after each carriage movement and unlocking before the next following carriage movement.

277. The combination in a machine of the class described, of a rotatable blank-carrying spindle, a longitudinally movable carriage, a transversely movable tool on the carriage, automatic means for moving the carriage longitudinally at intervals, means including a former and a transversely movable former pin on the carriage for controlling the tool to cause it to assume different positions with respect to the carriage following successive movements of the carriage so that it cuts the blank with a predetermined contour differing from a straight line and corresponding to that of the former, automatic means for withdrawing the former pin from the former at the time of each longitudinal movement, locking means between the former pin and the carriage, and automatic means for effecting locking after each carriage movement and unlocking before the next following carriage movement.

278. The combination in a machine of the class described, of a rotatable blank-carrying spindle, a longitudinally movable carriage, a transversely movable tool on the carriage, automatic means for moving the carriage longitudinally at intervals, means including a former and a transversely movable former pin on the carriage for controlling the tool to cause it to assume different positions with respect to the carriage following successive movements of the carriage so that it cuts the blank with a predetermined contour differing from a straight line and corresponding to that of the former, locking means between the former pin and the carriage and between the tool and the carriage, and automatic means for effecting locking after each carriage movement and unlocking before the next following carriage movement.

279. The combination in a machine of the class described, of a rotatable blank-carrying spindle, a longitudinally movable carriage, a transversely movable tool on the carriage, automatic means for moving the carriage longitudinally at intervals, means including a former and a transversely movable former pin on the carriage for controlling the tool to cause it to assume different positions with respect to the carriage following successive movements of the carriage so that it cuts the blank with a predetermined contour differing from a straight line and corresponding to that of the former, automatic means for withdrawing the former pin from the former at the time of each longitudinal movement, locking means between the former pin and the carriage and between the tool and the carriage, and automatic means for effecting locking after each carriage movement and unlocking before the next following carriage movement.

280. The combination in a machine of the class described, of a rotatable blank-carrying spindle, a longitudinally movable carriage, a transversely movable slide on the carriage, a cutting tool on the slide, automatic means for moving the carriage longitudinally at intervals, means including a former and a former pin on the slide for controlling the slide to cause it to assume different positions following successive movements of the carriage so that the tool cuts the blank with a predetermined contour differing from a straight line and corresponding to that of the former, automatic means for moving the slide to withdraw the tool from the blank and the former pin from the former at the time of each longitudinal movement, locking means between the slide and the carriage, and automatic means for effecting locking after each carriage movement and unlocking before the next following carriage movement.

281. The combination in a machine of the class described, of a rotatable blank-carrying spindle, a longitudinally movable carriage, a transversely movable slide on the carriage, a tool slide mounted on the first slide and transversely movable thereon, automatic means for moving the carriage longitudinally at intervals, means including a former and a former pin on the tool slide for controlling the said slide to cause it to assume different positions following successive movements of the carriage so that the tool cuts the blank with a predetermined contour differing from a straight line and corresponding to that of the former, automatic means for moving the tool slide to withdraw the tool from the blank and the former pin from the former at the time of each longitudinal movement, locking means between the two slides, and automatic means for effecting locking after each carriage movement and unlocking before the next following carriage movement.

282. The combination in a machine of the class described, of a rotatable blank-carrying spindle, a longitudinally movable carriage, a transversely movable slide on the carriage, a tool slide mounted on the first slide and transversely movable thereon, automatic means for moving the carriage longitudinally at intervals, means including a former and a former pin on the tool slide for controlling the said slide to cause it to assume different positions following successive movements of the carriage so that the tool cuts the blank with a predetermined contour differing from a straight line and corresponding to that of the former, locking means between the two slides, automatic means engaging the first said slide for moving both slides transversely to withdraw the tool from the blank and the pin from the former at the time of each longitudinal movement, and automatic means acting immediately after withdrawal to unlock the tool slide from the first slide and subsequently acting to lock the tool slide to the first slide.

283. The combination in a machine of the class described, of a rotatable blank-carrying spindle, a longitudinally movable carriage, a transversely movable slide on the carriage, a cutting tool on the slide, automatic means for moving the carriage longitudinally at intervals, means including a former and a former pin on the slide for controlling the slide to cause it to assume different positions following successive movements of the carriage so that the tool cuts the blank with a predetermined contour differing from a straight line and corresponding to that of the former, automatic means for moving the slide to withdraw the tool from the blank and the former pin from the former at the time of each longitudinal movement, locking means between the slide and the carriage, automatic means for effecting locking after each carriage movement, and unlocking before the next following carriage movement, and automatically acting mechanism for effecting relieving movements of the tool relatively to the said tool slide.

284. The combination in a machine of the class described, of a rotatable blank-carrying spindle, a longitudinally movable carriage, a transversely movable slide on the carriage, a cutting tool on the slide, automatic means for moving the carriage longitudinally at intervals, means including a former and a former pin on the slide for controlling the slide to cause it to assume different positions following successive movements of the carriage so that the tool cuts the blank with a predetermined contour differing from a straight line and corresponding to that of the former, automatic means for moving the slide to withdraw the tool from the blank and the former pin from the former at the time of each longitudinal movement, locking means between the slide and the carriage, automatic means for effecting locking after each carriage movement and unlocking before the next following carriage movement, automatically acting mechanism for effecting relieving movements of the tool relatively to the said tool slide and in timed relation to the spindle rotation, and means for varying the said timed relation in accordance with longitudinal movement of the carriage.

285. The combination of a rotatable blank-carrying spindle, a cutting tool movable transversely of the spindle axis toward or from the blank, means for moving the tool toward the blank, means supplemental to the last said means for retarding the said movement of the tool, and means for locking the tool in operative relation to the blank.

286. The combination of a rotatable blank-carrying spindle, a cutting tool movable transversely of the spindle axis toward or from the blank, means for moving the tool toward the blank, fluid controlled means supplemental to the last said means for retarding the said movement of the tool, and means for locking the tool in operative relation to the blank.

287. The combination of a rotatable blank-carrying spindle, a tool slide movable transversely of the spindle axis, a cutting tool on the slide, means for moving the slide so as to move the tool toward the blank, means supplemental to the last said means for retarding the said movement of the slide and means for locking the slide with the tool in operative relation to the blank.

288. The combination of a rotatable blank-carrying spindle, a transversely movable tool slide, a transverse guideway for the slide, a cutting tool on the slide, means for moving the slide so as to move the tool toward the blank, means for elevating the slide out of contact with the guideway, means supplemental to the slide moving means for retarding the said movement of the slide, and means for locking the slide with the tool in operative relation to the blank.

289. The combination of a rotatable blank-carrying spindle, a cutting tool movable transversely of the spindle axis toward or from the blank, automatic means for withdrawing the tool from the blank, means supplemental to the last said means and acting independently thereof for returning the tool toward the blank after each withdrawal, and means for locking the tool in operative relation to the blank.

290. The combination of a rotatable blank-carrying spindle, a cutting tool movable transversely of the spindle axis toward or from the blank, automatic means for withdrawing the tool from the blank, means for returning the tool toward the blank after each withdrawal, means for retarding the movement of the tool toward the blank, and means for locking the tool in operative relation to the blank.

291. The combination of a rotatable blank-carrying spindle, a cutting tool movable transversely of the spindle axis toward or from the blank, automatic means for withdrawing the tool from the blank, means for returning the tool toward the blank after each withdrawal, means supplemental to the withdrawing means and acting independently thereof for retarding the movement of the tool toward the blank, and means for locking the tool in operative relation to the blank.

292. The combination of a rotatable blank-carrying spindle, a tool slide movable transversely of the spindle axis, a cutting tool on the slide, automatic means for moving the slide so as to withdraw the tool from the blank at intervals, means suplemental to the last said means and acting independently thereof for moving the slide to return the tool toward the blank after each withdrawal, and means for locking the slide with the tool in operative relation to the blank.

293. The combination of a rotatable blank-carrying spindle, a transversely movable tool slide, a transverse guideway for the slide, a cutting tool on the slide, automatic means for moving the slide so as to withdraw the tool from the blank at intervals, means for elevating the slide out of contact with the guideway, means supplemental to the last said means and acting independently thereof for moving the slide to return the tool toward the blank after each withdrawal, and means for locking the slide with the tool in operative relation to the blank.

294. The combination of a rotatable blank-carrying spindle, a transversely movable tool slide, a second transversely movable slide supporting the tool slide, automatic means for moving the tool slide transversely to withdraw the tool from the blank at intervals, means supplemental to the last said means for moving the tool slide to return the tool toward the blank after each withdrawal, and means for locking the two slides together or for unlocking them.

295. The combination of a rotatable blank-carrying spindle, a transversely movable tool slide, a second transversely movable slide supporting the tool slide, automatic means for moving the tool slide transversely to withdraw the tool from the blank at intervals, means supplemental to the last said means for moving the tool slide to return the tool toward the blank after each withdrawal, means for locking the two slides together or for unlocking them, and automatic means for elevating the tool slide out of contact with the other slide each time unlocking takes place.

296. The combination of a rotatable blank-carrying spindle, a transversely movable tool slide, a second transversely movable slide supporting the tool slide, automatic means engaging the second slide for moving both slides transversely to withdraw the tool from the blank at intervals, automatic means acting immediately after withdrawal to unlock the tool slide from the other slide and subsequently acting to lock the two slides together, and automatic means supplemental to the withdrawing means and acting immediately after unlocking for moving the tool slide relatively to the second slide to return the tool toward the blank.

297. The combination of a rotatable blank-carrying spindle, a transversely movable tool slide, a second transversely movable slide supporting the tool slide, automatic means engaging the second slide for moving both slides transversely to withdraw the tool from the blank at intervals, automatic means acting immediately after withdrawal to unlock the tool slide from the other slide and subsequently acting to lock the two slides together, automatic means supplemental to the withdrawing means and acting immediately after unlocking for moving the tool slide relatively to the second slide to return the tool toward the blank, and means associated with the withdrawing means for returning the second slide to its initial position after the two slides have been unlocked.

298. In combination in a machine of the class described, a rotatable blank-carrying spindle, a cutting tool, automatic mechanism for effecting at intervals relative movements between the tool and the blank longitudinally of the latter, mechanism for withdrawing the tool from the blank before each longitudinal movement, mechanism acting entirely independently of the last said mechanism for returning the tool to the blank after each longitudinal movement, and means for locking the tool in operative relation to the blank after it has been returned.

299. In combination in a machine of the class described, a rotatable blank-carrying spindle, a cutting tool, automatic mechanism for stopping the spindle rotation after each rotation of the blank to a predetermined extent, mechanism for withdrawing the tool from the blank at the time of each stopping of the latter, mechanism acting entirely independently of the last said mechanism for returning the tool to the blank after each withdrawal, and means for locking the tool in operative relation to the blank after it has been returned.

300. In combination in a machine of the class described, a rotatable blank-carrying spindle, a cutting tool, automatic mechanism for effecting at intervals relative movements between the tool and the blank longitudinally of the latter, automatic mechanism for stopping the spindle rotation at the time of each longitudinal movement, mechanism for withdrawing the tool from the blank at the time of each longitudinal movement, mechanism for returning the tool to the blank after each withdrawal, and means for locking the tool in operative relation to the blank after it has been returned.

301. In combination in a machine of the class described, a rotatable blank-carrying spindle, a cutting tool, automatic mechanism for effecting at intervals relative movements between the tool and the blank longitudinally of the latter, mechanism for withdrawing the tool from the blank at the time of each longitudinal movement, means for returning the tool toward the blank after each withdrawal, means for retarding the movement of the tool toward the blank, and means for locking the tool in operative relation to the blank after it has been returned.

302. In combination in a machine of the class described, a rotatable blank-carrying spindle, a cutting tool, automatic mechanism for effecting at intervals relative movements between the tool and the blank longitudinally of the latter after each rotation of the blank to a predetermined extent, automatic mechanism for stopping the spindle rotation at the time of each longitudinal movement, mechanism for withdrawing the tool from the blank at the time of each longitudinal movement, means for returning the tool toward the blank after each withdrawal, means for retarding the movement of the tool toward the blank, and means for locking the tool in operative relation to the blank after it has been returned.

303. In combination in a machine of the class described, a rotatable blank-carrying spindle, a longitudinally movable tool carriage, a transversely movable tool slide on the carriage, automatic means for moving the carriage longitudinally at intervals, automatic means for moving the tool slide transversely to withdraw the tool from the blank at the time of each longitudinal movement, and mechanism acting entirely independently of the last said mechanism for moving the slide so as to return the tool to the blank after each longitudinal movement.

304. In combination in a machine of the class described, a rotatable blank-carrying spindle, a longitudinally movable tool carriage having a transverse guideway, a transversely movable tool slide on the said guideway, a cutting tool on the slide, automatic means for moving the carriage longitudinally at intervals, automatic means for moving the slide so as to withdraw the tool from the blank at the time of each longitudinal movement, means for elevating the slide out of contact with the guideway, means supplemental to the last said means and acting independently thereof for moving the slide to return the tool toward the blank after each withdrawal, and means for locking the slide with the tool in operative relation to the blank.

305. In combination in a machine of the class described, a rotatable blank-carrying spindle, a longitudinally movable tool carriage, a transversely movable tool slide on the carriage, a second transversely movable slide on the carriage supporting the tool slide, automatic means for moving the carriage longitudinally at intervals, automatic means for moving the tool slide transversely to withdraw the tool from the blank at the time of each longitudinal movement, means supplemental to the last said means for moving the tool slide to return the tool toward the blank after each withdrawal, and means for locking the two slides together or for unlocking them.

306. In combination in a machine of the class described, a rotatable blank-carrying spindle, a longitudinally movable tool carriage, a transversely movable tool slide on the carriage, a second transversely movable slide on the carriage supporting the tool slide, automatic means for moving the carriage longitudinally at intervals, automatic means engaging the second said slide for moving both slides transversely to withdraw the tool from the blank at the time of each longitudinal movement, automatic means acting immediately after withdrawal to unlock the tool slide from the other slide and subsequently acting to lock the two slides together, and automatic means supplemental to the withdrawal means and acting immediately after unlocking for moving the tool slide relatively to the other side to return the tool toward the blank.

307. In combination in a machine of the class described, a rotatable blank-carrying spindle, a longitudinally movable tool carriage, a transversely movable tool slide on the carriage, a second transversely movable slide on the carriage supporting the tool slide, automatic means for moving the carriage longitudinally at intervals, automatic means engaging the second said slide for moving both slides transversely to withdraw the tool from the blank at the time of each longitudinal movement, automatic means acting immediately after withdrawal to unlock the tool slide from the other slide and subsequently acting to lock the two slides together, automatic means supplemental to the withdrawing means and acting immediately after locking for moving the tool slide relatively to the other slide to return the tool toward the blank, and means associated with the withdrawing means for returning the second slide to its initial position after the two slides are unlocked.

308. A metal cutting machine comprising in combination, a rotatable blank-carrying spindle, a cutting tool movable transversely of the spindle axis toward or from the blank, automatic means for withdrawing the tool from the blank, means supplemental to the last said means and acting independently thereof for returning the tool toward the blank after each withdrawal, means for locking the tool in operative relation to the blank after it has been returned, and automatically acting mechanism for effecting relieving movements of the tool relatively to the said locking means and supplemental to the aforesaid movements.

309. A metal cutting machine comprising in combination, a rotatable blank-carrying spindle, a cutting tool movable transversely of the spindle axis toward or from the blank, automatic means for withdrawing the tool from the blank, means for returning the tool toward the blank after each withdrawal, means for retarding the movement of the tool toward the blank, means for locking the tool in operative relation to the blank after it has been returned, and automatically acting mechanism for effecting relieving movements of the tool relatively to the said locking means and supplemental to the aforesaid movements.

310. A metal cutting machine comprising in combination, a rotatable blank-carrying spindle, a cutting tool movable longitudinally and also transversely of the spindle axis toward or from the blank, automatic means for withdrawing the tool from the blank, means supplemental to the last said means and acting independently thereof for returning the tool toward the blank after each withdrawal, means for locking the tool in operative relation to the blank after it has been returned, automatically acting mechanism for effecting relieving movements of the tool relatively to the said locking means and supplemental to the aforesaid movements in timed relation to the spindle rotation, and means for changing the said timed relation in accordance with the longitudinal tool movement so that a blank with helical teeth may be relieved.

311. A metal cutting machine comprising in combination, a rotatable blank-carrying spindle, a transversely movable tool slide, a second transversely movable slide supporting the tool slide, automatic means for moving the tool slide transversely to withdraw the tool from the blank at intervals, means supplemental to the last said means for moving the tool slide to return the tool toward the blank after each withdrawal, means for locking the two slides together or for unlocking them, and automatically acting mechanism for effecting relieving movements of the tool relatively to the said tool slide and supplemental to the aforesaid movements.

312. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the pin from the former at intervals, means supplemental to the withdrawing means and acting independently thereof for returning the pin to the former after each withdrawal, and means for locking the pin in its returned position.

313. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the pin from the former at intervals, means for returning the pin to the former after each withdrawal, means supplemental to the withdrawing means for retarding the movement of the pin toward the former, and means for locking the pin in its returned position.

314. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at intervals, means supplemental to the withdrawing means and acting independently thereof for returning the tool to the blank and the pin to the former after each withdrawal, and means for locking the tool and the pin in their returned positions.

315. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at intervals, automatic means supplemental to the withdrawing means and acting independently thereof for returning the tool to the blank and the pin to the former after each withdrawal, and locking means acting automatically after the engagement of the pin with the former to lock the tool and the pin in their returned positions.

316. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the position of the tool as it is moved longitudinally that it will cut the blank with a predetermined contour differing from a straight line and corresponding to that of the former, automatic means for withdrawing the tool from the blank and the pin from the former at intervals, means for returning the tool to the blank and the pin to the former after each withdrawal, means supplemental to the withdrawing means for retarding the movement of the tool toward the blank and of the pin toward the former, and means for locking the tool and the pin in their returned positions.

317. A metal cutting machine comprising in combination, a rotatable blank-carrying spindle, a cutting tool movable longitudinally of the spindle axis and also movable transversely toward or from the blank, means for feeding the tool longitudinally, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at intervals, automatic means for returning the tool to the blank and the pin to the former after each withdrawal, means supplemental to the withdrawing means for retarding the movement of the tool toward the blank and of the pin toward the former, and locking means acting automatically after the engagement of the pin with the former to lock the tool and the pin in their returned positions.

318. In a machine of the class described, the combination of a rotatable blank-carrying spindle, a cutting tool, automatic mechanism for effecting at intervals relative movements between the tool and the blank longitudinally of the latter, mechanism for withdrawing the tool from the blank before each longitudinal movement, mechanism acting entirely independently of the last said mechanism for returning the tool to the blank after each longitudinal movement, means for locking the tool in operative relation to the blank after it has been returned, and automatically acting mechanism for effecting relieving movements of the tool relatively to the said locking means and supplemental to the aforesaid movements.

319. In a machine of the class described, the combination of a rotatable blank-carrying spindle, a cutting tool, automatic mechanism for effecting at intervals relative movements between the tool and the blank longitudinally of the latter, mechanism for withdrawing the tool from the blank before each longitudinal movement, mechanism acting entirely independently of the last said mechanism for returning the tool to the blank after each longitudinal movement, means for locking the tool in operative relation to the blank after it has been returned, automatically acting mechanism for effecting relieving movements of the tool relatively to the said locking means and supplemental to the aforesaid movements and in timed relation to the spindle rotation, and means for changing the said timed relation in accordance with the longitudinal tool movement so that a blank with helical teeth may be relieved.

320. In a machine of the class described, the combination of a rotatable blank-carrying spindle, a cutting tool, automatic mechanism for effecting at intervals relative movements between the tool and the blank longitudinally of the latter, automatic mechanism for stopping the spindle rotation at the time of each longitudinal movement, mechanism for withdrawing the tool from the blank before each longitudinal movement, mechanism acting entirely independently of the last said mechanism for returning the tool to the blank after each longitudinal movement, means for locking the tool in operative relation to the blank after it is returned, and automatically acting mechanism for effecting relieving movements of the tool relatively to the said locking means and supplemental to the aforesaid movements.

321. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, and means for locking the tool in its innermost position after each returning movement.

322. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means suplemental to the withdrawing means and acting independently thereof for returning the tool toward the blank after each withdrawal, means for limiting the movements of the tool toward the blank at different positions so that the tool serves to cut the blank with different diameters, means for locking the tool in its innermost position after each returning movement, and automatically acting mechanism for effecting regular relieving movements of the tool relatively to the locking means and supplemental to the aforesaid movements.

323. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, automatically acting mechanism for effecting relieving movements of the tool relatively to the said locking means and supplemental to the aforesaid movements, automatically acting mechanism for effecting regular relieving movements of the tool relatively to the locking means and supplemental to the aforesaid movements and in timed relation to the spindle rotation, and means for varying the said timed relation in accordance with the longitudinal movements of the tool.

324. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means for withdrawing the tool from the blank at the time of each longitudinal movement, means supplemental to the withdrawing means and acting independently thereof for returning the tool toward the blank after each withdrawal, means for limiting the movements of the tool toward the blank at different positions so that the tool serves to cut the blank with different diameters, and automatically acting mechanism for effecting relieving movements of the tool relatively to the said locking means and supplemental to the aforesaid movements.

325. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the pin from the former at the time of each longitudinal movement, means supplemental to the withdrawing means and acting independently thereof for returning the pin to the former after each withdrawal, and means for locking the pin in its returned position.

326. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the pin from the former at the time of each longitudinal movement, means for returning the pin to the former after each withdrawal, means supplemental to the withdrawing means for retarding the movement of the pin toward the former, and means for locking the pin in its engaged relation to the former.

327. In a machine of the class described, the combination of a rotatable blank-carrying spindle, a cutting tool, automatic means for feeding the tool at intervals longitudinally of the blank, means including a normally fixed former and a former pin longitudinally movable with the tool for causing the tool to cut the blank with a predetermined contour, mechanism for withdrawing the tool from the blank and the former pin from the former before each longitudinal movement, mechanism acting entirely independently of the last said mechanism for returning the tool to the blank and the former pin to the former after each longitudinal movement, and means for locking the tool and pin in their returned positions.

328. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, mechanism acting entirely independently of the last said mechanism for oppositely moving the slide to return the tool to the blank and the former pin to the former after each longitudinal movement, and means for locking the said slide in position with the former pin engaging the former.

329. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, a second slide on the carriage transversely movable independently of the first slide, a lock for connecting the two slides, mechanism for moving the first said slide to withdraw the tool from the blank and the former pin from the former before each carriage movement, means for temporarily releasing the lock after the said slide movement, and mechanism supplemental to the aforesaid slide moving means for returning the first slide thus returning the tool to the blank and the former pin to the former.

330. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, a second slide on the carriage transversely movable independently of the first slide, a lock for connecting the two slides, mechanism in engagement with the second slide for moving both slides to withdraw the tool from the blank and the former pin from the former before each carriage movement, means for temporarily releasing the lock after the said slide movement, and mechanism supplemental to the aforesaid slide moving means for returning the first slide independently of the second slide thus returning the tool to the blank and the former pin to the former.

331. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, a second slide on the carriage transversely movable independently of the first slide, the second slide normally supporting the first slide, a lock for connecting the two slides, mechanism in engagement with the second slide for moving both slides to withdraw the tool from the blank and the former pin from the former before each carriage movement, means for temporarily releasing the lock after the said slide movement and for raising the first slide out of engagement with the second slide, and mechanism supplemental to the aforesaid slide aforesaid slide moving means for returning the first slide while disengaged from the second slide thus returning the tool to the blank and the former pin to the former.

332. In a machine of the class described, the combination of a rotatable blank-carrying spindle, a carriage moovable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, a second slide on the carriage transversely movable independently of the first slide, the second slide normally supporting the first slide, a lock for connecting the two slides, mechanism in engagement with the second slide for moving both slides to withdraw the tool from the blank and the former pin from the former before each carriage movement, mechanism for temporarily releasing the lock after the said slide movement, mechanism including bodily movable rollers for raising the first slide and supporting it out of engagement with the second slide, and mechanism supplemental to the aforesaid slide moving means for returning the first slide while supported by the rollers thus returning the tool to the blank and the former pin to the former.

333. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, mechanism acting entirely independently of the last said mechanism for oppositely moving the slide to return the tool to the blank and the former pin to the former after each longitudinal movement, and means for retarding the action of the returning mechanism.

334. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, mechanism acting entirely independently of the last said mechanism for oppositely moving the slide to return the tool to the blank and the former pin to the former after each longitudinal movement, and means for retarding the action of the returning mechanism, the said means being adjustable to vary the rate of return.

335. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, mechanism acting entirely independently of the last said mechanism for oppositely moving the slide to return the tool to the blank and the former pin to the former after each longitudinal movement, and fluid controlled means for retarding the action of the returning mechanism.

336. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, mechanism acting entirely independently of the last said mechanism for oppositely moving the slide to return the tool to the blank and the former pin to the former after each longitudinal movement, and liquid controlled means for retarding the action of the returning mechanism.

337. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, spring mechanism for moving the slide to return the tool to the blank and the former pin to the former after each longitudinal movement, and means for regulating the return movement including a cylinder, a piston movable in the cylinder and a fluid reservoir having a restricted aperture communicating with the piston.

338. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, spring mechanism for moving the slide to return the tool to the blank and the former pin to the former after each longitudinal movement, and means for regulating the return movement including a cylinder, a piston movable in the cylinder, a fluid reservoir, a check valve opening from the piston space into the reservoir and an adjustable needle valve opening from the reservoir into the piston space.

339. In a machine of the class described, the combination of a rotatable blank-carrying spindle, a carriage movable longitudinally of the spindle axis, automatic mechanism for moving the carriage at intervals, a transversely movable slide on the carriage, a cutting tool carried by the slide, means including a normally fixed former and a former pin carried by the slide for controlling the slide to cause the tool to cut the blank with a predetermined contour, mechanism for moving the slide to withdraw the tool from the blank and the former pin from the former before each carriage movement, spring mechanism for moving the slide to return the tool to the blank and the former pin to the former after each longitudinal movement, and means for regulating the return movement including two pistons at opposite sides of the slide, two pistons movable in the respective pistons and a fluid reservoir common to the two cylinders and having a restricted aperture communicating therewith.

340. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic mechanism for stopping the spindle rotation at the time of each longitudinal movement, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, and means for locking the tool and pin in their returned positions.

341. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, means for locking the tool and pin in their returned positions, and automatically acting mechanism for effecting regular relieving movements of the tool relatively to the said locking means and supplemental to the aforesaid movements.

342. In a machine of the class described, the combination of a rotatable blank-carrying spindle, a cutting tool movable longitudinally of the spindle axis and also movable transversely toward or from the blank, automatic mechanism for effecting at intervals movements of the tool longitudinally of the blank, automatic means including a former and a former pin for so controlling the positions of the tool as it is moved longitudinally that it will cut the blank with a predetermined contour differing from a straight line and corresponding to that of the former, automatic means for withdrawing the tool from the blank and the pin from the former at the time of each longitudinal movement, means supplemental to the withdrawing means and acting independently thereof for returning the tool to the blank and the pin to the former after each withdrawal, means for locking the tool and pin in their returned positions, automatically acting mechanism for effecting regular relieving movements of the tool relatively to the locking means and supplemental to the aforesaid movements and in timed relation to the spindle rotation, and means for varying the said timed relation in accordance with the longitudinal movements of the tool.

In testimony whereof, I hereto affix my signature.

FRIEDERICH MÜLLER.